US008475921B2

(12) United States Patent
Kayama et al.

(10) Patent No.: US 8,475,921 B2
(45) Date of Patent: Jul. 2, 2013

(54) COMPOSITE MATERIAL, COMPOSITE MATERIAL SUBSTRATE, COMPOSITE MATERIAL DISPERSED FLUID, AND MANUFACTURING METHODS THEREOF

(75) Inventors: Tomoyuki Kayama, Kariya (JP); Kouzi Banno, Nagoya (JP); Kiyoshi Yamazaki, Toyota (JP); Koji Yokota, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 527 days.

(21) Appl. No.: 11/989,023

(22) PCT Filed: Jul. 20, 2006

(86) PCT No.: PCT/JP2006/314826
§ 371 (c)(1),
(2), (4) Date: Jan. 18, 2008

(87) PCT Pub. No.: WO2007/011062
PCT Pub. Date: Jan. 25, 2007

(65) Prior Publication Data
US 2009/0209415 A1 Aug. 20, 2009

(30) Foreign Application Priority Data
Jul. 21, 2005 (JP) .................................. 2005-211678
Mar. 31, 2006 (JP) .................................. 2006-101142

(51) Int. Cl.
*B01J 23/00* (2006.01)
*B01J 23/10* (2006.01)
*B01J 23/14* (2006.01)
*B01J 23/16* (2006.01)
*B01J 23/22* (2006.01)
*B01J 23/26* (2006.01)
*B01J 23/28* (2006.01)
*B01J 23/30* (2006.01)
*B01J 23/38* (2006.01)
*B01J 23/54* (2006.01)

(52) U.S. Cl.
USPC ........... 428/403; 502/302; 502/303; 502/304; 502/305; 502/306; 502/308; 502/309; 502/312; 502/313; 502/314; 502/315; 502/316; 502/317; 502/318; 502/319; 502/320; 502/321; 502/322; 502/323; 502/324; 502/325; 502/326; 502/327; 502/328; 502/330; 502/331; 502/332; 502/333; 502/334; 502/335; 502/336; 502/337; 502/338; 502/339; 502/340; 502/341; 502/349; 502/350; 502/351; 502/353; 502/354; 502/355

(58) Field of Classification Search
USPC .................. 502/300, 302, 303–355; 423/210, 423/212, 213.2, 213.7, 220, 230, 235, 236, 423/239.1, 242.1, 244.01, 244.06, 244.09, 423/579, 592.1, 593.1, 604, 21.1–24, 27–61; 428/403, 404
See application file for complete search history.

(56) References Cited

U.S. PATENT DOCUMENTS

| 2,863,762 | A | * | 12/1958 | Pullen ............................. 423/22 |
| 5,855,854 | A | | 1/1999 | Shinzawa et al. |
| 6,150,288 | A | | 11/2000 | Suzuki et al. |
| 6,306,794 | B1 | | 10/2001 | Suzuki et al. |
| 7,078,004 | B2 | * | 7/2006 | Voss et al. .................. 423/213.5 |
| 2004/0259731 | A1 | | 12/2004 | Yan |
| 2005/0186129 | A1 | * | 8/2005 | Miyashita et al. ............... 423/22 |
| 2005/0255992 | A1 | * | 11/2005 | Strehlau et al. ............... 502/302 |
| 2006/0128565 | A1 | * | 6/2006 | Flytzani-Stephanopoulos et al. ........................... 502/439 |

FOREIGN PATENT DOCUMENTS

| JP | A 10-182155 | 7/1998 |
| JP | A 2002-210365 | 7/2002 |
| JP | A 2004-42021 | 2/2004 |
| JP | A 2004-179010 | 6/2004 |
| JP | A 2005-144402 | 6/2005 |
| JP | A 2005-517625 | 6/2005 |
| JP | A 2006-177346 | 7/2006 |
| JP | A 2006-255610 | 9/2006 |
| WO | WO 2004/043591 A1 | 5/2004 |

OTHER PUBLICATIONS

Watanabe et al., "Preparation of highly dispersed Pt+Ru Alloy clusters and the activity for the electrooxidation of methanol", (1987), J.Electroanalysis. Chem. vol. 229, p. 395-406.*
Yeung et al. "Engineering Pt in Ceria for a Maximum Metal-Support Interaction in Catalysis" 2005, American chemical society, vol. 127, p. 18010-18011.*
Golunski et al. "Catalysis at lower temperatures" 2002, p. 30-38.*
Kobayashi et al., "Silica coating of silver nanoparticles using a modified Stober method", *Journal of Collaid and Interface Science*, vol. 283, pp. 392-396 (2005).
Feb. 11, 2010 Supplementary Search Report for European Patent Application No. EP 06781737.9.

* cited by examiner

*Primary Examiner* — Wayne Langel
*Assistant Examiner* — Syed Iqbal
(74) *Attorney, Agent, or Firm* — Oliff & Berridge, PLC

(57) ABSTRACT

A composite material includes an aggregate which contains a first metal particle constituting a core and second metal oxide particulates surrounding the first metal particle and having an average primary particle diameter ranging from 1 to 100 nm.

36 Claims, 33 Drawing Sheets
(3 of 33 Drawing Sheet(s) Filed in Color)

POTENTIAL-pH CHART FOR METAL-WATER SYSTEM (25°C)

POTENTIAL-pH CHART FOR METAL-WATER SYSTEM (25 °C)
IN ALKALINE COMPLEX SOLUTION

ENTERING GAS TEMPERATURE (°C)

COMPOSITE MATERIAL, COMPOSITE MATERIAL SUBSTRATE, COMPOSITE MATERIAL DISPERSED FLUID, AND MANUFACTURING METHODS THEREOF

TECHNICAL FIELD

The present invention relates to a composite material and a manufacturing method thereof, a composite material substrate using the composite material, and a composite material dispersed fluid and a method of manufacturing a composite material substrate using the same.

BACKGROUND OF THE INVENTION

Concerning a gasoline engine, hazardous components in exhaust gas has been steadily decreased by strict regulations of exhaust gas and advance in technology that can deal with the regulations. However, concerning a diesel engine, there are still many technical problems left with purification of exhaust gas because the exhaust gas contains particulates (particulate matter: such as soot composed of carbon particulates or soluble organic fractions (SOF), hereinafter referred to as PM).

Accordingly, in recent years, the oxidation catalyst capable of oxidizing the PM, particularly soot components, at low temperature have been developed. For example, Japanese Unexamined Patent Application Publication No. 2004-42021 (Document 1) discloses a catalyst composition containing silver (Ag) and/or cobalt (Co) stabilized ceria ($CeO_2$), which facilitates soot oxidation during the regeneration of DPF. Here, a molar ratio between Ag and ceria is preferably in a range from 4:1 to 1:4 (which corresponds to a content (mol %) of Ag relative to a total amount of Ce and Ag from 20 mol % to 80 mol %), and more preferably in a range from 3:1 to 1:3 (which corresponds to a content (mol %) of Ag relative to the total amount of Ce and Ag from 33 mol % to 67 mol %). Moreover, it is reported that a mixture having an Ag content at 75 mol % and a Ce content at 25 mol % has the highest degree of activity. Meanwhile, it is reported that a mixture having an Ag content at 25 mol % and a Ce content at 75 mol % is also active in soot oxidation even when oxygen is used as a sole oxidant. In this case, a reactive oxygen species can be produced in the gas phase. Here, a method of manufacturing the catalyst described in Document 1 is a method of obtaining the catalyst composition having a porosity wherein a pore size is centered around 70 to 200 Å and a high specific surface area ranging from 14 to 150 $m^2/g$.

The catalyst composition is manufactured by impregnating a cellulose material (Whatman (registered trademark) Filter Paper 540) with a nitrate precursor and burning the cellulose at 600° C. and for two hours after drying the material overnight at a room temperature.

There are roughly two evaluation methods adopted in this Document 1. One is a method of measuring a decomposition rate of a substance obtained by subjecting diesel soot and the catalyst composition to loose-contact with a spatula by means of TGA under a 10 percent oxygen atmosphere, for example. The other is a method of conducting a pressure drop balance test by means of DPF. Moreover, in the TGA evaluation of the catalyst composition having an Ag content of 75 mol %, for example, an oxidation rate at 323° C. is equal to 0.117 $hr^{-1}$ even in fine conditions of $NO_2$: 1010 ppm and $O_2$: 10%, and by use of the best catalyst composition. That is, a proportion of the soot to be oxidized in an hour is merely equal to 11.7% even under the condition where there is a sufficient amount of a powerful oxidant such as $NO_2$. Meanwhile, in the pressure drop balance test, an Ag—Ce based catalyst composition CPF-15 is deemed to be capable of oxidizing most of the PM at a temperature around 325° C., but this test result contradicts the foregoing test result. Accordingly, the present inventors consider that soot components or the like slips through in an actual pressure drop balance test. Hence it was not possible to oxidize a carbon-containing component such as the soot and a component such as HC, CO or NO sufficiently at a low temperature by the catalyst compositions disclosed in Document 1, i.e. merely by presence of a set of Ag and $CeO_2$ or a set of Co and $CeO_2$.

Meanwhile, Japanese Unexamined Patent Application Publication No. 2005-144402 (Document 2) discloses a partial oxidation catalyst of hydrocarbon having a core-shell structure wherein a core portion is formed by a catalytically active component made of particulates of a metal selected from iron group metals, and the periphery of the core portion is coated with a shell portion made of a catalyst support component selected from any of silica, alumina, zirconia, and titania.

Further, J. Colloid Int. Sci. 283 (2005) 392-396 (Document 3) discloses a method of coating Ag nanoparticles with silica by a sol-gel method called a Stober method.

However, it is hard to obtain activity of the components of the core portions in the partial oxidation catalyst having the catalytically active component that is strongly coated with the shell portion such as the catalyst disclosed in Document 2 and in the particles having the core-shell structure in which the capsular coating is formed by a condensation reaction as disclosed in Document 3. Accordingly, it was not possible to oxidize a carbon-containing component such as soot and a component such as HC, CO or NO sufficiently at a low temperature.

DISCLOSURE OF THE INVENTION

The present invention has been made in view of the above-mentioned problem of the conventional techniques. An object of the present invention is to provide a composite material which is extremely useful as an oxidation catalyst and the like capable of oxidizing a carbon-containing component such as soot and a component such as HC, CO or NO sufficiently at a lower temperature, a composite material substrate using the material, and manufacturing methods capable of efficiently and surely obtaining the composite material and the composite material substrate.

As a result of earnest studies for attaining the object, the present inventors have found out that it is possible to obtain a composite material which is extremely useful as an oxidation catalyst and the like capable of oxidizing a carbon-containing component such as soot and a component such as HC, CO or NO sufficiently at a lower temperature by forming a structure such that a first metal particle constituting a core is surrounded by second metal oxide particulates having an average primary particle diameter ranging from 1 to 100 nm.

A composite material of the present invention comprises an aggregate containing a first metal particle constituting a core and second metal oxide particulates surrounding the first metal particle and having an average primary particle diameter ranging from 1 to 100 nm.

A first metal constituting the first metal particle according to the present invention preferably has an ionization tendency equal to or lower than that of Zn. More preferably, the first metal is at least one substance selected from the group consisting of Ag, Pt, Rh, Pd, Ru, Ir, Os, Au, and Cu.

It is preferable that the first metal particle according to the present invention be an oxygen-extracting (-retrieving or -separating) particle made of an oxygen-extracting material configured to extract (retrieve or separate) oxygen from an oxygen-containing substance and to generate an oxygen reactive species. Above all, it is particularly preferable that the oxygen-extracting material contain Ag.

A second metal constituting the second metal oxide particulates according to the present invention is preferably a valence variable metal. More preferably, a second metal oxide constituting the second metal oxide particulates is at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof. Further, it is particularly preferable that second metal compound particulates constituting precursors of the second metal oxide particulates act as a reductant for a first metal compound constituting a precursor of the first metal particle.

It is preferable that the second metal oxide particulates according to the present invention be oxygen-reactive-species transporting particulates made of an oxygen-reactive-species transporting material which is capable of transporting an oxygen reactive species generated by the oxygen-extracting material. Above all, the oxygen-reactive-species transporting material is preferably a composite oxide containing any of $CeO_2$ and Ce, and more preferably further contains at least one substance selected from the group consisting of La, Nd, Pr, Sm, Y, Ca, Ti, Fe, Zr, and Al as an additive metal.

In the composite material of the present invention, it is preferable that average primary particle diameters of the second metal oxide particulates and of the first metal particles after calcinating for 5 hours at 500° C. in air be in a range from 1 to 75 nm and 10 to 100 nm, respectively, and that the average primary particle diameter of the first metal particle be at least 1.3 times greater than that of the second metal oxide particulates. Alternatively, it is preferable that the average primary particle diameters of the second metal oxide particulates and of the primary metal particles after calcinating for 5 hours at 800° C. in an atmosphere containing oxygen at 10% by volume and nitrogen at 90% by volume be in a range from 8 to 100 nm and 10 to 400 nm, respectively, and that the average primary particle diameter of the first metal particle be at least 1.3 times greater than that of the second metal oxide particulates.

In the composite material of the present invention, it is preferable that an average particle diameter of the aggregates be in a range from 0.05 to 0.5 μm and that a portion equal to or above 60% by volume of all the aggregates have particle diameters in a range within ±50% away from the average particle diameter.

The composite material of the present invention may further comprise third metal ultrafine particles supported on surfaces of the second metal oxide particulates. A third metal constituting the third metal ultrafine particles preferably has a lower ionization tendency than that of H. It is more preferable that the third metal be identical to the first metal constituting the first metal particle.

The composite material of the present invention is extremely useful as an oxidation catalyst or the like.

A method of manufacturing a composite material of the present invention comprises the steps of generating an aggregate precursor out of a solution containing a first metal salt and a second metal salt such that a first metal particle derived from the first metal salt is surrounded by second metal compound particulates derived from the second metal salt, and obtaining a composite material comprising an aggregate which contains the first metal particle constituting a core and second metal oxide particulates surrounding the first metal particle and having an average primary particle diameter ranging from 1 to 100 nm, by calcinating the obtained aggregate precursor.

In the step of generating the aggregate precursor in the method of manufacturing a composite material of the present invention, (i) the aggregate precursor is preferably generated by generating the second metal compound particulates under presence of a pH adjuster and depositing the first metal particle by a reducing action of the second metal compound particulates, and (ii) it is more preferable that a first metal compound derived from the first metal salt be generated under presence of a complexing agent and that the first metal particle be deposited by reducing the first metal compound by a reducing action of the second metal compound particulates.

The first metal salt according to the present invention is preferably a salt of a metal having an ionization tendency equal to or lower than that of Zn, and is more preferably a salt of at least one metal selected from the group consisting of Ag, Pt, Rh, Pd, Ru, Ir, Os, Au, and Cu.

It is preferable that the first metal particle according to the present invention be an oxygen-extracting particle made of an oxygen-extracting material configured to extract oxygen from an oxygen-containing substance and to generate an oxygen reactive species. Above all, it is particularly preferable that the first metal salt serving as a raw material of the oxygen-extracting material contains Ag.

The second metal salt according to the present invention is preferably a salt of a valence variable metal, and more preferably a salt of at least one metal selected from the group consisting of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V.

It is preferable that the second metal oxide particulates according to the present invention be oxygen-reactive-species transporting particulates made of an oxygen-reactive-species transporting material which is capable of transporting an oxygen reactive species generated by the oxygen-extracting material. Above all, it is particularly preferable that the second metal salt serving as a raw material of the oxygen-reactive-species transporting material contain a salt of Ce and a salt of an additive metal which is at least one substance selected from the group consisting of La, Nd, Pr, Sm, Y, Ca, Ti, Fe, Zr, and Al. In the method of manufacturing a composite material of the present invention, it is possible to control the particle diameter of the aggregate by containing the salt of the additive metal.

The method of manufacturing a composite material of the present invention may further comprise the step of allowing third metal ultrafine particles to be supported on surfaces of any of the second metal compound particulates and the second metal oxide particulates.

In the present invention, it is preferable that an average particle diameter of the aggregate precursors be in a range from 0.05 to 0.5 μm and that a portion equal to or above 60% by volume of all the aggregate precursors have particle diameters in a range within ±50% away from the average particle diameter.

The method of manufacturing a composite material of the present invention is extremely useful as a method of manufacturing an oxidation catalyst or the like.

A composite material substrate of the present invention comprises a substrate and the composite material of the present invention. In the composite material substrate of the present invention, it is preferable that the substrate have pores ranging from 1 to 300 μm and that a coating layer having an average thickness equivalent to 0.5 to 50 times as large as the average particle diameter of the aggregate be formed inside the pores by use of the composite material. The composite material substrate of the present invention is extremely useful as a substrate for exhaust gas purification or the like.

A first composite material dispersed fluid of the present invention comprises the composite material of the present invention and a dispersion medium. It is preferable that this first composite material dispersed fluid further contain a binder.

A second composite material dispersed fluid of the present invention comprises the aggregate precursor obtained in the process of the method of manufacturing a composite material of the present invention, and a dispersion medium. This second composite material dispersed fluid preferably contains the aggregate precursor obtained by removing 50 to 99.9% of residual ions in a system from a solution containing the aggregate precursor which is obtained in the process of the method of manufacturing a composite material of the present invention.

A method of manufacturing a composite material substrate of the present invention is a method of obtaining a composite material substrate by calcinating any of the first composite material dispersed fluid and the second composite material dispersed fluid after causing the fluid to contact a substrate.

A method of manufacturing a composite material dispersed fluid of the present invention comprises the step of mixing a solution containing the aggregate precursors obtained in the process of the method of manufacturing a composite material of the present invention with a dispersion solvent. In this method of manufacturing a composite material dispersed fluid of the present invention, it is preferable to remove 50 to 99.9% of residual ions in a system from a solution containing the aggregate precursors which are obtained in the process of the method of manufacturing a composite material of the present invention.

Here, it is not known exactly why the composite material of the present invention can be obtained by the method of manufacturing a composite material of the present invention. However, the present inventors speculate as follows. In the method of manufacturing a composite material of the present invention, the second metal compound particulates (solid metal oxide precursors) derived from the second metal salt are generated in a reaction solution, which act on first metal ions or a metal compound derived from the first metal salt as a reductant and thereby promote a reduction reaction similar to so-called a silver mirror reaction. When the reductant is a solid in an electroless deposition reaction based on the reductive method as described above, a deposition reaction of the metal progresses on a surface of the solid and the deposited metal is surrounded by the solid reductant (the second metal compound particulates) at the same time. For this reason, the reaction progresses such that the second metal compound particles surround the metal particle constituting the core, then zeta potentials of the aggregate precursors change as the second metal compound particulates aggregate around the metal particle, thereby generating repulsive forces among the aggregate precursors. Further, this state is thermodynamically stable. Accordingly, from these speculation, the present inventors conclude that the nano-level aggregate precursors are generated in uniform particle diameters. Moreover, the composite material containing the nano-level aggregates in uniform particle diameters, wherein the metal particle is covered with the second metal oxide particulates having an average particle diameters from 1 to 100 nm, can be obtained by calcinating the aggregate precursors obtained as described above.

Therefore, according to the present invention, it is possible to obtain the composite material of the present invention easily and reliably without using hard-to-use materials such as an organic solvent or using a dispersion stabilizer such as PVP and without requiring conditions such as a high temperature or an inert atmosphere. Here, a fact that a molar ratio of Ce to Ag in the aggregates obtained in the examples to be described later is around 1:1 is deemed to support validity of the speculation concerning the above-described reaction mechanism.

It is not known exactly why it is possible to oxidize a carbon-containing component such as soot and a component such as HC, CO or NO sufficiently at a lower temperature in an atmosphere where an oxygen-containing substance is present in the case of using the composite material of the present invention as the oxidation catalyst. However, the present inventors speculate as follows. A case of oxidizing a carbon-containing component by using the oxygen-extracting particle as the first metal particle, the oxygen-reactive-species transporting particles as the second metal oxide particulates, and oxygen as the oxygen-containing substance will be described below as an example.

As shown in FIG. 1, in the oxidation catalyst of the present invention, an oxygen-extracting particle 1 which is made of a material configured to extract oxygen from an oxygen-containing substance and to generate an oxygen reactive species is surrounded by an oxygen-reactive-species transporting particle 2 made of a material which is capable of transporting the generated oxygen reactive species. Here, although illustration of the oxygen-reactive-species transporting particles 2 surrounding the oxygen-extracting particle 1 is omitted in FIG. 1 except one of them, the oxygen-extracting particle 1 is in fact surrounded by the oxygen-reactive-species transporting particles 2. For this reason, a carbon-containing component 3 such as soot that is an object to be treated (an oxidation target) has a higher probability of contact with the oxygen-reactive-species transporting particle 2 as compared to direct contact with the oxygen-extracting particle 1.

Then, oxygen is extracted from the oxygen-containing substance by the oxygen-extracting particle 1 even at a low temperature (a), then the oxygen reactive species (O*: for example, an oxygen ion) extracted and thereby generated is transported onto a surface of the carbon-containing component 3 by the oxygen-reactive-species transporting particle 2, and a surface oxide is formed there (b). Here, it is known that the bonding between the C and O of the surface oxide can be mainly categorized into C=O, C=C, and C—O (Applied Catalysis B, 50, 185-194 (2004)). Subsequently, the surface oxide thus formed is oxidized by oxygen in gas phase or by the oxygen reactive species transported through the oxygen-reactive-species transporting particle 2 (c). In this way, an oxidized portion 3' is removed from the periphery of the carbon-containing component 3 (d), then the carbon-containing component 3 is gradually reduced in size (e), and the carbon-containing component 3 is completely oxidized and disappears in the end (f).

As described above, the oxygen-extracting particle 1 is surrounded by the oxygen-reactive-species transporting particles 2 in the oxidation catalyst of the present invention. Accordingly, the contact between the carbon-containing component 3 and the oxygen-reactive-species transporting particle 2 is sufficiently ensured and the contact between the oxygen-extracting particle 1 and oxygen in gas phase is also ensured sufficiently. Consequently, a large amount of the oxygen reactive species is supplied from the oxygen-extracting particle 1 to the carbon-containing component 3. From these speculation, the present inventors conclude that the carbon-containing component such as soot can be sufficiently oxidized at a low temperature. Here, the oxygen reactive species is also generated in the case of oxidizing a substance other than the carbon-containing component such as soot by use of the oxidation catalyst of the present invention or in the case where the oxygen-containing substance is not oxygen. Further, when a component other than the carbon-containing component such as soot is oxidized by use of the oxidization catalyst of the present invention, or the oxygen-containing substance is a substance other than oxygen, it is possible to oxidize the carbon-containing component such as soot or the component such as HC, CO or NO by the generation of the oxygen-reactive-species and a similar mechanism.

Here, in the present invention, as for the oxygen-containing substance other than $O_2$, it is possible to exemplify NOx, SOx, $O_3$, peroxides, or compounds which contain an oxygen atom and are gaseous in an atmosphere for oxidizing the carbon-containing component such as soot or the component such as HC, CO or NO, such as carbonyl compounds, alcohol compounds, ether compounds or nitro compounds.

Meanwhile, as for the oxygen reactive species, it is possible to exemplify $O_2^-$, $O^-$, and $O^{2-}$. It is known that an oxygen molecule is activated into oxygen species such as $O_2 \rightarrow O_2^- \rightarrow 2O^- \rightarrow 2O_2^-$ in accordance with donation of an electron on the catalyst. Above all, $O_2^-$ is easily generated by Ag. The present inventors speculate that $O_2^-$ is advantageous for a soot oxidation reaction for having electrophilicity.

Moreover, concerning details of the soot oxidation mechanism in the case of using Ag as the oxygen-extracting material (the first metal) and $CeO_2$ as the oxygen-reactive-species transporting material (the second metal oxide), the present inventors speculate as follows.

First, oxygen is extracted from the oxygen-containing substance such as $O_2$ on Ag serving as the oxygen-extracting material and the oxygen reactive species such as $O_2^-$ is generated. The generated oxygen reactive species is transported while being coordinated on $CeO_2$ in a side-on form (a state where the oxygen reactive species such as $O_2^-$ is coordinated on Ce of the $CeO_2$ exposed on a surface). In this case, since Ce can change valence, $CeO_2$ can store a large amount of oxygen reactive species and can transport the oxygen reactive species to the soot well.

Then, the oxygen reactive species such as $O_2^-$ reaching a region of contact with the soot partially oxides the soot in the first place to generate a C—O—C bonding. To promote such partial oxidation, $O_2^-$ is deemed to be more advantageous than $O^-$, $O_2^-$ or the like that have strong nucleophilicity. However, since $O_2^-$ cannot achieve complete oxidation, $O^-$, $O_2^-$, and the like having strong nucleophilicity are generated at the time of partial oxidation so that complete oxidation will be achieved by these species or complete oxidation will be achieved by oxygen in gas phase.

Here, assuming that an active point of the oxidation reaction of the soot (C) is ceria ($CeO_2$), the reaction will be expressed by the following equation. The reaction mechanism of the soot oxidation speculated by the present inventors will be described further in detail with reference to FIG. 2. Here, in the following reactions (1) and (2), the above-described oxygen reactive species is deemed to intermediate transfer of oxygen atoms.

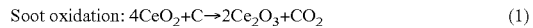

Soot oxidation: $4CeO_2 + C \rightarrow 2Ce_2O_3 + CO_2$     (1)

Then, trivalent ceria ($Ce_2O_3$) which has oxidized C is oxidized by oxygen ($O_2$) in gas phase and returns to $CeO_2$ again. Here, Ag is considered to promote this reaction expressed by the following equation by generating the above-described oxygen reactive species.

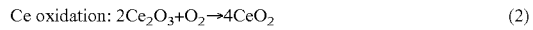

Ce oxidation: $2Ce_2O_3 + O_2 \rightarrow 4CeO_2$     (2)

Meanwhile, ceria eliminates $CO_2$ from the reaction system by absorbing $CO_2$ that is generated either on an interface between ceria and the soot or on the soot onto a basic site on the surface, and promotes the reaction expressed by the equation (1) as a consequence. Then, ceria desorbs $CO_2$ absorbed weakly on the basic site to the gas phase and thereby regenerates the basic site. However, if $CO_2$ is absorbed too strongly on the basic site, the $CO_2$ desorption from the surface is inhibited and the entire surface is covered with $CO_2$, thereby causing a loss of a performance to promote the reaction expressed by the equation (1) by means of eliminating $CO_2$ from the reaction system. Moreover, it is conceivable that part of $CO_2$ absorbed on trivalent ceria ($Ce_2O_3$) generates stable cerium carbonate as expressed by the following equation (3). Accordingly, a performance to oxidize the soot is also lost in addition to the performance to eliminate $CO_2$ from the reaction system.

$CO_2$ absorption: $Ce_2O_3 + 3CO_2 \rightarrow Ce_2(CO_3)_3$     (3)

Accordingly, a reaction expressed by a equation (4) for desorbing $CO_2$ from cerium carbonate plays an important role in the soot oxidation reaction.

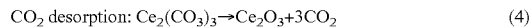

$CO_2$ desorption: $Ce_2(CO_3)_3 \rightarrow Ce_2O_3 + 3CO_2$     (4)

A catalyst for purification of exhaust gas, (the oxidation catalyst) using the composite material of the present invention has a high density of surface basic sites and therefore has a significant effect to promote the oxidation reaction of soot. Moreover, due to a high proportion of weak basic sites, the basic sites are regenerated and a promotive effect thereof is maintained. In addition, generation of trivalent cerium carbonate is suppressed and the effect to promote the oxidation reaction of soot is further enhanced.

According to the present invention, it is possible to provide a composite material which is extremely useful as an oxidation catalyst and the like capable of oxidizing a carbon-containing component such as soot and a component such as HC, CO or NO sufficiently at a lower temperature, an oxidation catalyst substrate using the material, and manufacturing methods capable of efficiently and surely obtaining the composite material and the composite material substrate.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENTS

The present invention will be described in detail based upon preferred embodiments.

First, a composite material of the present invention will be described. A composite material of the present invention comprises an aggregate containing a first metal particle constituting a core and second metal oxide particulates surrounding the first metal particle and having an average primary particle diameter ranging from 1 to 100 nm.

Here, the first metal particle and the second metal oxide particulates according to the present invention are primary particles per se, and secondary particle formed by covering the former with the latter will be referred to as an "aggregate (or a primary aggregate)" and a tertiary particle formed further by gathering those aggregates will be referred to an "assembly (or a secondary aggregate)".

A first metal constituting the first metal particle according to the present invention preferably has a low ionization tendency from the viewpoint that the metal is easily deposited by the above-mentioned reduction reaction. The first metal is preferably one having an ionization tendency equal to or lower than that of Zn (such as Au, Pt, Pd, Rh, Ru, Ag, Hg, Cu, Bi, Sb, Ir, Os, Fe, Co, Ni, Pb, Sn, Cd, Cr or Zn), more preferably one having the ionization tendency equal to or lower than that of H (such as Au, Pt, Pd, Rh, Ru, Ag, Hg, Cu, Bi, Sb, Ir or Os), or particularly preferably one having the ionization tendency equal to or lower than that of Ag (noble metal: such as Au, Ag, Cu, Pt, Pd, Rh, Ru, Ir or Os).

Here, the first metal according to the present invention may be a single metal or an alloy made of two or more metals among the above-mentioned metals. Further, part of the first metal may form an oxide or may form a compound with other elements. If part of the first metal forms the oxide or the compound, the content percentage of the above-mentioned metal is preferably equal to or above 0.3% by mass.

It is preferable that the first metal particle according to the present invention be an oxygen-extracting (-retrieving or -separating) particle made of an oxygen-extracting material configured to extract (retrieve or separate) oxygen from an oxygen-containing substance and to generate an oxygen reactive species.

Figure 1:
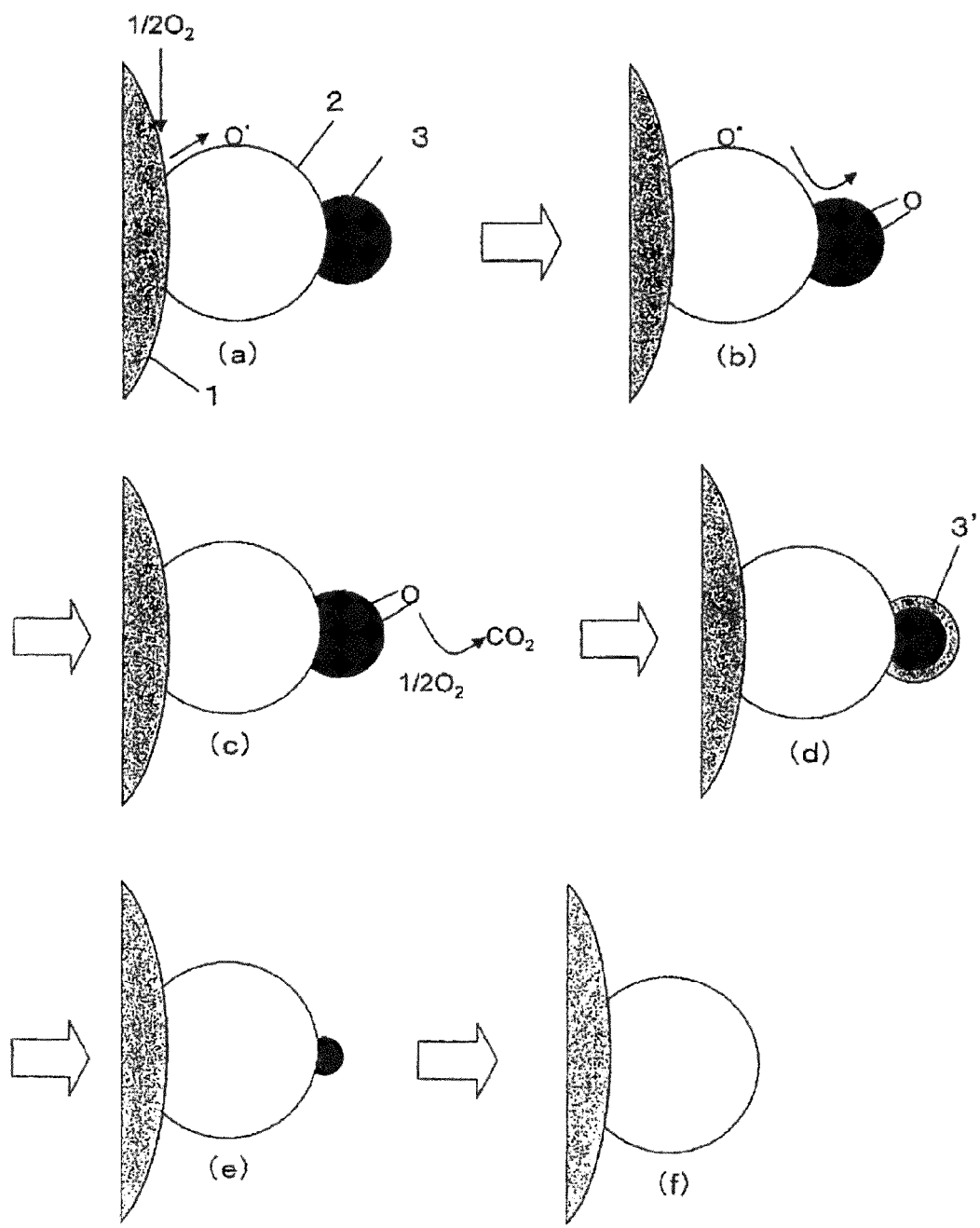
FIG. 1 is a schematic diagram for explaining an action mechanism where a carbon-containing component is oxidized by an oxidation catalyst of the present invention.
Figure 2:
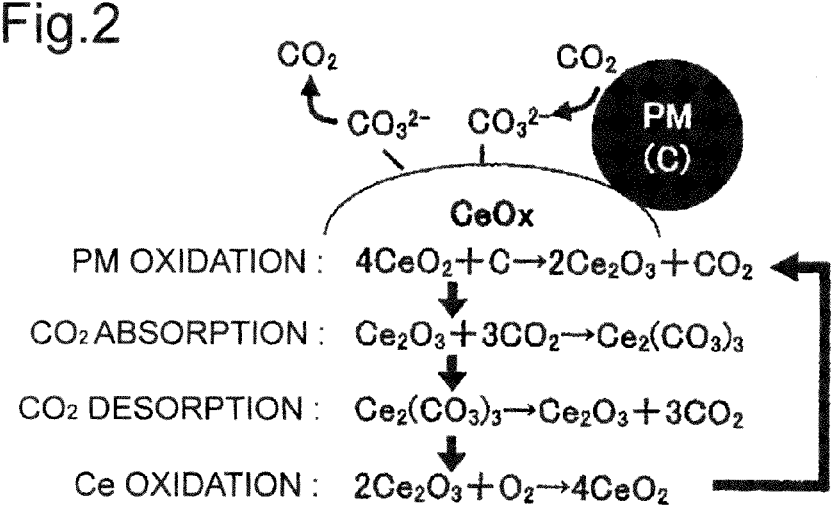
FIG. 2 is a schematic diagram for explaining a reaction mechanism of soot oxidation.

The oxygen-extracting material according to the present invention is a material capable of extracting oxygen. By using this oxygen-extracting material, it is possible to effectively capture oxygen atoms into the reaction system as shown in FIG. 1 (the reaction system for oxidizing a carbon-containing component and the like). This oxygen-extracting material may also function as an oxygen-containing substance capturing material. The above-described oxygen-extracting material is not particularly limited as long as the material is capable of extracting the oxygen from an oxygen-containing substance, but is preferably the one in which a bonding with an oxygen atom is not too strong. If the bonding with the oxygen atom is too strong, the material cannot supply oxygen reactive species to an oxygen-reactive-species transporting material and therefore cannot achieve a function as a catalyst. When such a material is applied, there is a tendency that it is possible to promote oxidation by supplying a large amount of the oxygen reactive species to a carbon-containing component or a component such as HC, CO or NO through the oxygen-reactive-species transporting material at a lower temperature.

The above-described oxygen-extracting material preferably is at least one substance selected from the group consisting of Ag, Pt, Rh, Pd, Ru, Ir, Au, Cu, Pb, Mn, and Sr. Among these oxygen-extracting materials, Ag, Pt, Au, and Pd belong to the IA group or IB group on the periodic table have a good balance between the extracting property of oxygen from the oxygen-containing substance and the bonding property with the oxygen atoms, and can therefore be used suitably.

Moreover, it is particularly preferable that the above-described oxygen-extracting material contain Ag. Further, when the oxygen-extracting material according to the present invention contains any components other than Ag, it is preferable that the content percentage of Ag be equal to or above 0.3% by mass.

Particle diameters of the oxygen-extracting particles made of the above-described oxygen-extracting material are not particularly limited. However, it is preferable that an average particle diameter thereof after calcinating for 5 hours at 500° C. in air be in a range from 10 to 100 nm (more preferably in a range from 10 to 50 nm). It is preferable that the average particle diameter thereof after calcinating for 5 hours at 800° C. in an atmosphere containing oxygen at 10% by volume and nitrogen at 90% by volume be in a range from 10 to 400 nm (more preferably in a range from 10 to 80 nm). If the average particle diameter of the oxygen-extracting particles falls below the above-mentioned lower limit, transfer of the oxygen reactive species generated by the oxygen-extracting material to the oxygen-reactive-species transporting material tends to be inhibited. On the other hand, if the average particle diameter exceeds the above-mentioned upper limits, the oxygen-extracting particles tend to be surrounded insufficiently by the oxygen-reactive-species transporting particles.

A second metal constituting the second metal oxide particulates according to the present invention is preferably a valence variable metal (such as a metal that changes valence as a reductant of the first metal element that forms a core in an aqueous solution) from the viewpoint that the metal can act as a reductant more easily on the first metal or the compound thereof by means of the above-mentioned reduction reaction. It is more preferable that a second metal oxide constituting the second metal oxide particulates is at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof. It is particularly preferable that the second metal oxide is at least one substance selected from the group consisting of oxides of Fe, Ce, Mn, Mo, Cr, and V, solid solutions thereof, and composite oxides thereof. Alternatively, the second metal oxide according to the present invention may be configured to change the valence by alternately switching between an oxygen atmosphere and a hydrogen atmosphere at a temperature equal to or below 1000° C.

It is preferable that the second metal oxide particulates according to the present invention be the oxygen-reactive-species transporting particles made of the oxygen-reactive-species transporting material capable of transporting the oxygen reactive species generated by the oxygen-extracting material.

The oxygen-reactive-species transporting material according to the present invention is a material which can transport the oxygen reactive species (such as oxygen ions) by way of the change in valence of the material, for example. When receiving the oxygen reactive species from the oxygen-extracting material by using this material, the oxygen reactive species can migrate through the oxygen-reactive-species transporting material and can reach the carbon-containing component or the component such as HC, CO or NO. Such a pathway to transport the oxygen reactive species does not have to penetrate bulk of the oxygen-reactive-species transporting material. It is only necessary that the oxygen reactive species can migrate on a surface of the oxygen-reactive-species transporting material, for example. In the case of oxidizing the carbon-containing component, a contact region between the carbon-containing component and the oxygen-reactive-species transporting material is preferentially oxidized if oxidizing power of the oxygen reactive species is too strong, whereby a state of contact between the two is lost and a gap is generated. Accordingly, it is difficult to oxidize the carbon-containing component completely. Therefore, it is preferable that the oxygen reactive species have a moderate oxidizing power, i.e. that the oxygen reactive species do not react immediately with the carbon-containing component so that the oxygen reactive species can migrate on the carbon-containing component.

Although it is not particularly limited, the oxygen reactive species transporting material preferably is at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof, and more preferably is at least one substance selected from the group consisting of $CeO_2$, $Fe_2O_3$, $ZrO_2$, $Y_2O_3$, $TiO_2$, $Al_2O_3$, MgO, $CO_3O_4$, solid solutions thereof, and composite oxides thereof. Among them, a composite oxide containing $CeO_2$ and Ce is particularly preferable. Further, the oxygen-reactive-species transporting material preferably has a certain amount of defects for transporting the oxygen reactive species. When the oxygen-reactive-species transporting material is the composite oxide containing $CeO_2$ and Ce, it is more preferable to further contain at least one substance selected from the group consisting of La, Nd, Pr, Sm, Y, Ca, Ti, Fe, Zr, and Al (particularly preferably La and/or Nd) as an additive metal in order to enhance mobility of the oxygen reactive species and to prevent ensurly coarsening of $CeO_2$ particles or composite oxide particles containing Ce. Here, when such an additive component is contained, the content of the additive component is preferably in a range from 1 to 30 mol %, and more preferably in a range from 5 to 20 mol %, relative to a total amount of Ce and the additive component.

Particle diameters of the oxygen-reactive-species transporting particles made of the above-described oxygen-reactive-species transporting material are not particularly limited. However, it is preferable that an average particle diameter thereof after calcinating for 5 hours at 500° C. in air be in a range from 1 to 75 nm (more preferably in a range from 8 to 20 nm and even more preferably in a range from 8 to 15 nm). Further, it is preferable that the average particle diameter thereof after calcinating for 5 hours at 800° C. in an atmosphere containing oxygen at 10% by volume and nitrogen at 90% by volume be in a range from 8 to 100 nm (more preferably in a range from 8 to 60 nm and even more preferably in a range from 8 to 40 nm). If the average particle diameter of the oxygen-reactive-species transporting particles falls below the above-mentioned lower limit, the contact with the carbon-containing component such as soot tends to inhibited. On the other hand, if the average particle diameter exceeds the above-mentioned upper limit, the oxygen-extracting particles tend to be surrounded insufficiently.

In an oxidation catalyst of the present invention, it is preferable that the average primary particle diameter of the oxygen-extracting particles be at least 1.3 times greater, and more preferably at least 2.0 times greater than the average particle diameter of the oxygen-reactive-species transporting particles after calcinating for 5 hours at 500° C. in air as well as after calcinating for 5 hours at 800° C. in an atmosphere containing oxygen at 10% by volume and nitrogen at 90% by volume. If the average particle diameters of the oxygen-extracting particles and oxygen-reactive-species transporting particles do not satisfy this condition, the performance to oxidize the carbon-containing component or the component such as HC, CO or NO tends to be degraded.

The composite material of the present invention is formed by surrounding the first metal particle with the second metal oxide particulates. A proportion between the first metal particles and the second metal oxide particulates is not particularly limited. However, the proportion (a molar ratio) between the principal metal constituting the first metal particles and the principal metal constituting the second metal oxide particulates is preferably in a range from 10:90 to 80:20, more preferably in a range from 30:70 to 60:40, and particularly preferably in a range from 35:65 to 60:40. If the amount of the first metal particles falls below this lower limit, an amount of the oxygen reactive species to be extracted from the gas phase is reduced whereby the performance to oxidize the carbon-containing component or the component such as HC, CO or NO tends to be degraded. On the other hand, if the amount of the second metal oxide particulates falls below this lower limit, an amount of the oxygen reactive species capable of migrating to the carbon-containing component or the component such as HC, CO or NO is reduced whereby the performance to oxidize the carbon-containing component tends to be degraded. Moreover, when the ratio is in the range from 35:65 to 60:40, it is particularly preferable because the second metal oxide particulates can easily surround the first metal particles and proportions of both of the components not forming those aggregates are reduced.

An average particle diameter of the above-described composite material of the present invention, which is an aggregate formed by surrounding the first metal particle with the second metal particulates, is not particularly limited, but is preferably in a range from 0.05 to 0.5 µm and more preferably in a range from 0.07 to 0.2 μm. When the second metal oxide particulates are the oxygen-reactive-species transporting particles, the contact between the oxygen-containing substance and the oxygen-extracting particles tends to be inhibited if the average particle diameter falls below this lower limit. On the other hand, the contact between the oxygen-reactive-species transporting material and the carbon-containing component and the like tends to be inhibited in the case of exceeding this upper limit.

It is preferable that the composite material of the present invention have high dispersibility and that a portion equal to or above 60% by volume of all the aggregates have particle diameters in a range within ±50% away from the average particle diameter. When the composite material of the present invention has high dispersibility as described above, the performance to oxidize the carbon-containing components is further improved and the composite material is more likely to be supported uniformly on a support such as DPF.

Further, the composite material of the present invention may further comprise third metal ultrafine particles supported on surfaces of the second metal oxide particulates. When the third metal ultrafine particles are present, the oxygen reactive species tends to be supplied to the carbon-containing component or the component such as HC, CO or NO more easily in the case where the second metal oxide particulates are the oxygen-reactive-species transporting particles.

A third metal constituting the third metal ultrafine particles is preferably a substance having a lower ionization tendency than that of H (such as Au, Pt, Pd, Rh, Ru, Ag, Hg, Cu, Bi, Sb, Ir or Os), and more preferably a substance having a lower ionization tendency than that of Ag (noble metal: such as Au, Ag, Cu, Pt, Pd, Rh, Ru, Ir or Os). It is particularly preferable that the third metal be identical to the first metal constituting the first metal particle. Moreover, the third metal ultrafine particle preferably contains 1 to 1000 pieces of atoms.

In the composite material of the present invention, the second metal oxide particulates that surround the first metal particle may form the aggregate while generating cracks on a surface thereof. Moreover, although the shape of the composite material is not particularly limited, the aggregate is formed preferably in a spherical shape.

Next, a method of manufacturing a composite material of the present invention will be described. The method of manufacturing a composite material of the present invention comprises the steps of generating an aggregate precursor out of a solution containing a first metal salt and a second metal salt such that a first metal particle derived from the first metal salt is surrounded by second metal compound particulates derived from the second metal salt, and obtaining a composite material comprising an aggregate which contains the first metal particle constituting a core and second metal oxide particulates surrounding the first metal particle and having an average primary particle diameter ranging from 1 to 100 nm, by calcinating the obtained aggregate precursor.

The first metal salt according to the present invention is preferably a salt of metal having an ionization tendency equal to or lower than that of Zn, and more preferably is a salt of at least one metal selected from the group consisting of Ag, Pt, Rh, Pd, Ru, Ir, Os, Au, and Cu.

In the first metal salt according to the present invention, a first metal forming the salt is preferably a component constituting the above-described oxygen-extracting material. The first metal salt may contain a salt of at least one metal selected from the group of Ag, Pt, Rh, Pd, Ru, Ir, Au, Cu, Pb, Mn, and Sr, for example. Among these metal salts, it is preferable to use one containing Ag. Moreover, examples of the first metal salt include a water-soluble salt such as a nitrate, an acetate, a chloride, a sulfate or a sulfite, or an inorganic complex salt of the above-mentioned metal. Among them, a nitrate (such as silver nitrate) is used suitably.

The second metal salt according to the present invention is preferably a salt of a valence variable metal, and more preferably a salt of at least one metal selected from the group consisting of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V.

In the second metal salt according to the present invention, a second metal forming the salt or a compound thereof is preferably a component forming the above-described oxygen-reactive-species transporting material by a calcination described later. The second metal salt is more preferably a salt of at least one metal selected from the group of Ce, Fe, Zr, Y, Ti, Al, Mg, and Co. Among them, it is particularly preferable the second metal salt contains a salt of Ce and a salt of at least one additive metal selected from the group consisting of La, Nd, Pr, Sm, Y, Ca, Ti, Fe, Zr, and Al. Moreover, examples of the second metal salt include a water-soluble salt such as a nitrate, an acetate, a chloride, a sulfate, a sulfite, or an inorganic complex salt of the above-mentioned metal. Among them, a nitrate (such as cerium nitrate) is used suitably.

In the method of manufacturing a composite material of the present invention, it is possible to control the particle diameters of the aggregates by containing the salt of the additive metal. Here, although the reason is not exactly known, the present inventors speculate as follows. When a $CeO_2$—Ag based aggregate is taken as an example, substances involved in oxidation-reduction reaction are the metal Ag to be reduced and Ce functioning as a reductant. Therefore, the additive metal added thereto is not involved in the oxidation-reduction reaction. For this reason, a molar ratio of Ce:Ag is usually around 1:1 even in the case of adding La, for example. Such additive metal forms a metal oxide precursor simultaneously when the second metal salt generates a second metal compound (a metal oxide precursor). From these speculation, the present inventors conclude that the particle diameters of the aggregates are controlled by the additive metal when the additive metal forms part of the aggregates since the additive metal is mixed with the second metal compound even through the additive metal is not involved in the oxidation-reduction reaction whereas the second metal compound is involved in the reaction. Here, the additive metal tends to have a larger effect to change the particle diameters of the aggregates when the atomic number thereof is further away from that of the second metal.

As for another means for controlling the particle diameter of the aggregate, it is also possible to adopt appropriate adjustments of a concentration of a solution, an agitation condition, and the like during the process of generating the aggregate precursor. The particle diameter of the aggregate tends to become smaller when the solution has a lower concentration and is agitated more evenly.

In addition, a solvent used for preparing a solution containing the first metal salt and the second metal salt is not particularly limited. However, examples of the solvents include water, alcohol (such as a single of methanol, ethanol or ethylenglycol, or a mixed solvent thereof), and water is particularly preferable.

Here, blending amounts (fed amounts) of the first metal salt and the second metal salt do not have to correspond completely to the proportion between the first metal particles and the second metal oxide particulates to be obtained. The conditions of the combination and the blending amounts of the first metal salt and the second metal salt are appropriately set up depending on suitable conditions of the combination and the proportion of the first metal particles and the second metal oxide particulates in the composite material to be obtained. Further, by allowing the first metal salt to exist in an excessive amount relative to the second metal salt, all the second metal oxide particles generated in the solution tend to form part of the aggregates easily. This is preferable because a component other than the aggregates is not generated in the solution.

In the method of manufacturing a composite material of the present invention, it is preferable to generate the aggregate precursor by generating the second metal compound particulates under presence of a pH adjuster and depositing the first metal particles by use of a reducing action of the second metal compound particulates in the step of generating the aggregate precursor.

The reason for causing oxidation-reduction reaction can be explained by electric potentials of the first metal and the second metal used. However, the electric potential has a pH dependency. In general, the potential becomes lower as the pH becomes higher. Therefore, in the method of manufacturing a composite material of the present invention, it is preferable to control the oxidation-reduction reaction by adding the pH adjuster as appropriate. Moreover, activation energy is also changed by adding the pH adjuster. Accordingly, it is possible to control the oxidation-reduction reaction optimally. The exemplified pH adjusters are NaOH, KOH, $NH_3$, $HNO_3$ or $H_2SO_4$. However, it is only necessary to use ordinary acids and alkalis.

When the first metal is Ag, for example, the reaction progresses too fast due to high potential on an acidic side, and thereby a coarse Ag particle tends to be deposited. Accordingly, it is preferable to establish alkalinity of the solution under presence of a base. Here, precipitation is caused if NaOH is used as the adjuster. Therefore, it is preferable to establish alkalinity of the solution by use of ammonia. In this case, ammonia also functions as a complexing agent. The concentration of the base is not particularly limited. However, when using ammonia as the base, it is generally preferable to use a solvent having the ammonia concentration in a range of about 1 to 50%. Moreover, the second metal compound particulates in this case are thought to be a hydroxide of the second metal.

In the method of manufacturing a composite material of the present invention, it is preferable to generate a first metal compound derived from the first metal salt under presence of a complexing agent and to deposit the first metal particle by reducing the first metal compound by way of the reducing action of the second metal compound particulates in the step of generating the aggregate precursor.

To achieve optimum condition of the oxidation-reduction reaction, it is preferable to add the pH adjuster as described previously. However, the metal salt in particular may generate a deposition depending on the pH. Therefore, even under the condition to cause generation of the deposition when not using the complexing agent, it is possible to maintain the state of the metal salt by adding the complexing agent. Since the electric potential or the activation energy is also changed by this operation, it is possible to adjust the condition as appropriate. For example, in the case of the $CeO_2$—Ag based aggregate, it is preferable to use Ag in the form of $[Ag(NH_3)_2]^+$. Examples of the complexing agent include ammonia, alkaline salts of organic acids (such as glycolic acid, citric acid or tartaric acid), thioglycolic acid, hydrazine, triethanolamine, ethylenediamine, glycine, pyridine or cyanides.

Further, in the method of manufacturing a composite material of the present invention, it is preferable to regulate temperature in the step of generating the aggregate precursor. A temperature condition of the reaction solution is an important factor for controlling the oxidation-reduction reaction. It is preferable to regulate the temperature of the solution within a range where the solvent functions in a liquid state. For example, in the case of the $CeO_2$—Ag based aggregate, the temperature is set preferably equal to or above 30° C., and more preferably equal to or above 60° C. As will be described later in examples, it is likely that a reaction can proceed reliably by setting a condition from about 100° C. to 150° C. at 1 to 3 atm. This condition is also preferable in light of industrial application because reaction time can be shortened as well.

Here, in the step of generating the aggregate precursor, it is possible to apply either a so-called "precipitation method" wherein a pH adjuster-containing solution (such as a basic solution) is added and mixed to a solution of the above-described metal salt or a so-called "reverse precipitation method" wherein the solution of the above-described metal salt is added and mixed to the pH adjuster-containing solution (such as the basic solution). In this case, it is possible to add and mix sequentially in the order of the first metal salt and the second salt or in the reverse order. Although the reaction time is not particularly limited, it is possible to generate the aggregate preferably over a period of about 0.1 to 24 hours, and more preferably over a period of about 0.1 to 3 hours. Alternatively, in the case of using the complexing agent, it is also possible to carry out the above-described operation after forming the metal salt by use of the complexing agent in advance.

A solid content concentration of the reaction solution in the step of generating the aggregate precursor is not particularly limited. However, the concentration is preferably in a range from 1% by mass to 50% by mass, more preferably in a range from 10% by mass to 40% by mass, and even more preferably in a range from 15% by mass to 30% by mass. The effect to promote the aggregation process tends to be decrease if the solid content concentration falls below this lower limit. On the other hand, the aggregate containing the first metal particle as the core tends to be obtained hardly in the case of exceeding this upper limit.

In the present invention, it is possible to effectively and surely obtain the aggregate precursor where the first metal particle is surrounded by the second metal compound particles, by carrying out the aggregation process as described above.

In the present invention, the average particle diameter of the above-described aggregate precursors is not particularly limited, but is preferably in a range from 0.05 to 0.5 µm, and more preferably in a range from 0.07 µm to 0.2 µm. Moreover, it is preferable that the aggregate precursors have high dispersibility and that a portion equal to or above 60% by volume of all the aggregates have particle diameters in a range within ±50% away from the average particle diameter. When the aggregate precursors have high dispersibility as described above, the obtained composite material of the present invention has high dispersibility whereby the composite material is more likely to be supported uniformly on a support such as DPF.

Further, in the present invention, it is possible to obtain the above-described composite material of the present invention by cleaning when appropriate and then calcinating the aggregate precursors that are obtained by this aggregation process. Although conditions of such a calcinating process are not particularly limited, it is generally preferable to perform calcinating for about 1 to 5 hours at a temperature from 300° C. to 600° C. in an oxidizing atmosphere (such as air).

Moreover, the method of manufacturing a composite material of the present invention may further comprise the step of allowing third metal ultrafine particles to be supported on surfaces of the second metal compound particulates or the second metal oxide particulates. The exemplified methods of allowing the third metal ultrafine particles to be supported thereon are (i) a method of allowing the third metal ultrafine particles to be supported on the surfaces of the second metal oxide particulates after calcinating the aggregate precursor obtained by the aggregation process, and (ii) a method of depositing the third metal ultrafine particles on the surfaces of the second metal compound particulates simultaneously with the aggregation process.

In the method (i), it is possible to adopt a so-called impregnation-supporting method by use of a nitrate, a sulfate, an acetate or an ammonium salt of the third metal, or a method of utilizing oxidation-reduction reaction on the surfaces of the metal oxide. The former impregnation-supporting method is a typical method of supporting metal ultrafine particles used for obtaining a catalyst and the like.

On the other hand, the latter method is a method of depositing the metal ultrafine particles by reducing $Ag^+$, for example, on a defect site (such as a portion where $CeO_2$ is partially replaced by $Ce^{3+}$) in the second metal oxide particulate. In this case, it is preferable to add a complexing agent as appropriate in order to control the particle diameters of the metal ultrafine particles by controlling a deposition reaction rate. For example, oxidation-reduction potential is changed and the deposition rate is reduced when $[Ag(NH_3)_2]^+$ is generated by dripping ammonia water onto $AgNO_3$, whereby finer metal ultrafine particles tend to be obtained.

Meanwhile, the method (ii) utilizes the oxidation-reduction reaction in the above-described aggregation process and is therefore a particularly preferable method when the third metal is identical to the first metal. According to this method, the first metal is deposited by the second metal compound particulates and the third metal ultrafine particles are also deposited on the surfaces of the second metal compound particulates at the same time in the step of generating the above-described aggregate precursors.

Next, a composite material substrate of the present invention will be described. A composite material substrate of the present invention comprises a substrate and the composite material of the present invention.

The substrate used herein is not particularly limited and is selected appropriately as usage or the like of the composite material substrate to be obtained. However, a DPF substrate, a monolithic substrate, a pelletized substrate, a platy substrate, a foamed ceramic substrate, and the like are applied suitably. Moreover, a material of the substrate is not particularly limited. However, a substrate made of a ceramic such as cordierite, silicon carbide or mullite and a substrate made of metal such as stainless steel containing chromium and aluminum is applied suitably.

An amount of the composite material to be attached to the substrate in the composite material substrate of the present invention is not particularly limited and is appropriately adjusted as the usage of the composite material substrate to be obtained. However, the amount of the composite material is preferably in a range from about 10 to 300 g relative to 1 liter of the volume of the substrate. Here, it is also possible to, for example, pelletize the composite material of the present invention prior to use. Moreover, in the composite material substrate of the present invention, it is preferable that the substrate has pores ranging from 1 to 300 μm and that a coating layer having an average thickness equivalent to 0.5 to 50 times as large as the average particle diameter of the aggregate be formed inside the pores by use of the composite material. This composite material substrate of the present invention is extremely useful as a substrate for exhaust gas purification or the like.

Next, a composite material dispersed fluid of the present invention and a manufacturing method thereof will be described. A first composite material dispersed fluid of the present invention contains the composite material of the present invention and a dispersion medium. It is preferable that this first composite material dispersed fluid further contain a binder. The binder used herein is not particularly limited, and ceria sol is used preferably, for example. Moreover, a mixing ratio between the composite material and the binder is not particular limited, and it is preferable that the mixing ratio between the composite material and the binder is in a range from about 99:1 to 80:20 by weight. In the case of the $CeO_2$—Ag based aggregate, for example, it is possible to obtain a dispersed fluid (slurry) having high dispersibility easily by an ultrasonic treatment even in the case of using the binder.

A second composite material dispersed fluid of the present invention contains the aggregate precursor obtained in the process of the method of manufacturing a composite material of the present invention, and a dispersion medium. This second composite material dispersed fluid preferably contains the aggregate precursor obtained by removing 50 to 99.9% of residual ions in a system from a solution containing the aggregate precursor which is obtained in the process of the method of manufacturing a composite material of the present invention. Although there is a certain degree of dispersibility even in the aggregating stage, it is possible to obtain a dispersed fluid having extremely high dispersibility by removing residual ions attributable to the salt and the complexing agent.

Next, a method of manufacturing a composite material substrate of the present invention will be described. A first method of manufacturing a composite material substrate of the present invention is a method of obtaining a composite material substrate by calcinating the first composite material dispersed fluid after causing the fluid to contact a substrate. Meanwhile, a second method of manufacturing a composite material substrate of the present invention is a method of obtaining a composite material substrate by calcinating the second composite material dispersed fluid after causing the fluid to contact a substrate.

Here, the method of causing the first or second composite material dispersed fluid to contact the substrate is not particularly limited. However, it is preferable to cause the contact while applying ultrasonic waves when allowing the fluid to penetrate the pores in a filter substrate such as DPF. Moreover, it is preferable that the calcinating condition in this case be similar to the calcinating condition described previously.

Moreover, according to the second method of manufacturing a composite material substrate of the present invention, the aggregate per se functions as the component that can oxidize the carbon-containing component such as soot or the component such as HC, CO or NO, and the aggregate plays the role as a binder. As a consequence, it is possible to provide the more efficient composite material substrate. Here, the method of obtaining the substrate by calcinating after allowing the substrate to contact the second composite material dispersed fluid is applicable not only to the aggregate obtained in the process of obtaining the above-described composite material but also to a case of obtaining other substrates. Specifically, the aggregate may consist of particles of a single type as long as the aggregate plays the role as a binder. In this case, it is preferable that the aggregate have high dispersibility in order to obtain the uniform coating layer. Meanwhile, it is preferable to provide small particle diameters in order to achieve thin-layer coating. In addition, in order to obtain a finer coating layer, it is preferable to suppress decomposition of by-products (such as ammonium nitrate) derived from the residual ions by means of removing the residual ions out of the system.

EXAMPLES

The present invention will be described below more concretely based on Examples and Comparative Examples. However, the present invention will not be limited only to the following Examples.

Although the composite materials made of $CeO_2$ and Ag are obtained in the following Examples, it is possible to select a different combination of materials that constitute a composite material in order to obtain such a desired composite material based on the concept to be described below, for example.

Specifically, metal oxides containing valence variable elements and precursors thereof are firstly sorted out depending on usages. For example, when selecting $CeO_2$ for use in the oxidation catalyst as in the Examples, reduction potential of $Ce(OH)_3$ serving as the precursor of $CeO_2$ is grasped. Moreover, types of the metal are selected in response to the usages. Concerning the metal, deposition potential thereof is easily acquired from various documents. Here, it is preferable to select metals that can promote oxidation-reduction reaction in light of relations with the potential of the metal oxide precursors. Further, a certain metal is selected from the metals depending on the usage. In the case of a metal having a high ionization tendency, it is also necessary to consider a possibility of a change into an oxide due to a thermal treatment or the like. For the usage as the oxidation catalyst as shown in the Examples, it is preferable to select a noble metal in order to extract oxygen functioning as the oxidant. Although Ag is selected from the viewpoint of costs in the Examples because it is cheaper than Pt and Au, the present invention is not limited thereto.

Moreover, it is preferable to control the oxidation-reduction reaction in order to achieve a desired aspect. For example, it is possible to add the above-described pH adjuster as appropriate because the deposition potential of the metal applicable to the metal oxide precursor (the reductant) and the metal salt (the oxidant) vary depending on the pH. For example, the potential is high on the acidic side in the case of Ag and the reaction progresses too fast. Accordingly, coarse Ag tends to be deposited. Therefore, it is preferable to adjust the pH to the alkali side. Here, deposition is caused if NaOH is used as the pH adjuster for establishing alkalinity. Therefore, it is preferable to establish alkalinity by use of ammonia. In this case, ammonia also functions as the complexing agent.

Figure 3:
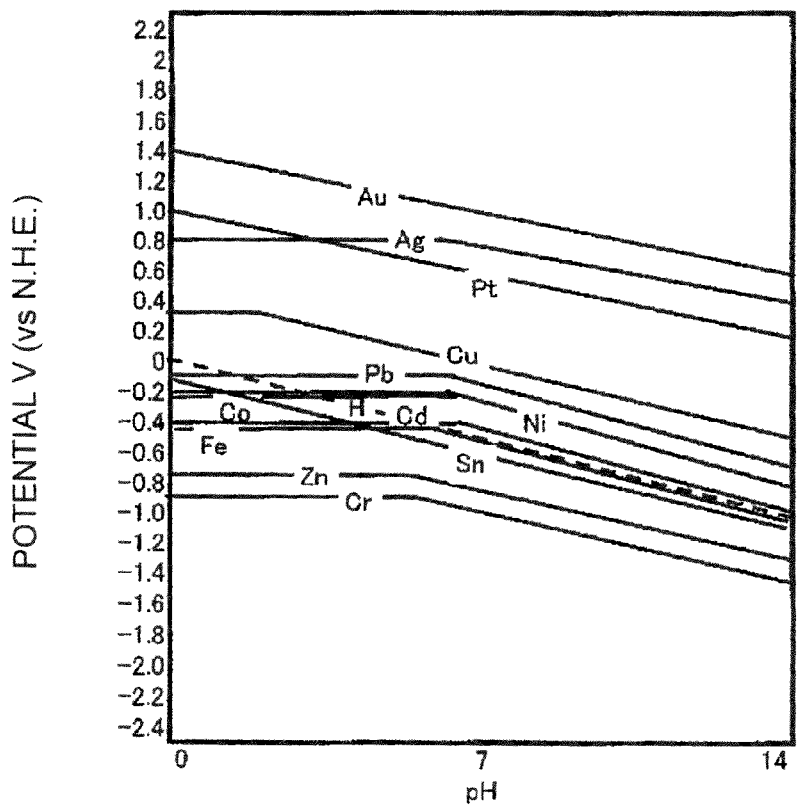
FIG. 3 is a graph showing relations between potential of metal salts and pH.
Figure 4:
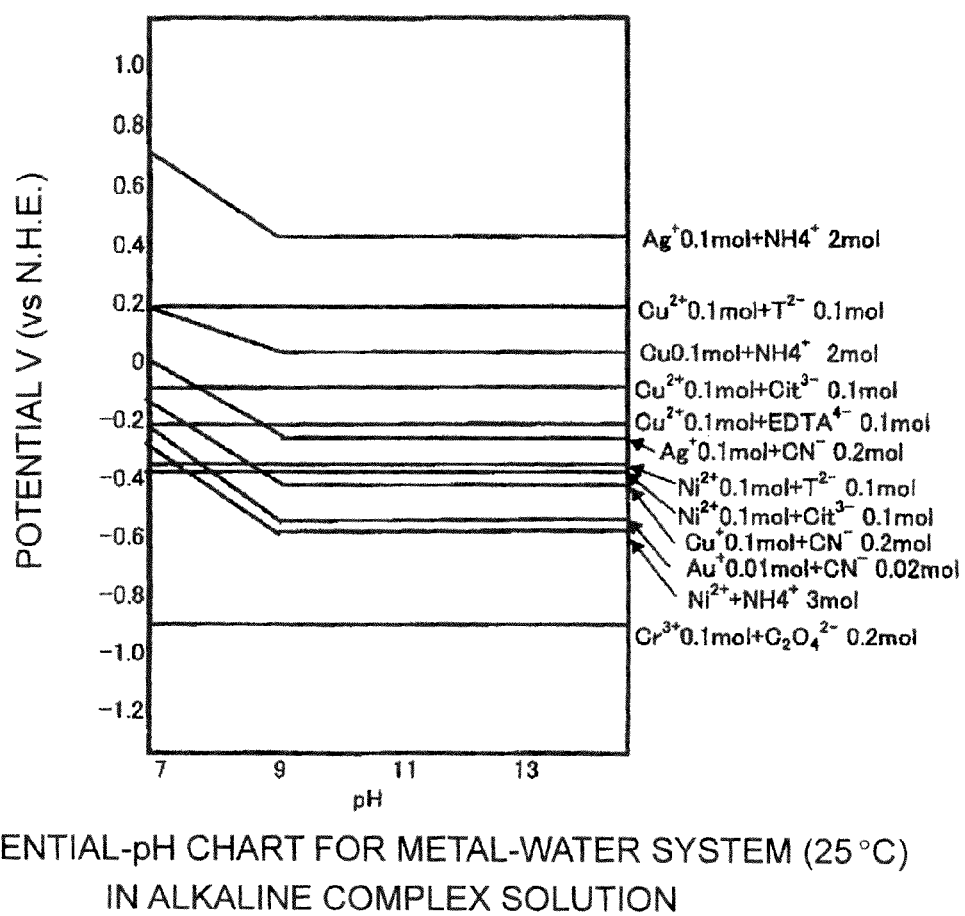
FIG. 4 is a graph showing relations between potential of metal salts and pH.

Examples of relations between the potential of metal salts and the pH are shown in FIG. 3 and FIG. 4. The following are some examples of normal electrode potential usable as the reductant in the present invention:

| | |
|---|---|
| $Fe(OH)_3 + e^- = Fe(OH)_2 + OH^-$ | −0.556 V |
| $Ni(OH)_3 + e^- = Ni(OH)_2 + OH^-$ | 0.48 V |
| $2MnO_2 + H_2O + 2e^- = Mn_2O_3 + 2OH^-$ | 0.15 V |
| $MoO_4 + 4H^+ + 4e^- = MoO_2 + 2H_2O$ | 0.861 V |

Moreover, the following Examples apply cerium nitrate hexahydrate as a Ce raw material, silver nitrate as an Ag raw material, lanthanum nitrate hexahydrate as a La raw material, neodymium nitrate hexahydrate as a Nd raw material, praseodymium nitrate hexahydrate as a Pr raw material, iron nitrate nonahydrate as a Fe raw material, zirconium nitrate dehydrate as a Zr raw material, and aluminum nitrate nonahydrate as an Al raw material, respectively.

Here, obtained compositions are expressed by use of molar percentage of Ag relative to (Ce+Ag) at the stage of preparing nitrate solutions. For example, a composition obtained by preparing a nitrate solution so as to render Ag equal to 60 mol % is expressed as "$CeO_2$—Ag60" (or "Ce—Ag60"). Meanwhile, a case of producing the composition by blending ammonia water while agitating a nitrate solution is indicated as "precipitation" and a case of producing the composition by blending the nitrate solution while agitating ammonia water is indicated as "inverse precipitation".

Examples 1 to 12

Nitrate solutions containing Ce and Ag were prepared by setting content percentages (mol %) of Ag relative to a total amount of Ce and Ag to 25 mol % (Example 1), 30 mol % (Example 2), 35 mol % (Example 3), 40 mol % (Example 4), 45 mol % (Example 5), 50 mol % (Example 6), 55 mol % (Example 7), 60 mol % (Example 8), 65 mol % (Example 9), 70 mol % (Example 10), 75 mol % (Example 11), and 80 mol % (Example 12), respectively. For instance, in Example 8, a solution was prepared by dissolving 50.49 g of $Ce(NO_3)_3.6H_2O$ and 29.63 g of $AgNO_3$ into 120 mL of water. Next, ammonia water containing an amount of $NH_3$ necessary for precipitating the nitrates was prepared. For instance, in Example 8, ammonia water was prepared by diluting 35.6 g of 25 percent ammonia water with 100 g of water. Then, the nitrate solution was blended while agitating the ammonia water (inverse precipitation) or, alternatively, the ammonia water was blended while agitating the nitrate solution (precipitation). In each case, agitation was continued for 10 minutes and then an aggregation process was conducted under presence of water in a closed system for 2 hours while heating up to 120° C. at a pressure of 2 atm. Thereafter, obtained depositions (the aggregate precursors) were subject to calcinating for 5 hours at 500° C. in air to prepare $CeO_2$—Ag compositions (the composite materials) made of Ag and ceria.

Comparative Examples 1 to 3

$CeO_2$—Ag compositions were prepared similarly to Example 1 except for setting the content percentages (mol %) of Ag relative to the total amount of Ce and Ag to 10 mol % (Comparative Example 1), 40 mol % (Comparative Example 2) and 60 mol % (Comparative Example 3), and for executing the calcinating process immediately without conducting the aggregation process.

Comparative Examples 4 and 5

In these Comparative Examples, $CeO_2$—Ag compositions were prepared in accordance with a preparation method disclosed in JP 2004-42021 A. Specifically, 0.1M and 0.5M solutions were prepared to satisfy a molar ratio of Ce:Ag=25: 75. After impregnating a cellulose material (Whatman (registered trademark) Filter Paper 540) with the solutions, the cellulose material was incinerated and removed by spending 2 hours at 600° C.

<Evaluation of Ag Content Percentages in $CeO_2$—Ag Compositions>

Content percentages of Ag in the $CeO_2$—Ag compositions obtained in Examples 1 to 12 and Comparative Examples 1 to 3 were analyzed in accordance with the ICP emission spectrometry. Some features of obtained results are shown in Table 1.

As apparent from the results shown in Table 1, in the case when the content percentage of Ag relative to the total amount of Ce and Ag in the $CeO_2$—Ag composition was 40% mol or below, the content of Ag became almost equal to the composition in the nitrate solution. However, it was confirmed that the content percentage of Ag became lower than the composition in the nitrate solution when the content percentage of Ag became more than 40% mol. For instance, Ag in the $CeO_2$—Ag composition accounted for 49.1 mol % in the case of preparing the nitrate solution in Example 7 while setting Ag equal to 55 mol %, Ag in the $CeO_2$—Ag composition accounted for 50.2 mol % (inverse precipitation) or 48.9 mol % (precipitation) in the case of preparing the nitrate solution in Example 8 while setting Ag equal to 60 mol %, and Ag in the $CeO_2$—Ag composition accounted for 53.8 mol % in the case of preparing the nitrate solution in Example 12 while setting Ag equal to 80 mol %.

On the contrary, Ag in the $CeO_2$—Ag composition accounted for 33.8 mol % (inverse precipitation) or 36.1 mol % (precipitation) in the case of preparing the nitrate solution in Comparative Example 3 while setting Ag equal to 60 mol %, and thus smaller uptake amounts of Ag into the $CeO_2$—Ag composition were confirmed.

TABLE 1

| Nominal composition (method) | Analysis result Ag (mol %) |
|---|---|
| $CeO_2$—Ag25 (inverse precipitation with aggregation process) | 24.9 |
| $CeO_2$—Ag35 (inverse precipitation with aggregation process) | 35.7 |
| $CeO_2$—Ag40 (inverse precipitation with aggregation process) | 40.5 |
| $CeO_2$—Ag55 (inverse precipitation with aggregation process) | 49.1 |
| $CeO_2$—Ag60 (inverse precipitation with aggregation process) | 50.2 |
| $CeO_2$—Ag65 (inverse precipitation with aggregation process) | 51.3 |
| $CeO_2$—Ag70 (inverse precipitation with aggregation process) | 53.0 |
| $CeO_2$—Ag80 (inverse precipitation with aggregation process) | 53.8 |
| $CeO_2$—Ag10 (precipitation without aggregation process) | 10.2 |
| $CeO_2$—Ag40 (precipitation with aggregation process) | 40.6 |
| $CeO_2$—Ag60 (precipitation with aggregation process) | 48.9 |
| $CeO_2$—Ag60 (inverse precipitation without aggregation process) | 33.8 |
| $CeO_2$—Ag60 (precipitation without aggregation process) | 36.1 |

<Evaluation of $CeO_2$ Particle Diameters and Ag Particle Diameters in $CeO_2$—Ag Compositions>

Particle diameters (average particle diameters) of $CeO_2$ and particle diameters (average particle diameters) of Ag in the $CeO_2$—Ag compositions obtained in Examples 1 to 12 were found by use of XRD. Some features of obtained results are shown in Table 2. Here, concerning the $CeO_2$—Ag composition ($CeO_2$—Ag60) obtained in Example 8, one subjected to calcinating for 5 hours at 800° C. in an atmosphere containing oxygen at 10% by volume and nitrogen at 90% by volume was also measured.

As apparent from the results shown in Table 2, in the case when the content percentage of Ag was equal to or above 30% mol relative to the total amount of Ce and Ag in the $CeO_2$—Ag composition, it was confirmed that ones satisfying conditions that average primary particle diameters of the second metal oxide particulates (the oxygen-reactive-species transporting particles) and the first metal particles (the oxygen-extracting particles) after calcinating for 5 hours at 500° C. in air were in a range from 1 to 75 nm and a range from 10 to 100 nm, respectively, and that the average particle diameter of the first metal particles being at least 1.3 times greater than that of the second metal oxide particulates, were successfully obtained.

TABLE 2

| Material | $CeO_2$ particle diameter (Å) | Ag particle diameter (Å) |
|---|---|---|
| Ce—Ag25 | 119 | 133 |
| Ce—Ag30 | 115 | 265 |
| Ce—Ag35 | 114 | 318 |
| Ce—Ag40 | 116 | 491 |
| Ce—Ag45 | 103 | 354 |
| Ce—Ag50 | 114 | 405 |
| Ce—Ag55 | 109 | 371 |
| Ce—Ag60 | 106 | 289 |
| Ce—Ag60 800° C. 5 h | 411 | 524 |
| Ce—Ag65 | 106 | 238 |
| Ce—Ag70 | 114 | 239 |
| Ce—Ag75 | 111 | 272 |

<Evaluation of Pore Volumes in $CeO_2$—Ag Compositions>

Pore volumes in the $CeO_2$—Ag compositions obtained in Example 8, Comparative Example 3 and Comparative Examples 4 and 5 were found by use of a mercury porosimeter. Obtained results are shown in Table 3.

As apparent from the results shown in Table 3, it was confirmed that the $CeO_2$—Ag composition ($CeO_2$—Ag60) obtained in Example 8 had a larger pore volume than that obtained in Comparative Example 3 and those obtained in accordance with the preparation method disclosed in JP 2004-42021 A in Comparative Examples 4 and 5.

TABLE 3

| | Pore volume (cc/g) |
|---|---|
| $CeO_2$—Ag60 inverse precipitation with aggregation process | 0.2064 |
| $CeO_2$—Ag60 precipitation with aggregation process | 0.1874 |
| $CeO_2$—Ag60 inverse precipitation without aggregation process | 0.1377 |
| $CeO_2$—Ag60 inverse precipitation without aggregation process | 0.0883 |
| $CeO_2$—Ag75 filter 0.1 mol/l | 0.0547 |
| $CeO_2$—Ag75 filter 0.5 mol/l | 0.0475 |

<Evaluation of Pore Size Distribution in $CeO_2$—Ag Compositions>

Pore size distribution in the $CeO_2$—Ag compositions obtained in Example 8, Comparative Example 3 and Comparative Examples 4 and 5 was measured with a mercury porosimeter. Obtained results are shown in FIG. 5 (comparison among Example 8 and Comparative Examples 4 and 5) and FIG. 6 (comparison between Example 8 and Comparative Example 3).

Figure 5:
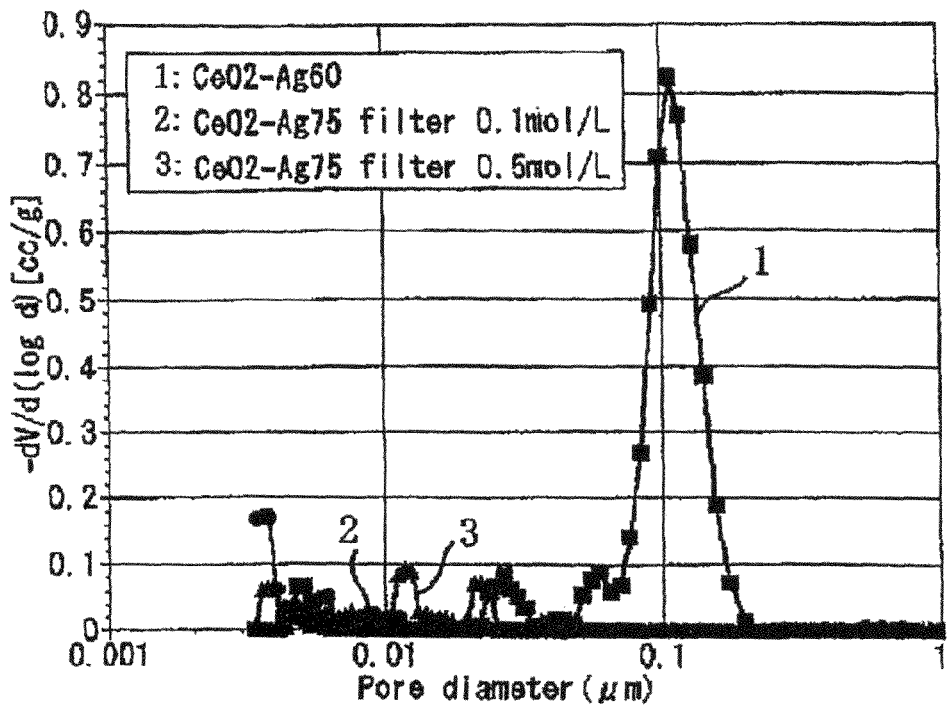
FIG. 5 is a graph showing pore size distribution of $CeO_2$—Ag compositions obtained in Example 8 and Comparative Examples 4 and 5.
Figure 6:
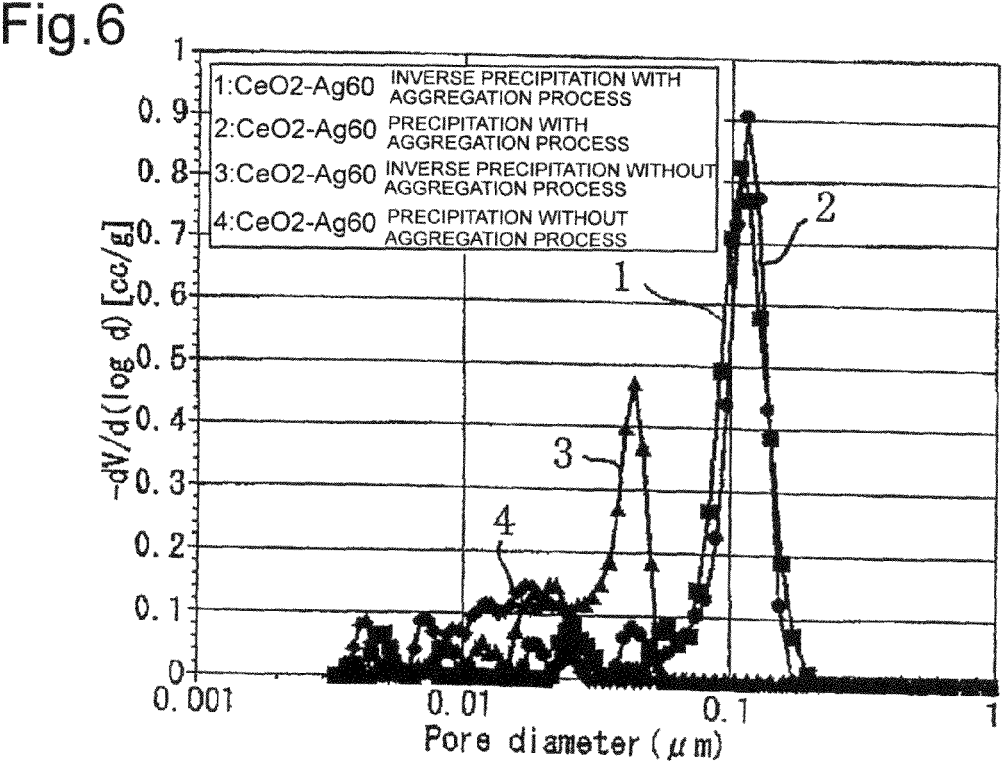
FIG. 6 is a graph showing pore size distribution of $CeO_2$—Ag compositions obtained in Example 8 and Comparative Example 3.

As apparent from the results shown in FIG. 5 and FIG. 6, it was confirmed that the $CeO_2$—Ag composition ($CeO_2$—Ag60) obtained in Example 8 had the pores around 0.1 μm unlike that obtained in Comparative Example 3 and those obtained in Comparative Examples 4 and 5 in accordance with the preparation method disclosed in JP 2004-42021 A, and that the pore size distribution of that obtained in Example 8 had a high uniformity.

<SEM Observation of $CeO_2$—Ag Compositions>

Surface states of the $CeO_2$—Ag compositions obtained in Example 8 and Comparative Example 3 were observed with a SEM (scanning electron microscope). Obtained results are shown in FIG. 7 (Example 8) and FIG. 8 (Comparative Example 3).

Figure 7:
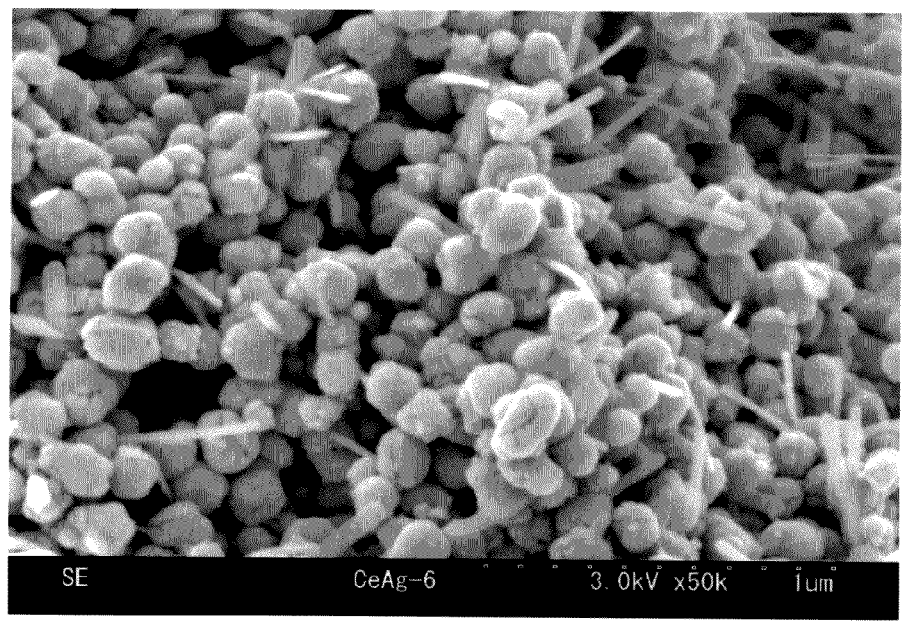
FIG. 7 is a SEM photograph showing a surface state of the $CeO_2$—Ag composition obtained in Example 8.
Figure 8:
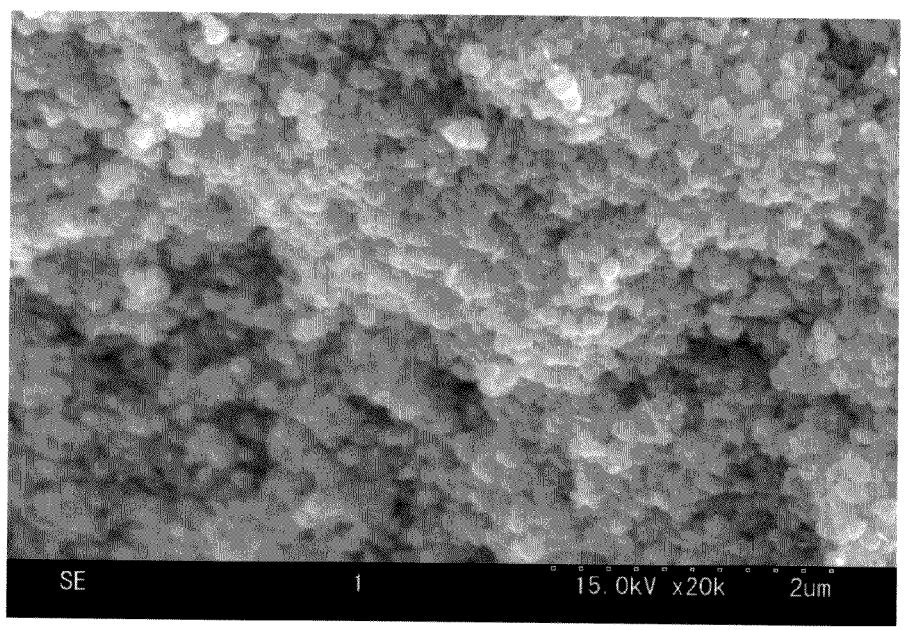
FIG. 8 is a SEM photograph showing a surface state of the $CeO_2$—Ag composition obtained in Comparative Example 3.

As apparent from the results shown in FIG. 7 and FIG. 8, it was confirmed that the $CeO_2$—Ag composition ($CeO_2$—Ag60) obtained in Example 8 had more gaps than that obtained in Comparative Example 3. This structure of the former with more gaps is deemed to be reflected on the particle size distribution and the pore volume as described above. Moreover, rod-like objects in FIG. 7 are deemed to be ammonium nitrate.

<Evaluation of $CO_2$ Generation Intensities Attributed to $CeO_2$—Ag Compositions>

First, concerning the $CeO_2$—Ag compositions obtained in Examples 3, 4, 7 to 9, 11 and 12 and in Comparative Example 3, as well as in the case of only using soot and in the case of only using high specific surface area ceria, measurement samples were firstly fabricated by blending the respective samples with soot (carbon composition 99.9% or above) in accordance with the following blending method. Here, a blend ratio of between each of the samples and the soot was set to 2:0.1 by weight (g).

(Mixing method) Uniform mixtures (the measurement samples) were obtained by using a stirrer (MMPS-M1, made by AS ONE Corporation) and a magnet mortar (MP-02, made by AS ONE Corporation) and mixing for 3 minutes by electric mixing while setting a speed scale to "3".

Next, $CO_2$ generation intensities of the obtained measurement samples upon rise in temperature were respectively measured in accordance with the TG-mass method. A thermogravimetric analyzer "TG8120" (made by Rigaku Corporation) was used as herein. An instrument "GC-MS5972A" (made by Hewlett Packard) was connected to the thermogravimetric analyzer and mass spectra of generated gas components were measured with the thermogravimetric analyzer. Regarding measurement conditions, the temperature was raised up to 800° C. at a temperature increasing rate of 20 K/min in an $O_2$-10%/He-balanced atmosphere. Here m/e=44 components were measured as the $CO_2$ components to be generated by soot oxidation. Obtained results are shown in FIGS. 9 to 11.

Figure 9:
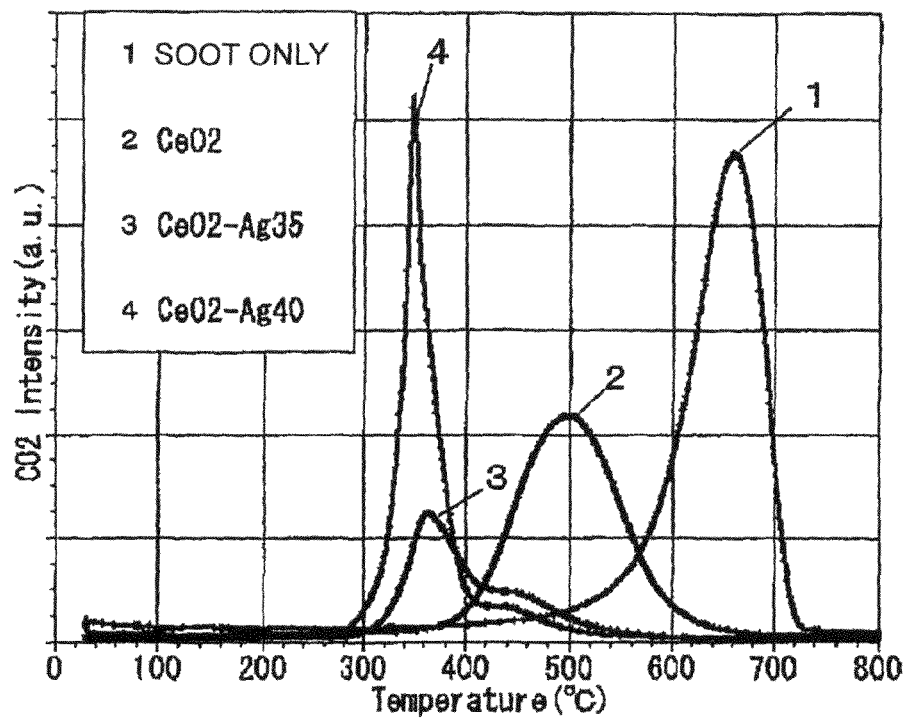
FIG. 9 is a graph showing results of measurement of $CO_2$ generation intensities upon rise in temperature in the cases of $CeO_2$—Ag compositions obtained in Examples 3 and 4, soot only, and ceria having a high specific surface area (high specific surface area ceria) only.
Figure 10:
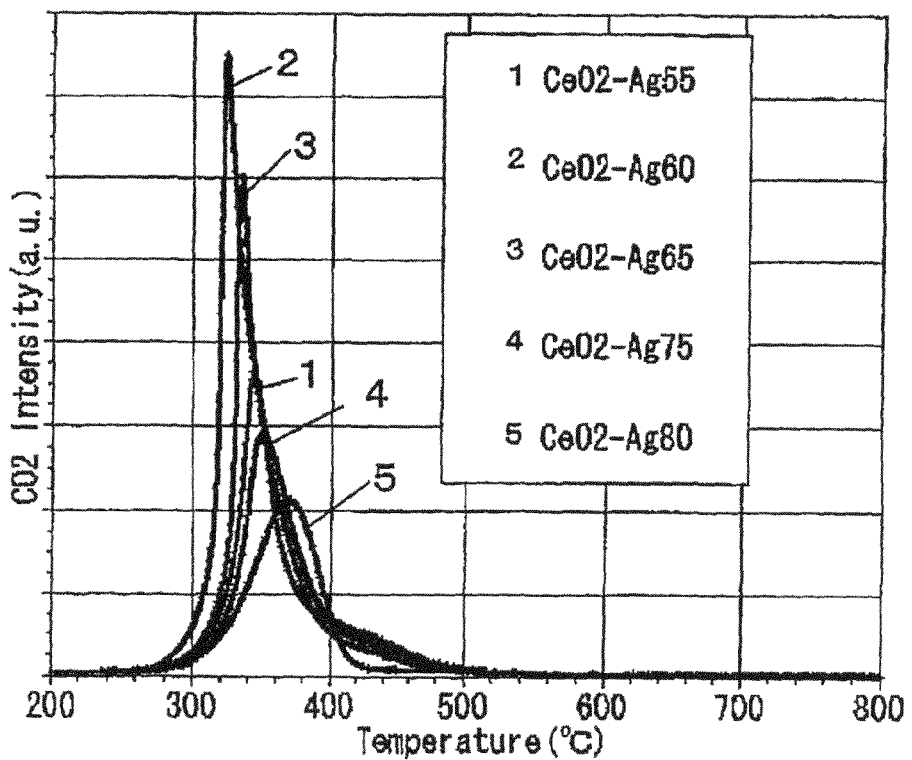
FIG. 10 is a graph showing results of measurement of $CO_2$ generation intensities during temperature rising in terms of $CeO_2$—Ag compositions obtained in Examples 7 to 9, 11, and 12.
Figure 11:
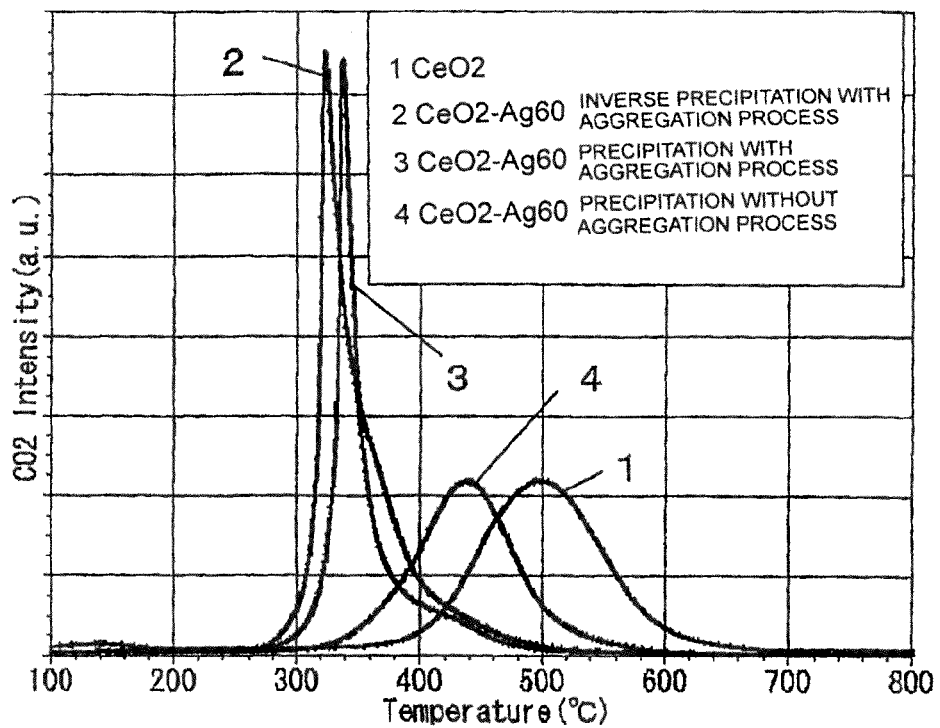
FIG. 11 is a graph showing results of measurement of $CO_2$ generation intensities during temperature rising in terms of the $CeO_2$—Ag compositions obtained in Example 8 and Comparative Example 3.

As apparent from the results shown in FIGS. 9 to 11, it was confirmed that the carbon-containing components such as soot can be sufficiently oxidized at a lower temperature by the present invention. Note that there was little sign of the generation of m/e=28 CO components in the Examples.

<Evaluation of Soot Oxidation Rate Attributed to $CeO_2$—Ag Compositions>

Concerning the $CeO_2$—Ag compositions obtained in Examples 7 to 9 and in Comparative Example 3, as well as in the case of only using high specific surface area ceria and in the case of allowing the high specific surface area ceria to support 20 mol % of Ag, the temperature was maintained for 10 minutes at each measurement temperature in an $O_2$-10%/He-balanced atmosphere using the same thermogravimetric analyzer, and a soot oxidation rate was calculated by use of a weight $M_1$ and a total soot weight $M_2$ at that time. Here, concerning a calculation method, the soot weight $M_2$ was calculated based on a weight at the time of finally raising the temperature up to 800° C. after the first measurement of the weight $M_1$, and the following formula was calculated based on measurement time t (⅙ hour in this case):

$$\text{Soot oxidation rate}=(M_1-M_2)/\{(M_1+M_2)\times t/2\}$$

Figure 12:
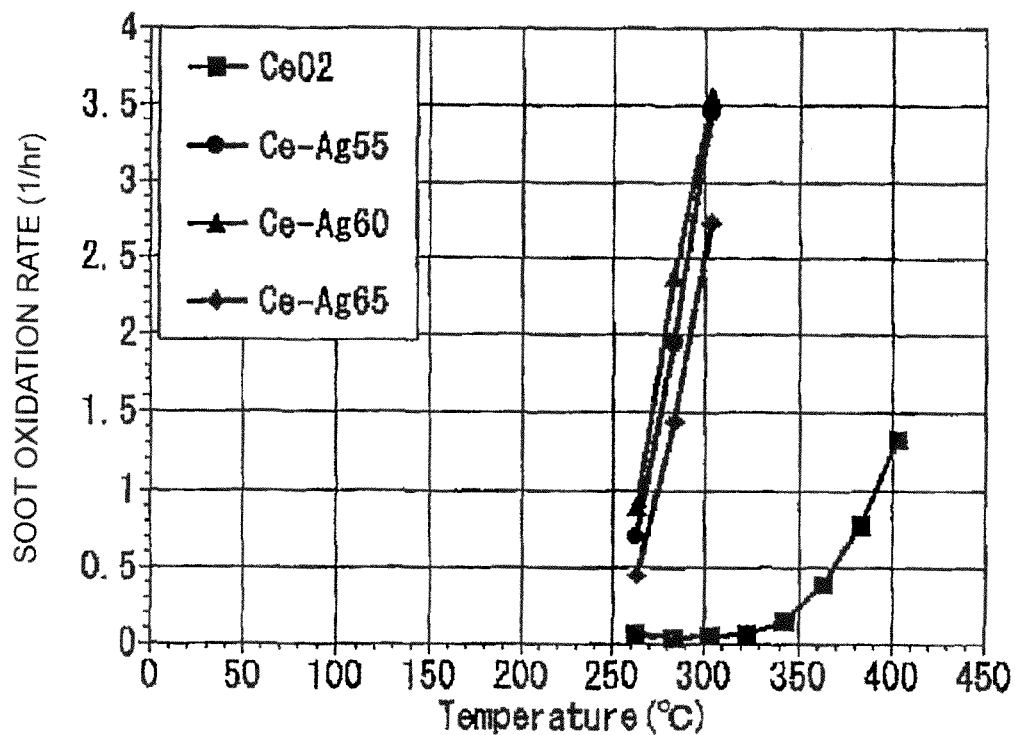
FIG. 12 is a graph showing results of measurement of soot oxidation rates in terms of the $CeO_2$—Ag compositions obtained in Examples 7 to 9 and a high specific surface area ceria.
Figure 13:
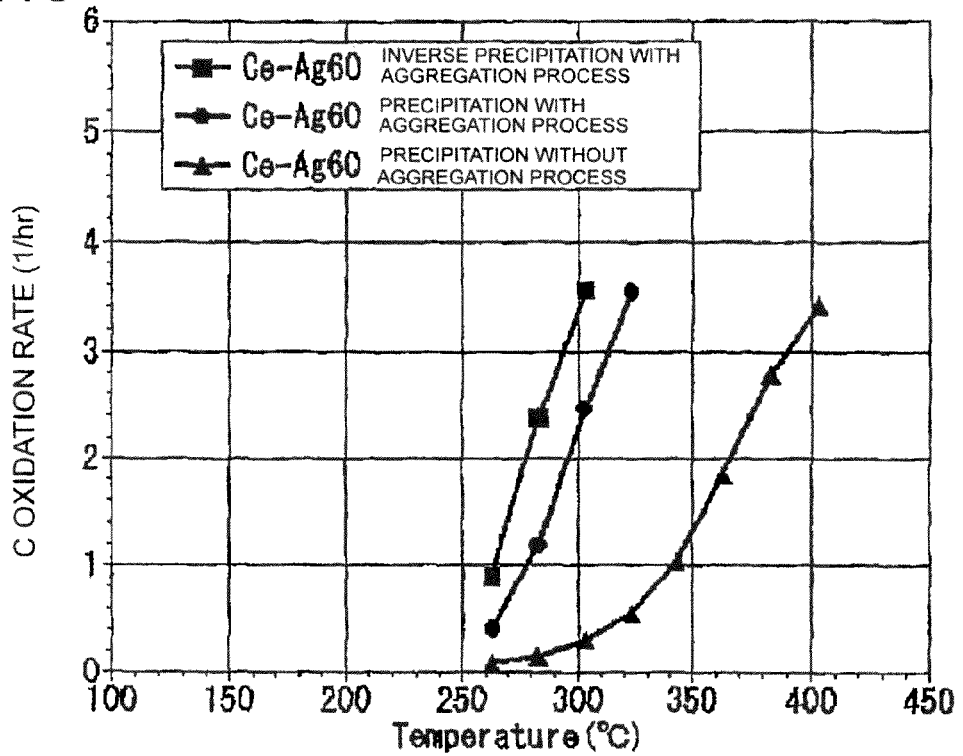
FIG. 13 is a graph showing results of measurement of soot oxidation rates in terms of the $CeO_2$—Ag compositions obtained in Example 8 and Comparative Example 3.

Obtained results are shown in FIGS. 12 and 13.

As apparent from the results shown in FIGS. 12 and 13, it was confirmed that the carbon-containing components such as soot can be sufficiently oxidized at a lower temperature by the present invention.

<Confirmation Tests of Soot Oxidation Mechanism Using Isotopic Oxygen>

Evaluation was carried out in accordance with the TAP (Temporal Analysis of Products) method in terms of a case of using high specific surface area ceria (tight-contacting high specific surface area ceria with soot) and a case of using the $CeO_2$ composition obtained in Example 8 (tight-contacting $CeO_2$—Ag60 with soot). Specifically, pulsed gas was introduced to the samples in vacuum and reaction products were detected with a mass spectrometer. Note that it is possible to track the variation by milli-second order. Then, isotopic oxygen $^{18}O_2$ was sprayed. Here, m/e=48 $C^{18}O_2$ is generated when only the gas-phase oxygen is involved and m/e=44 $CO_2$ is generated when only the oxygen in the support is involved.

Figure 14:
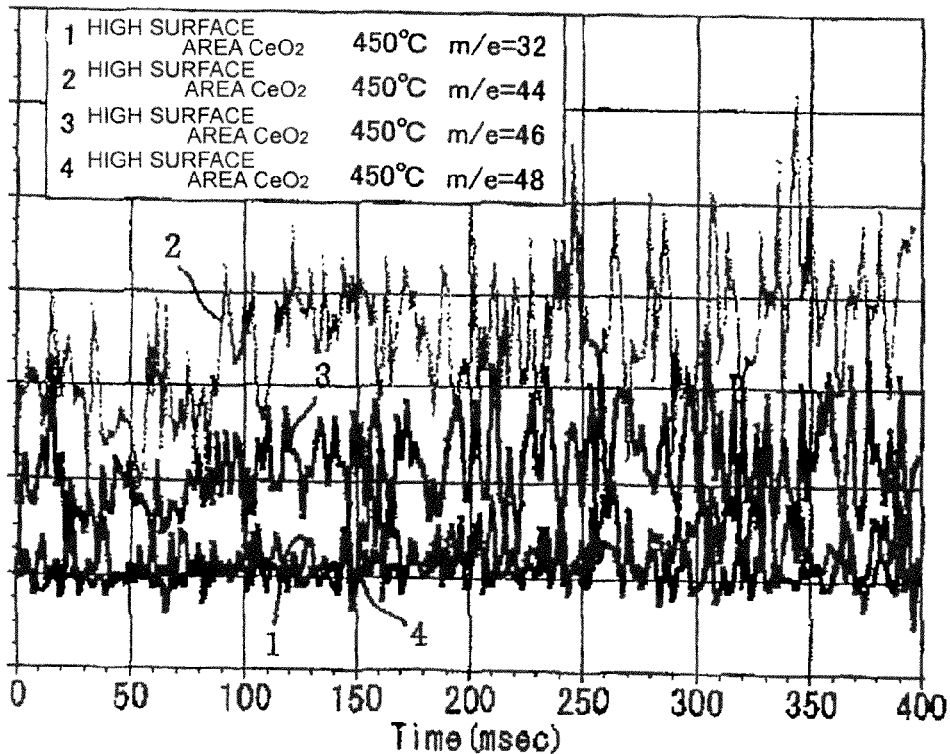
FIG. 14 is a graph showing results of confirmation tests for a soot oxidation mechanism conducted by use of oxygen isotopes in terms of a high specific surface area ceria.

As apparent from results shown in FIG. 14, soot oxidation was observed at 450° C. in the case of using high specific surface area ceria. The ingredient in that case mainly included $CO_2$. Accordingly, it was confirmed that the oxygen in the support was mainly involved therein.

Figure 15:
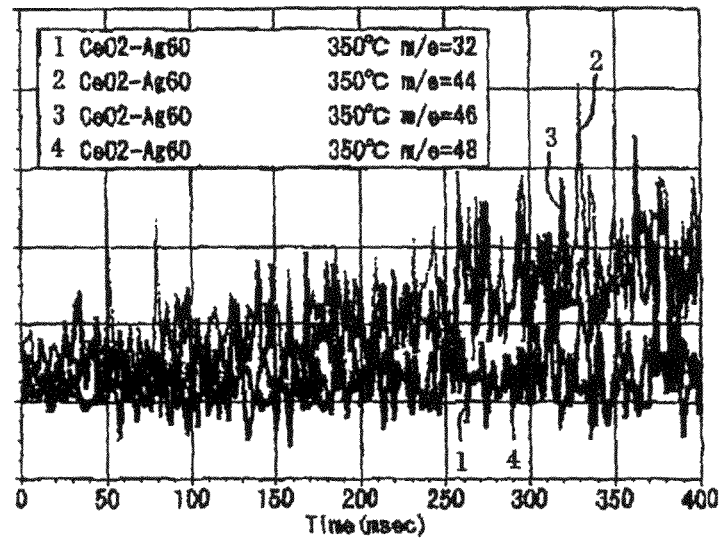
FIG. 15 is a graph showing results of confirmation tests (350° C.) for the soot oxidation mechanism conducted by use of $^{18}O_2$ in terms of the $CeO_2$—Ag composition obtained in Example 8.

Meanwhile, soot oxidation was observed at 350° C. in the case of using the $CeO_2$—Ag composition obtained in Example 8 (FIG. 15). Although the main ingredient was $CO_2$ derived from $CeO_2$, some $CO^{18}O$ was also detected. Moreover, in comparison with the case of high specific surface area ceria at 450° C., the gas-phase oxygen is deemed to be more involved in this case because a generation ratio of $CO^{18}O$ is higher than that generated in the case of 450° C. though an oxygen exchange reaction may be suppressed due to a lower temperature.

Figure 16:
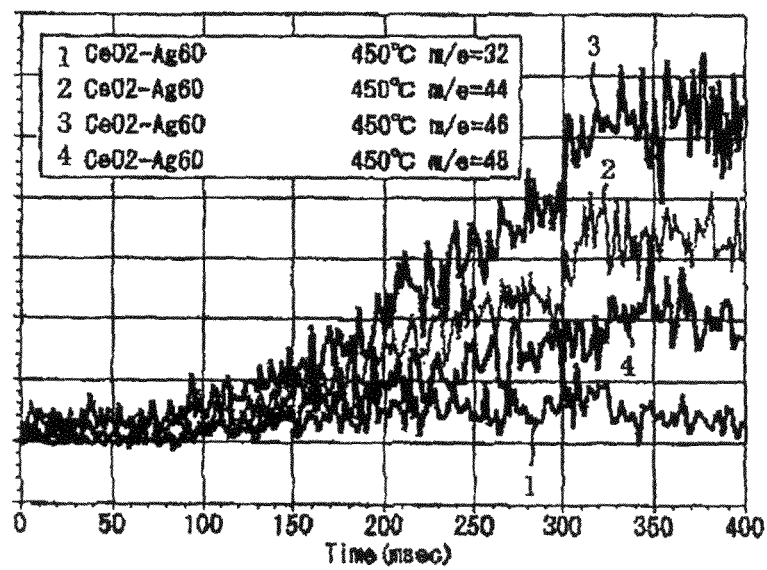
FIG. 16 is a graph showing results of confirmation tests (450° C.) for the soot oxidation mechanism conducted by use of $^{18}O_2$ in terms of the $CeO_2$—Ag composition obtained in Example 8.

Moreover, a proportion of the gas-phase oxygen became even larger in the soot oxidation at 450° C. (FIG. 16). It is conceivable that the oxygen exchange reaction is more easily achieved because m/e=32 is also generated therein. In addition, it is conceivable that a generated amount of m/e=48 is also increased as a result of a progress in the oxygen exchange reaction.

Here, assuming a reaction pathway of oxidation by way of a surface oxide, it is conceivable that there is an involvement equal to or higher than isotopic oxygen existing on $CeO_2$ surfaces. Therefore, a $CO+^{18}O_2$ reaction experiment was carried out in order to estimate an existing probability of the isotopic oxygen on the $CeO_2$ surfaces.

Figure 17:
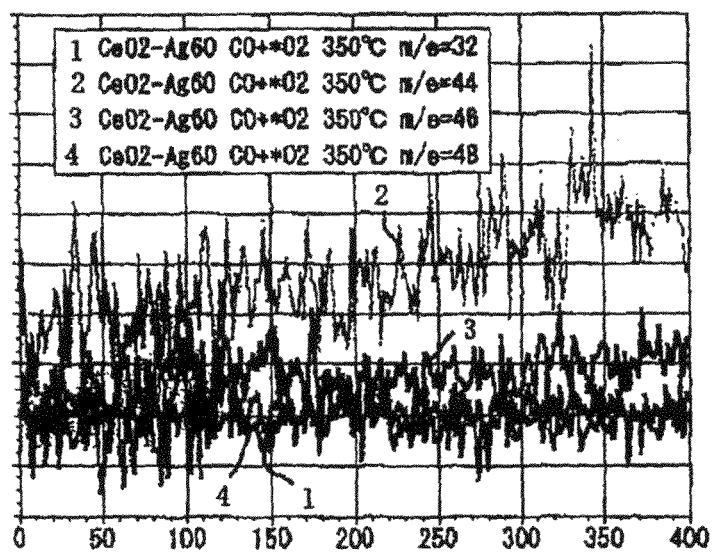
FIG. 17 is a graph showing results of confirmation tests (350° C.) for the soot oxidation mechanism conducted by use of $CO+^{18}O_2$ in terms of the $CeO_2$—Ag composition obtained in Example 8.
Figure 18:
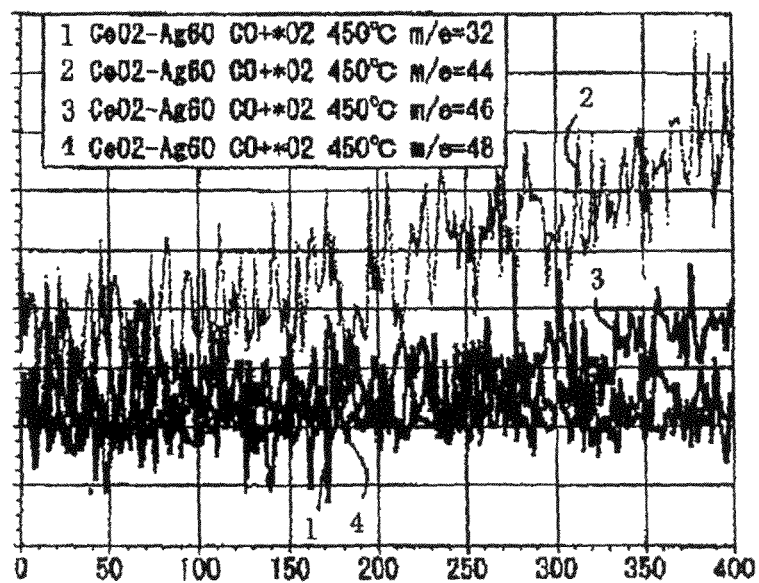
FIG. 18 is a graph showing results of confirmation tests (450° C.) for the soot oxidation mechanism conducted by use of $CO+^{18}O_2$ in terms of the $CeO_2$—Ag composition obtained in Example 8.

Obtained results are shown in FIGS. 17 and 18. In each case of 350° C. and 450° C., the oxygen involved in a CO oxidation reaction was mostly derived from the support. Therefore, an involvement of the gas-phase oxygen in an amount equal to or above a probabilistic existing amount on the support was confirmed in the reaction of the soot, thereby affirming the assumption that the reaction takes place by way of the surface oxide.

Examples 13 to 22

$CeO_2$—Ag-additive compositions (composite materials) containing Ag, ceria and an additive component were prepared by reverse precipitation similarly to Example 8 except that nitrate solution containing Ce, Ag and the additive component were prepared by setting content percentages (mol %) of the additive component relative to a total amount of Ce and the additive component to La 5 mol % (Example 13), La 10 mol % (Example 14), La 20 mol % (Example 15), Nd 5 mol % (Example 16), Nd 10 mol % (Example 17), Nd 20 mol %

(Example 18), Pr 10 mol % (Example 19), Fe 10 mol % (Example 20), Zr 10 mol % (Example 21), and Al 10 mol % (Example 22), respectively. For instance, in Example 14, a solution was firstly prepared by dissolving 50.46 g of $Ce(NO_3)_3 \cdot 6H_2O$, 5.59 g of $La(NO_3)_3$, and 29.62 g of $AgNO_3$ into 120 mL of water. Next, ammonia water was prepared by diluting 38.21 g of 25 percent ammonia water with 100 g of water. Then, the solution prepared as described above was put in while agitating the ammonia water to prepare the $CeO_2$—Ag-additive composition.

Here, the obtained compositions were expressed by use of the molar percentages of the additive components relative to the total amounts of Ce and the additive components at the stage of preparing the nitrate solutions. For example, a composition obtained by preparation applying feed ratios of Ce:Ag=40:60 and Ce:La=90:10 (Ce:Ag:La=90:135:10) was expressed as "CeAg—La10".

<Evaluation of Ag Content Percentages in CeAg-additive Compositions>

Content percentages of Ag, La, and Nd in the CeAg-additive compositions obtained in Examples 13, 14, 15, and 17 were analyzed in accordance with the ICP emission spectrometry. Obtained results are shown in Table 4.

As apparent from the results shown in Table 4, the Ag content percentages in the CeAg-additive compositions accounted for approximately 50 mol % on the basis of the total amount of Ce and Ag when the nitrate solutions were prepared so as to render Ag equal to 60 mol %.

TABLE 4

|  | Ag mol %<br>(Ce + Ag +<br>La or Nd basis) | Ag mol %<br>(Ce + Ag basis) | La mol %<br>(Ce + La basis) |
| --- | --- | --- | --- |
| CeAg—La5 | 48.9 | 50.18 | 4.68 |
| CeAg—La10 | 47.82 | 49.96 | 8.2 |
| CeAg—La20 | 45.54 | 49.96 | 16.23 |
| CeAg—Nd10 | 46.87 | 49.49 | 9.96 |

<Evaluation of $CeO_2$ Particle Diameters and Ag Particle Diameters in CeAg-additive Compositions>

Particle diameters (average particle diameters) of $CeO_2$ and particle diameters (average particle diameters) of Ag in the CeAg-additive compositions obtained in Examples 13 to 22 were found by use of the XRD. Some features of obtained results are shown in Table 5. Here, the respective CeAg-additive compositions subjected to calcinating for 5 hours at 800° C. in the atmosphere containing oxygen at 10% by volume and nitrogen at 90% by volume were also measured.

As apparent from the results shown in Table 5, in the case of containing La or Nd as the additive component, it was confirmed that ones satisfying conditions that, after calcinating for 5 hours at 500° C. in air, average particle diameters of the second metal oxide particulates (the oxygen reactive species transporting particles) and the first metal particles (the oxygen-extracting particles) were in a range from 1 to 75 nm and a range from 10 to 100 nm, respectively, and the average particle diameter of the first metal particles was at least 1.3 times greater than the average particle diameter of the second metal oxide particulates, were successfully obtained; and moreover, that ones satisfying conditions that, after calcinating for 5 hours at 800° C. in an atmosphere containing oxygen at 10% by volume and nitrogen at 90% by volume, average particle diameters of the second metal oxide particulates (the oxygen reactive species transporting particles) and the first metal particles (the oxygen-extracting particles) were in a range from 8 to 100 nm and a range from 10 to 400 nm, respectively, and the average particle diameter of the first metal particles was at least 1.3 times greater than the average particle diameter of the second metal oxide particulates, were successfully obtained.

TABLE 5

| Material | $CeO_2$ particle diameter (Å) | Ag particle diameter (Å) |
| --- | --- | --- |
| CeAg—La10 | 117 | 280 |
| CeAg—La10 800° C. 5 h | 274 | 421 |
| CeAg—Nd10 | 115 | 317 |
| CeAg—Nd10 800° C. 5 h | 314 | 416 |
| CeAg—Pr10 | 111 | 498 |
| CeAg—Fe10 | 94 | 538 |
| CeAg—Zr10 | 118 | 477 |
| CeAg—Al10 | 62 | 534 |
| CeAg—Pr10 800° C. 5 h | 438 | 787 |
| CeAg—Fe10 800° C. 5 h | 524 | 536 |
| CeAg—Zr10 800° C. 5 h | 253 | 539 |

<Evaluation of Solid Solution State of La into $CeO_2$ in CeAg-additive Composition>

Lattice constants of $CeO_2$ in the $CeO_2$—Ag composition ($CeO_2$—Ag60) obtained in Example 8 and in the CeAg-additive composition (CeAg—La10) obtained in Example 14 were found by use of the XRD. The obtained lattice constants of $CeO_2$ are shown below together with a theoretical value of the lattice constant of $CeO_2$.

$CeO_2$—Ag60: 5.41 Å
CeAg—La10: 5.43 Å
Theoretical value: 5.41 Å

As apparent from the above-mentioned results, the lattice constant of $CeO_2$ was increased when adding La. Therefore, it was confirmed that Ag was not solid-solved in $CeO_2$ but La was solid-solved in $CeO_2$. The present inventors speculate that the solid solution of La in $CeO_2$ suppresses grain growth of $CeO_2$ during heat endurance, whereby the state of the Ag particles covered with the $CeO_2$ particles is more reliably maintained and migration of the oxygen reactive species is favorably maintained after the heat endurance.

<SEM Observation of CeAg-additive Composition>

Figure 19:
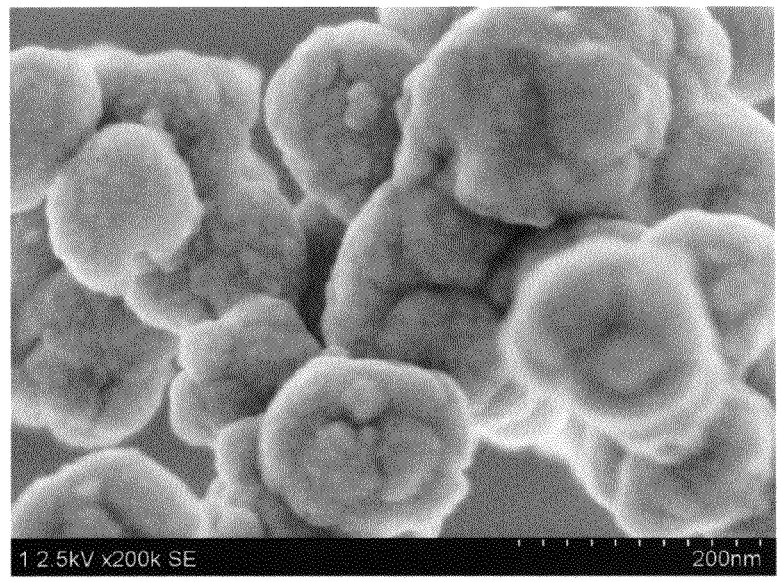
FIG. 19 is a SEM photograph showing a surface state of a CeAg-additive composition (before endurance testing) obtained in Example 14.
Figure 20:
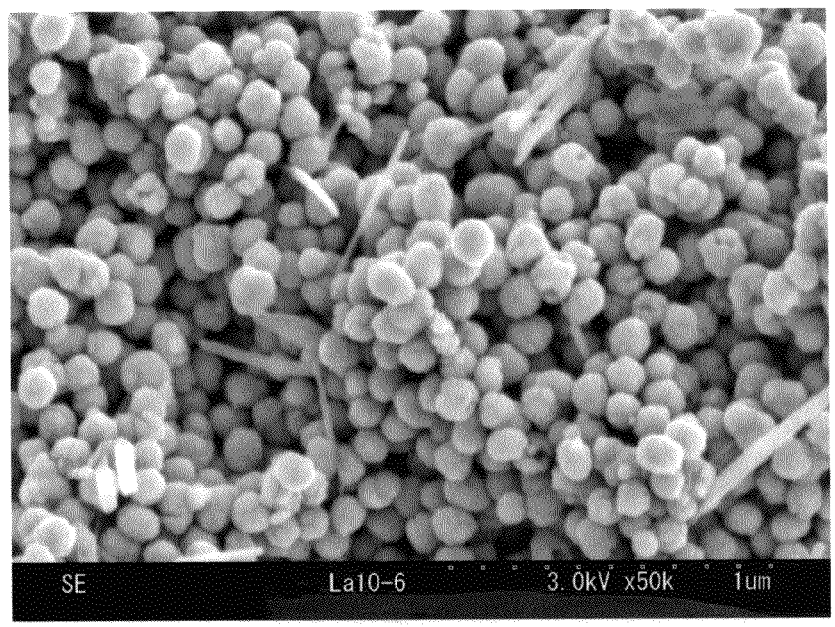
FIG. 20 is a SEM photograph showing the surface state of the CeAg-additive composition (before endurance testing) obtained in Example 14.
Figure 21:
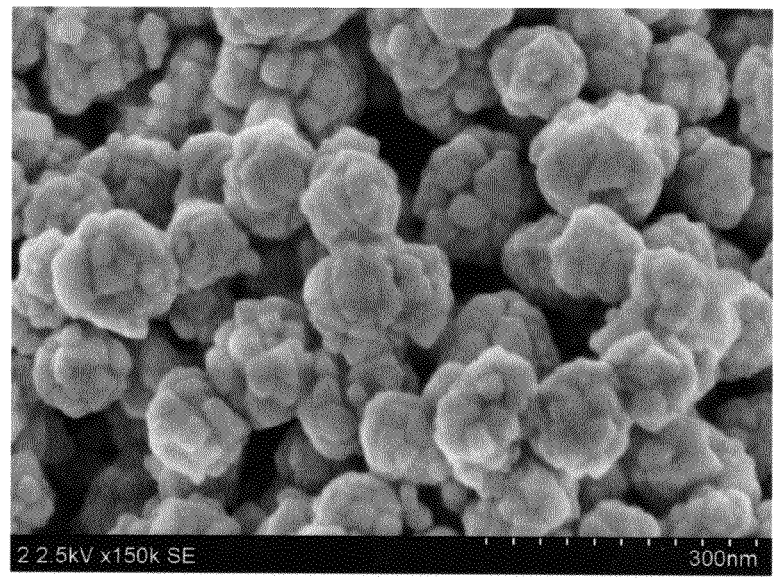
FIG. 21 is a SEM photograph showing the surface state of the CeAg-additive composition (after endurance testing) obtained in Example 14.
Figure 22:
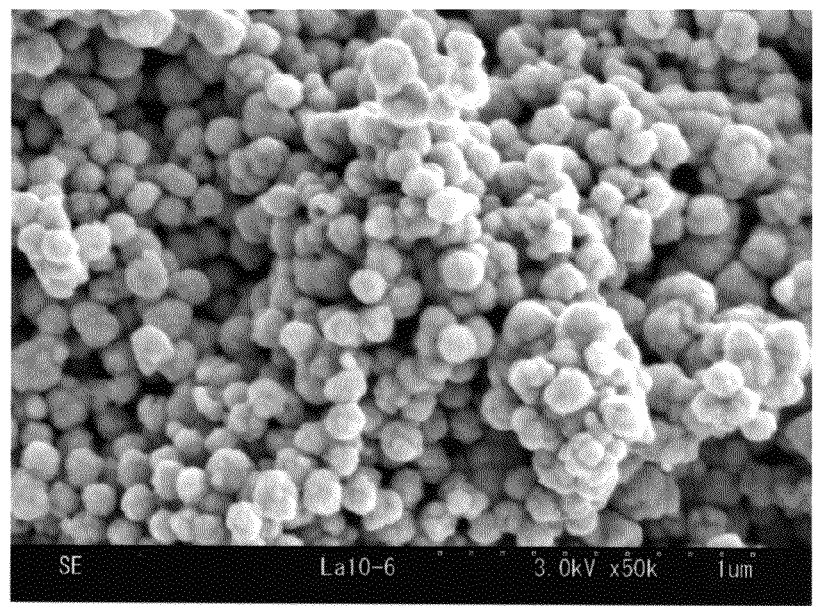
FIG. 22 is a SEM photograph showing the surface state of the CeAg-additive composition (after endurance testing) obtained in Example 14.

Surface states of the CeAg-additive composition (CeAg—La10) obtained in Example 14 were observed with a SEM (scanning electron microscope). Obtained results are shown in FIG. 19 and FIG. 20. Meanwhile, surface states of the same composition after calcinating for 5 hours at 800° C. in the atmosphere containing oxygen at 10% by volume and nitrogen at 90% by volume were also observed similarly with the SEM. Obtained results are shown in FIG. 21 and FIG. 22.

As apparent from the results shown in FIG. 19 to FIG. 22, it was confirmed that the particles in the CeAg-additive composition obtained in Example 14 were not increased in size (not subjected to gain growth) even after calcinating for 5 hours at 800° C. Here, rod-like objects are deemed to be ammonium nitrate. These objects can be easily removed by cleaning or calcinating.

Moreover, as apparent from the results shown in FIG. 19, it was confirmed that the covering $CeO_2$ (La) particles on the CeAg-additive composition obtained in Example 14 had cracks. The present inventors speculate that these cracks are caused by a difference in the thermal expansion coefficient between Ag and $CeO_2$.

<TEM Observation of CeAg-additive Composition>

Figure 23:
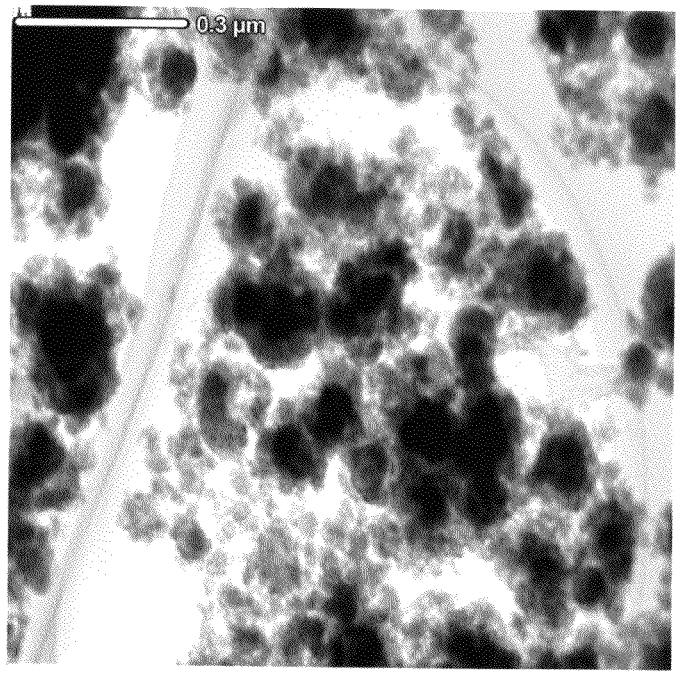
FIG. 23 is a TEM photograph showing a condition of the CeAg-additive composition obtained in Example 14 before an aggregation process.
Figure 24:
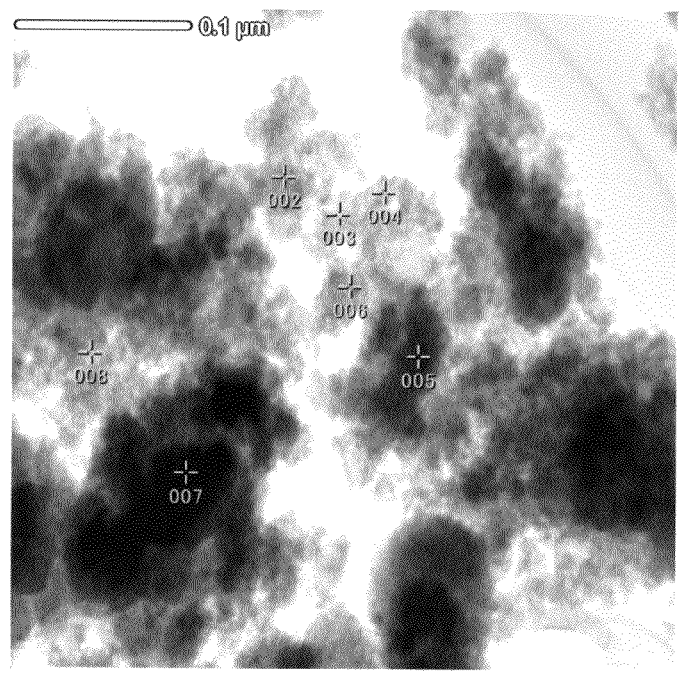
FIG. 24 is a TEM photograph showing measurement points in the condition of the CeAg-additive composition obtained in Example 14 before the aggregation process.
Figure 25:
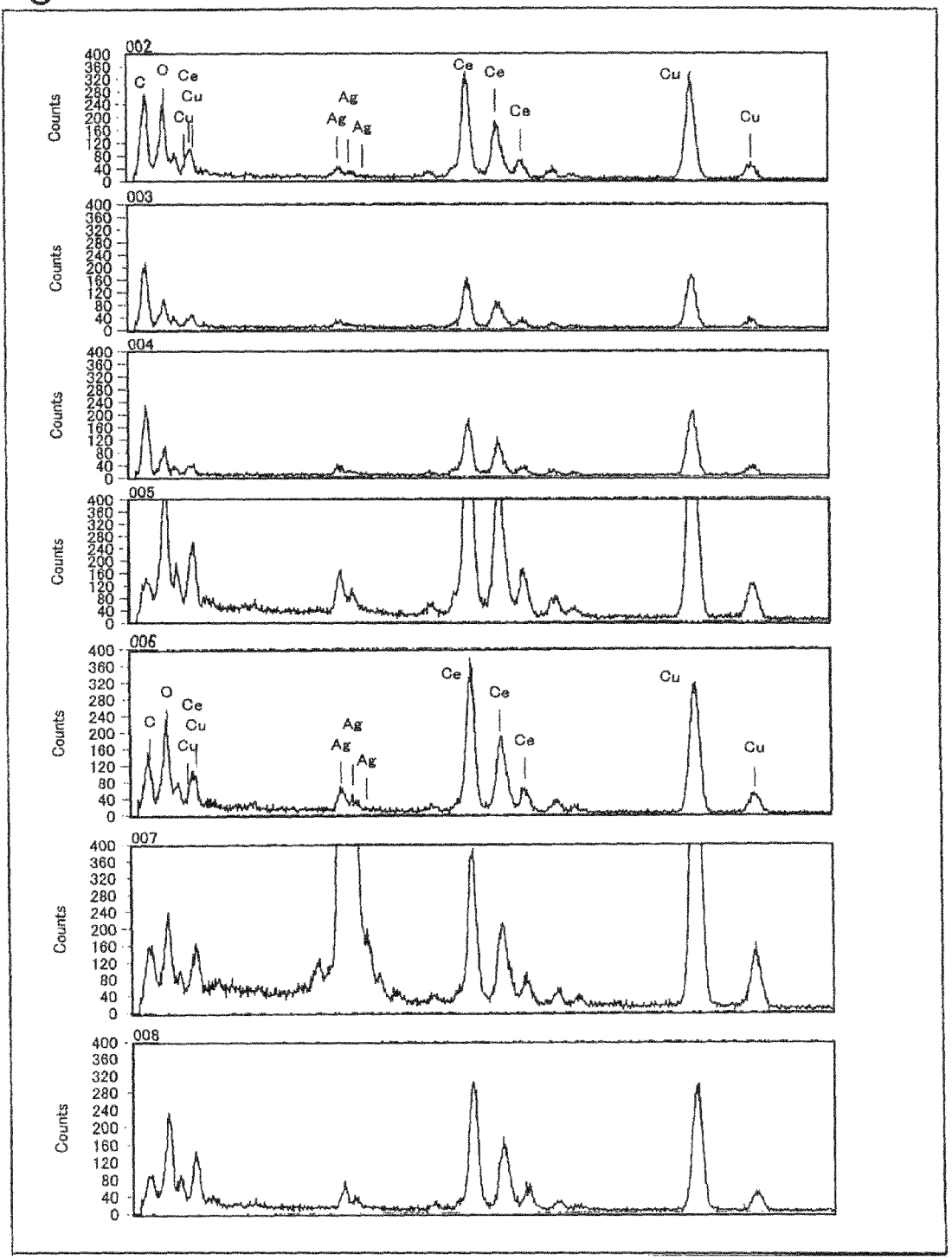
FIG. 25 is a group of graphs showing numbers of counts of Ce and Ag at the measurement points shown in FIG. 24.

A condition of the CeAg-additive composition (CeAg—La10) obtained in Example 14 in the course of the aggregation process was observed with a TEM (transmission electron microscope). An obtained result is shown in FIG. 23. Meanwhile, spectra at measurement points of the same composition (during the aggregation process) on a TEM photograph shown in FIG. 24 were found in accordance with energy dispersive X-ray spectroscopy by applying an accelerating voltage of 200 kV and using the TEM, thereby finding numbers of counts of the contained components (Ce and Ag). Obtained results are shown in FIG. 25. Here, Cu is attributed to equipment and measurement. As apparent from the results shown in FIGS. 23 to 25, $CeO_2$ particles not surrounding the Ag particles were also observed during the aggregation process.

Figure 26:
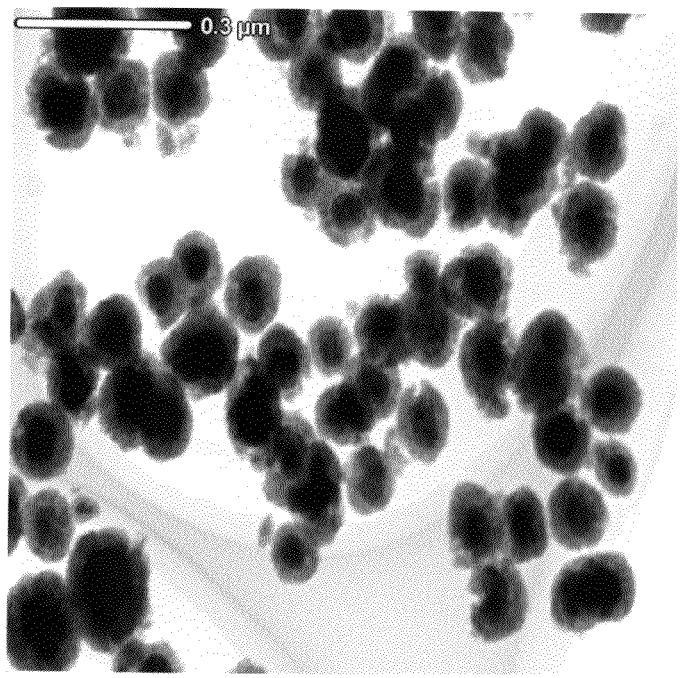
FIG. 26 is a TEM photograph showing a condition of the CeAg-additive composition obtained in Example 14 after the aggregation process (before calcinating).
Figure 27:
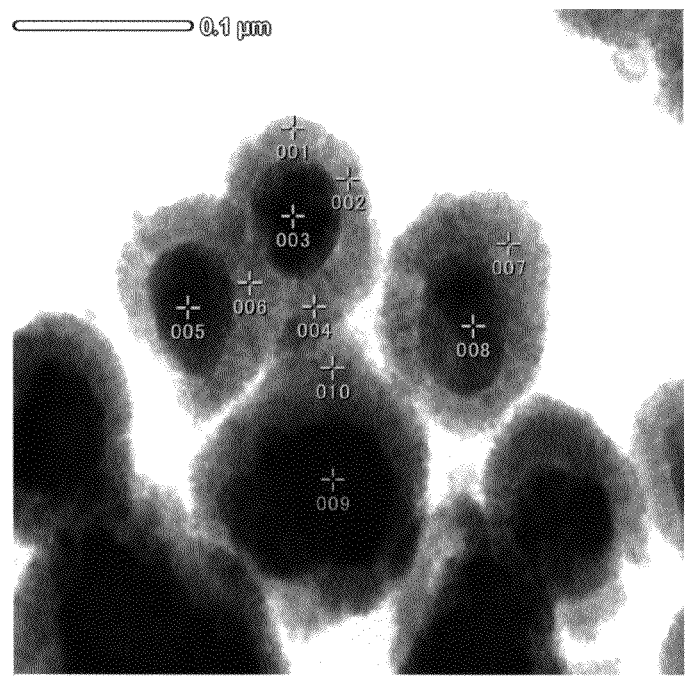
FIG. 27 is a TEM photograph showing measurement points in the condition of the CeAg-additive composition obtained in Example 14 after the aggregation process (before calcinating).
Figure 28:
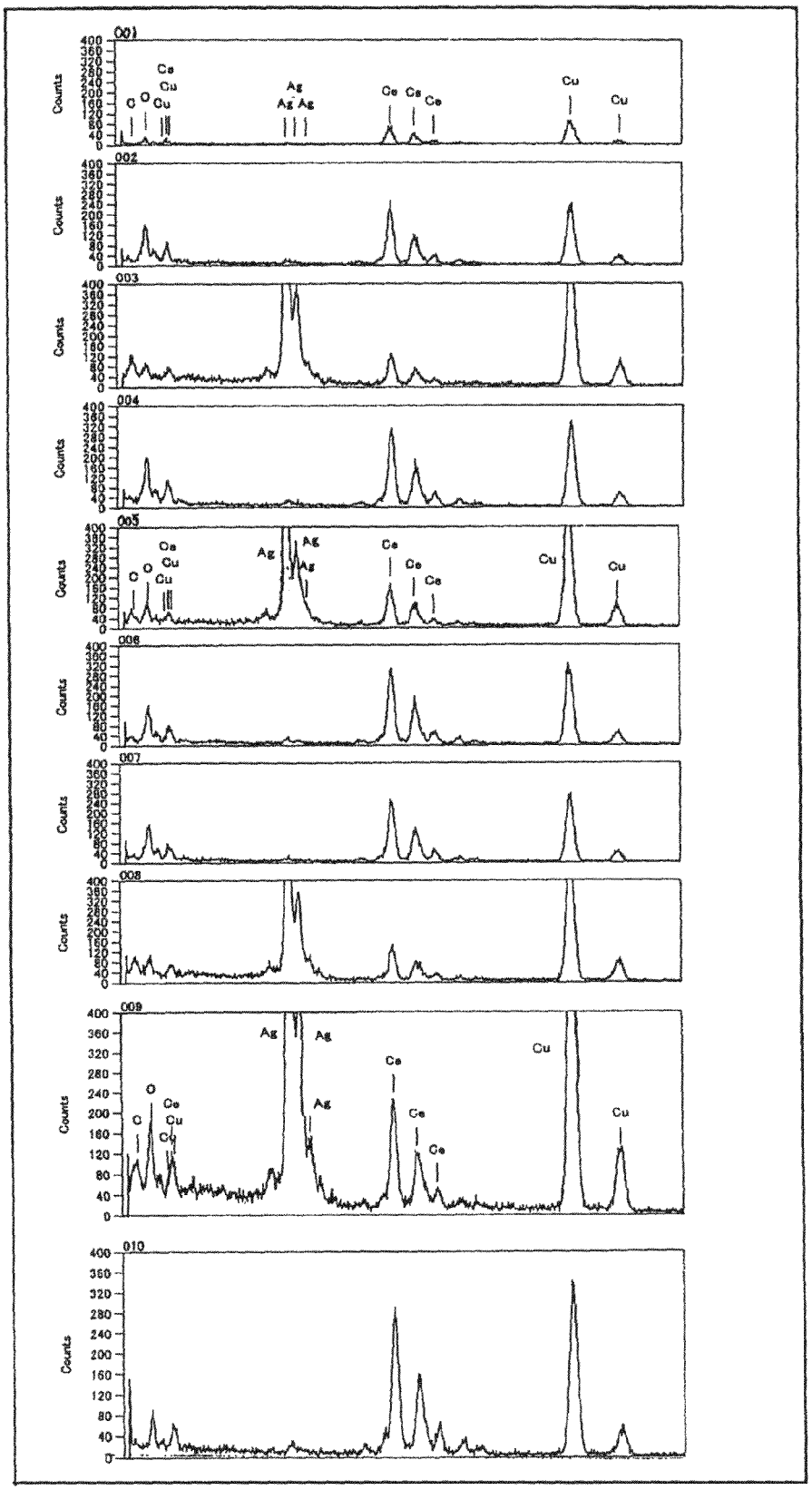
FIG. 28 is a group of graphs showing numbers of counts of Ce and Ag at the measurement points shown in FIG. 27.
Figure 29:
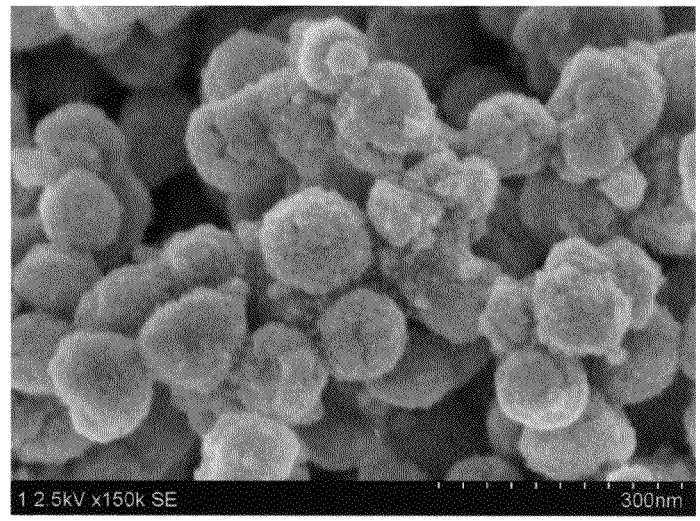
FIG. 29 is a SEM photograph showing a condition of the CeAg-additive composition obtained in Example 14 after the aggregation process (before calcinating).

Next, a condition of the CeAg-additive composition obtained in Example 14 after the aggregation process (before calcinating) was observed with the TEM. An obtained result is shown in FIG. 26. Meanwhile, spectra at measurement points of the same composition (before calcinating) on a TEM photograph shown in FIG. 27 were found in accordance with the energy dispersive X-ray spectroscopy similarly to the above, thereby finding numbers of counts of the contained components (Ce and Ag). Obtained results are shown in FIG. 28. Moreover, the condition of the same composition (before calcinating) was observed with the SEM. An obtained result is shown in FIG. 29. As apparent from the results shown in FIG. 26 to 29, it was confirmed that a sufficient amount of the aggregates including the Ag particles surrounded by the $CeO_2$ particles were formed after the aggregation process and that there were very little $CeO_2$ particle left which did not cover any Ag particles.

Figure 30:
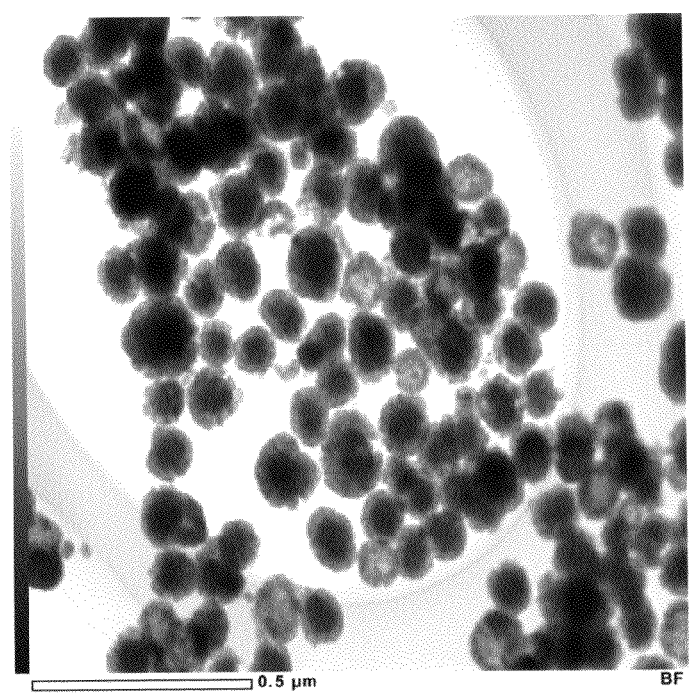
FIG. 30 is a TEM photograph showing a condition of the CeAg-additive composition obtained in Example 14 after calcinating.
Figure 31:
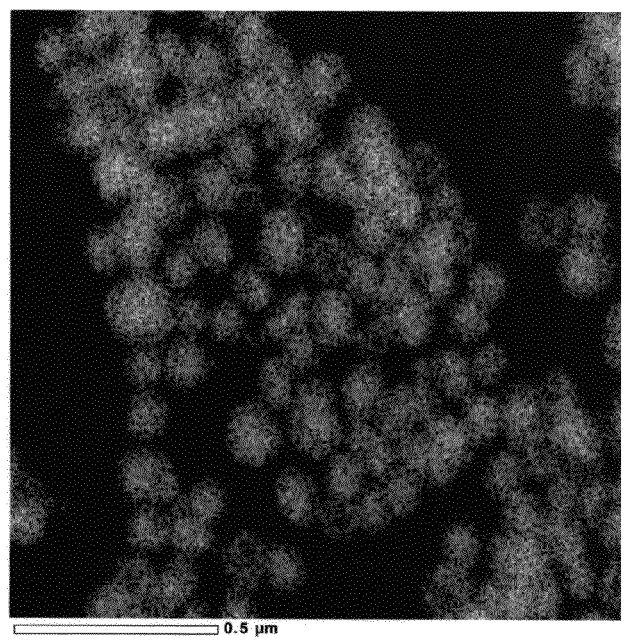
FIG. 31 is a TEM color photograph showing a condition of the CeAg-additive composition obtained in Example 14 after calcinating.
Figure 32:
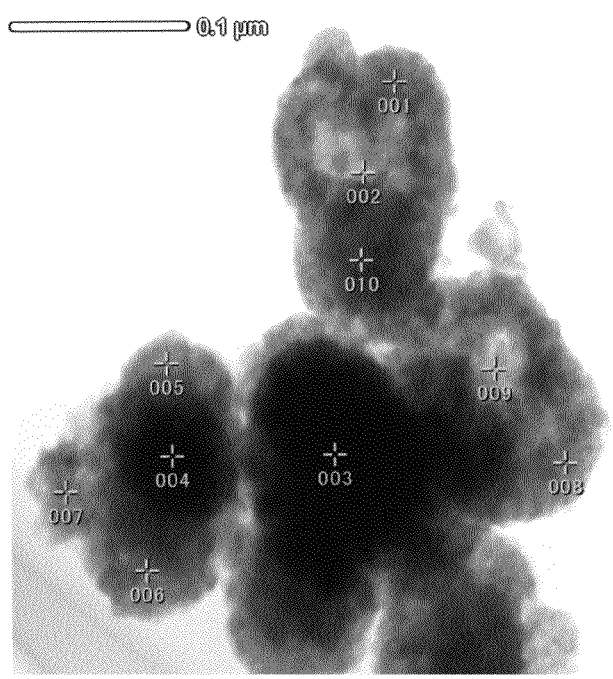
FIG. 32 is a TEM photograph showing measurement points in the condition of the CeAg-additive composition obtained in Example 32 after calcinating.
Figure 33:
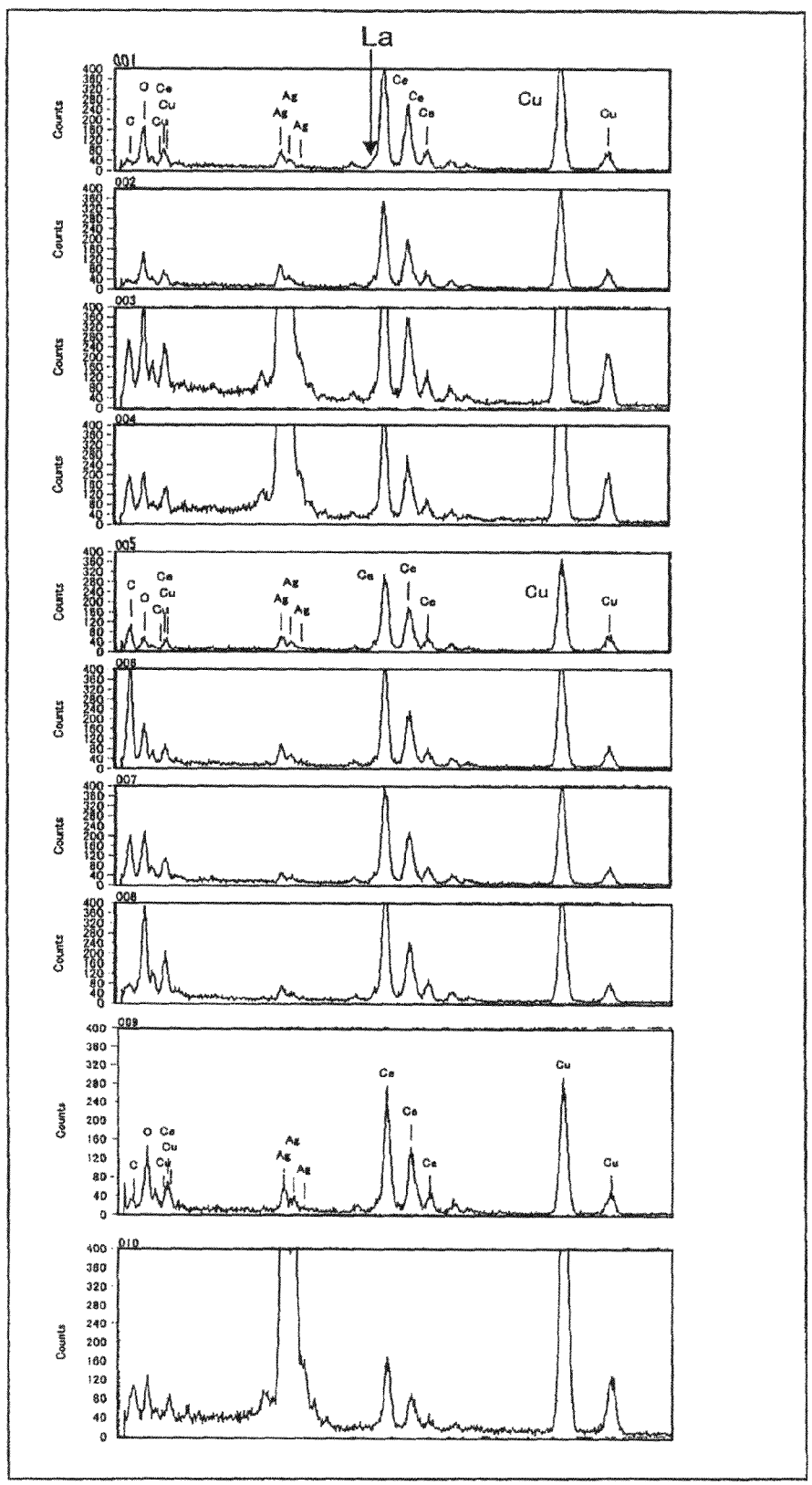
FIG. 33 is a group of graphs showing numbers of counts of Ce and Ag at the measurement points shown in FIG. 32.

Next, a condition of the CeAg-additive composition obtained in Example 14 after calcinating (for 5 hours at 500° C. in air) was observed with the TEM. An obtained result is shown in FIG. 30 and FIG. 31. Meanwhile, spectra at measurement points of the same composition (after calcinating) on a TEM photograph shown in FIG. 32 were found in accordance with the energy dispersive X-ray spectroscopy similarly to the above, thereby finding numbers of counts of the contained components (Ce and Ag). Obtained results are shown in FIG. 33. As apparent from the results shown in FIG. 30 to 33, it was confirmed that a sufficient amount of the aggregates including the Ag particles surrounded by the $CeO_2$ particles were maintained after calcinating.

Figure 34:
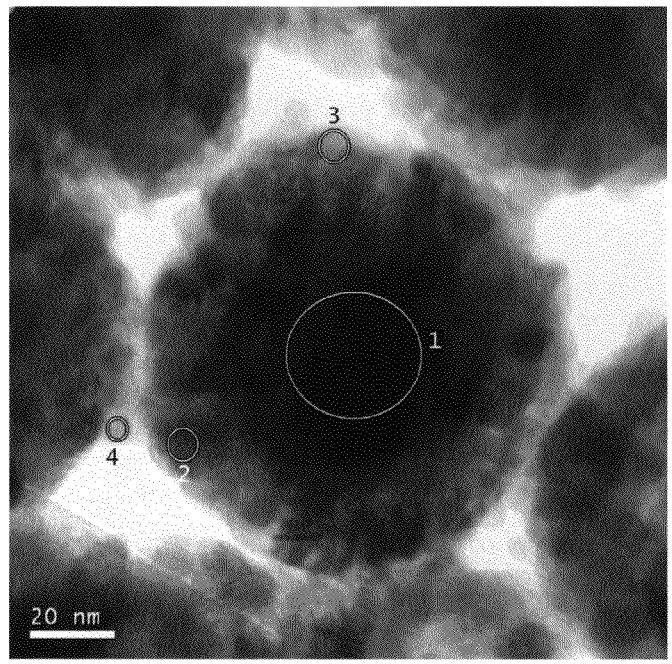
FIG. 34 is a TEM photograph showing measurement points in the condition of the CeAg-additive composition obtained in Example 14 after calcinating.

Moreover, the condition of the CeAg-additive composition obtained in Example 14 after calcinating (for 5 hours at 500° C. in air) was observed at a higher resolution with the TEM. An obtained result is shown in FIG. 34. Spectra at measurement points (1 to 4) shown in FIG. 34 were found in accordance with the energy dispersive X-ray spectroscopy and numbers of counts of the contained components (Ce and Ag) were found, thereby calculating elemental compositions at the respective measurement points. The contents of Ag turned out to be 1: 79.05 mol %; 2: 12.69 mol %; 3: 9.92 mol %; and 4: 4.95 mol %. Although there were $CeO_2$ portions where any Ag particles were undetectable with the TEM, these portions were proved to contain Ag. In this way, it was confirmed that Ag particulates were also present on $CeO_2$. The present inventors speculate that this is attributed to Ag ultrafine particles supported on the $Ce(OH)_3$ surfaces in the course of depositing the Ag particles by means of reduction of [Ag $(NH_3)_2]^+$ using $Ce(OH)_3$.

Figure 35:
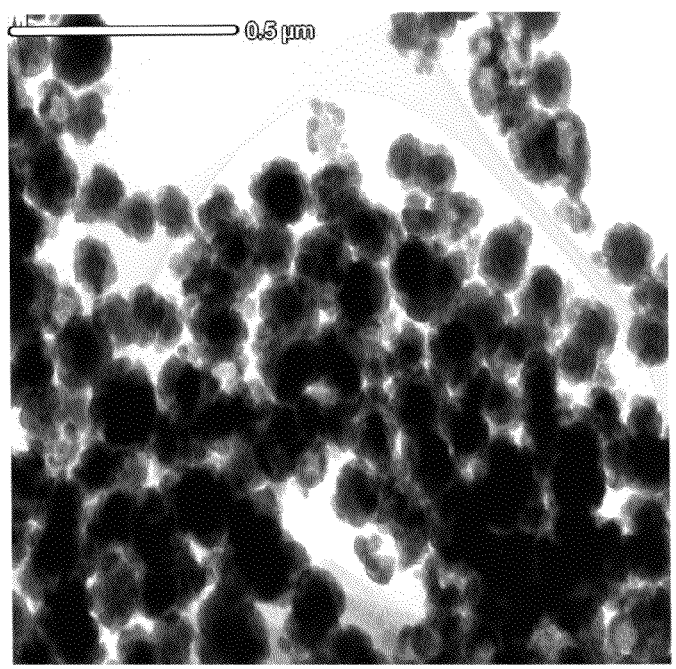
FIG. 35 is a TEM photograph showing a condition of the CeAg-additive composition obtained in Example 14 after an endurance test.
Figure 36:
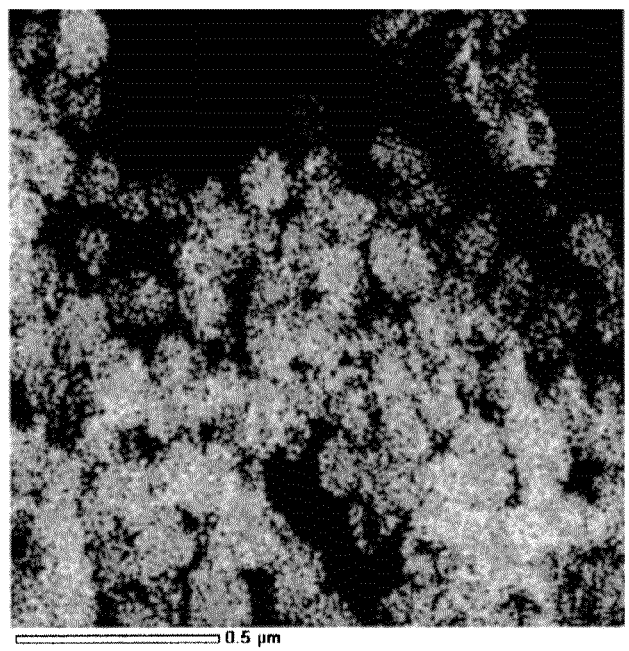
FIG. 36 is a TEM color photograph showing a condition of the CeAg-additive composition obtained in Example 14 after calcinating.

Next, a condition of the CeAg-additive composition obtained in Example 14 after calcinating (an endurance test) for 5 hours at 800° C. in the atmosphere containing oxygen at 10% by volume and nitrogen at 90% by volume was observed with the TEM. An obtained result is shown in FIG. 35 and FIG. 36. As apparent from the results shown in FIGS. 35 to 36, it was confirmed that a sufficient amount of the aggregates including the Ag particles surrounded by the $CeO_2$ particles were maintained after the endurance test.

<TEM Observation of Cross Section of CeAg-additive Composition>

Figure 37:
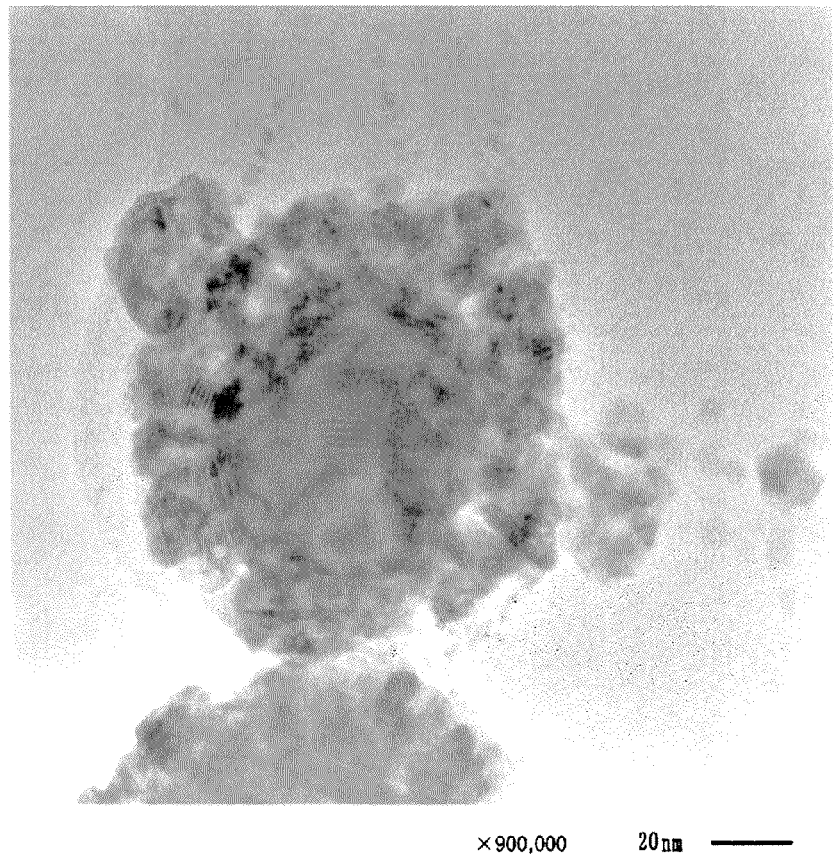
FIG. 37 is a TEM photograph showing a cross-sectional condition of the CeAg-additive composition obtained in Example 14 after calcinating.

A sample of the CeAg-additive composition (CeAg—La10) obtained in Example 14 after calcinating (5 hours at 500° C. in air) was buried in a resin and a cross-sectional condition obtained by slicing was observed with the TEM. An obtained result is shown in FIG. 37. Here, the TEM observation was conducted by applying an accelerating voltage of 300 kV.

As apparent from the result shown in FIG. 37, gaps were observed between Ag and $CeO_2$ particles. It is essential to ensure the contact between Ag and gas-phase oxygen from the perspective of the soot oxidation mechanism. In this context, it was confirmed that the composite material of the present invention ensured the contact between Ag and gas-phase oxygen and thereby applied a structure capable of generating the oxygen reactive species efficiently.

Comparative Example 6

For the purpose of comparison, a $CeO_2$—Ag support material ($Ag/CeO_2$) was obtained by allowing high specific surface area $CeO_2$ to support Ag in accordance with the following method. Specifically, $AgNO_3$ and high specific surface area $CeO_2$ (product name: 3N CEO 03PP, made by Kojundo Chemical Laboratory, Co. Ltd.) were weighed to satisfy a molar ratio of 15:85. Water was added to a mixture of both of these substances and $AgNO_3$ was dissolved therein. Subsequently, the obtained dispersed fluid was heated and agitated with a stirrer, then subjected to evaporation to dryness, and then calcinated for 5 hours at 500° C. in air, thereby obtaining the $CeO_2$—Ag support material ($Ag/CeO_2$) having the content percentage (mol %) of Ag relative to the total amount of Ce and Ag equal to 15 mol %.

<Evaluation of Presence of Ag Ultrafine Particles in CeAg-additive Composition>

Figure 38:
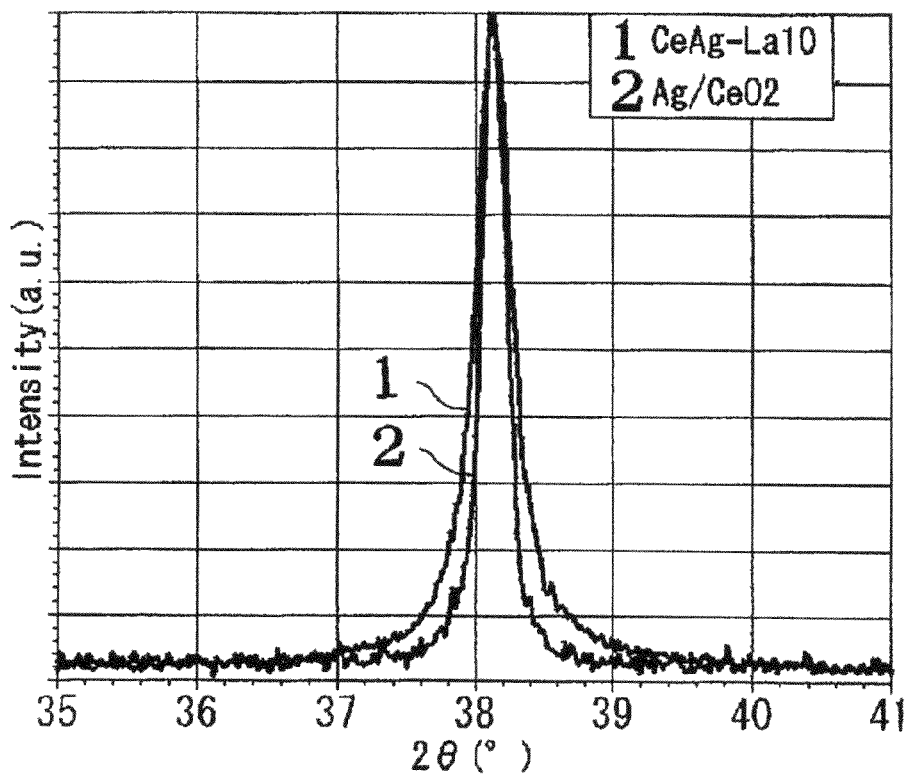
FIG. 38 is a graph showing XRD peaks of Ag in the CeAg-additive composition obtained in Example 14 and in the $CeO_2$—Ag supported material obtained in Comparative Example 6.
Figure 39:
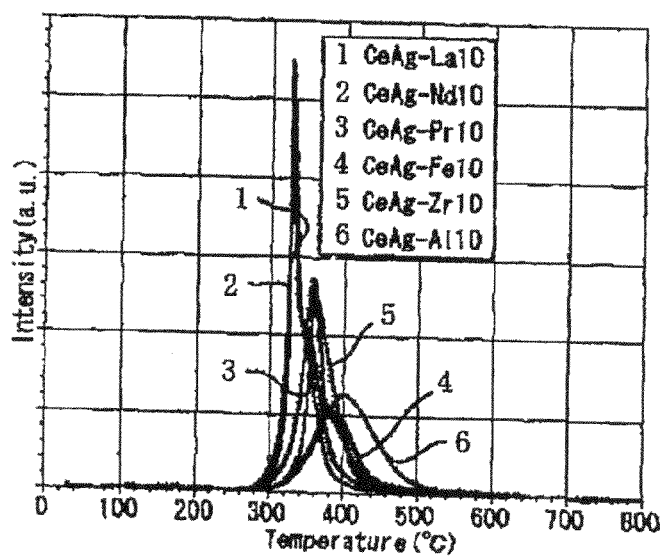
FIG. 39 is a graph showing results of $CO_2$ generation intensity evaluations (initial stages) using CeAg-additive compositions (Examples 14, 17, and 19 to 22).
Figure 40:
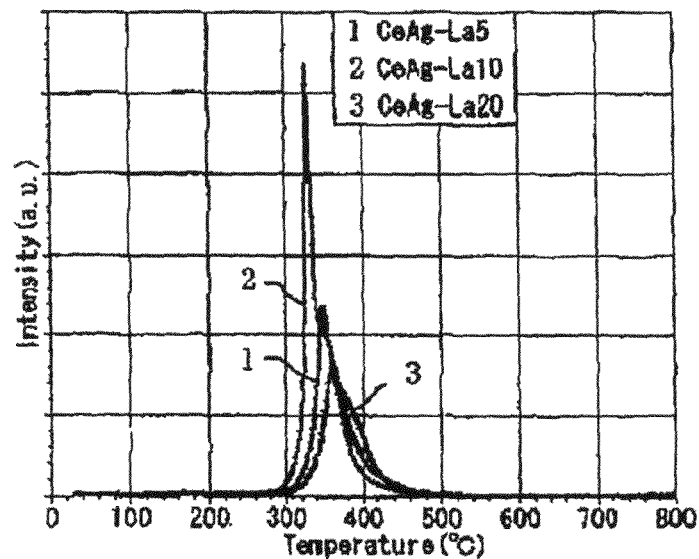
FIG. 40 is a graph showing results of $CO_2$ generation intensity evaluations (initial stages) using CeAg-additive compositions (Examples 13 to 15).
Figure 41:
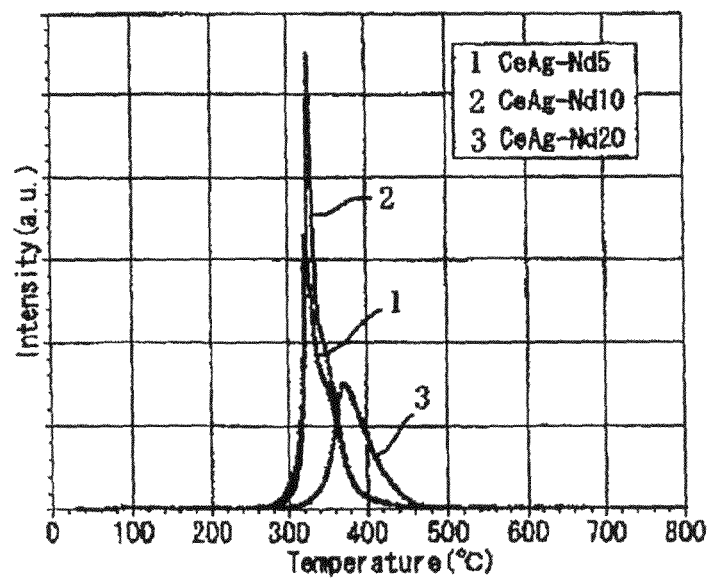
FIG. 41 is a graph showing results of $CO_2$ generation intensity evaluations (initial stages) using CeAg-additive compositions (Examples 16 to 18).
Figure 42:
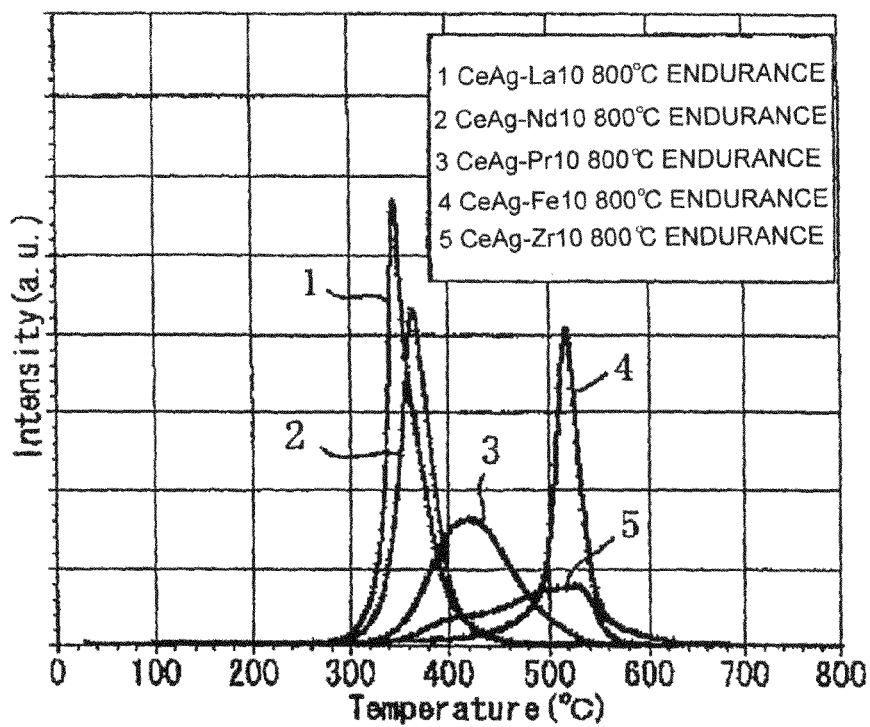
FIG. 42 is a graph showing results of $CO_2$ generation intensity evaluations (after endurance) using the CeAg-additive compositions (Examples 14, 17, and 19 to 22).
Figure 43:
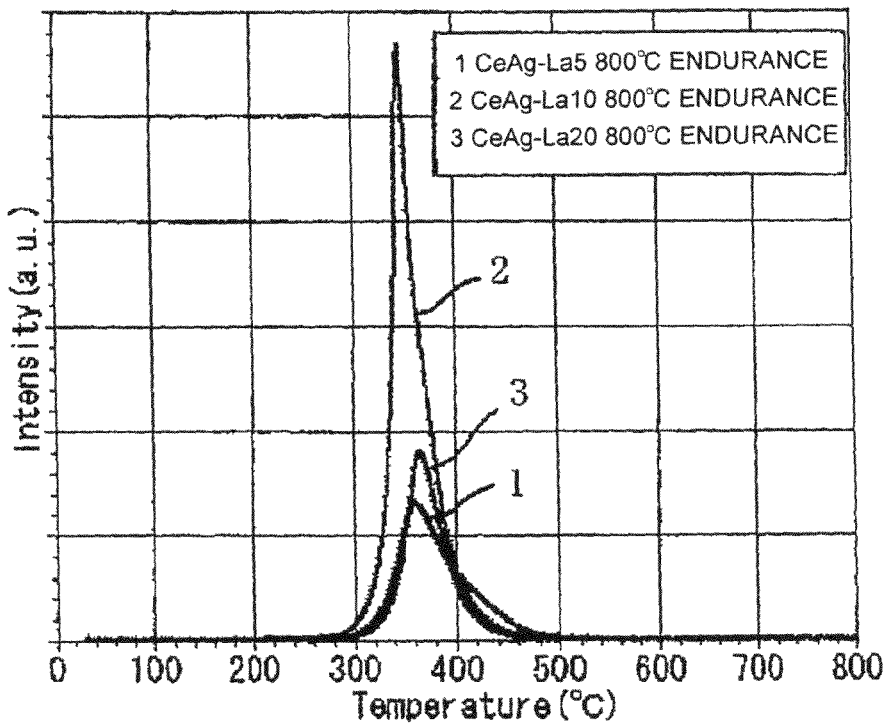
FIG. 43 is a graph showing results of $CO_2$ generation intensity evaluations (after endurance) using the CeAg-additive compositions (Examples 13 to 15).
Figure 44:
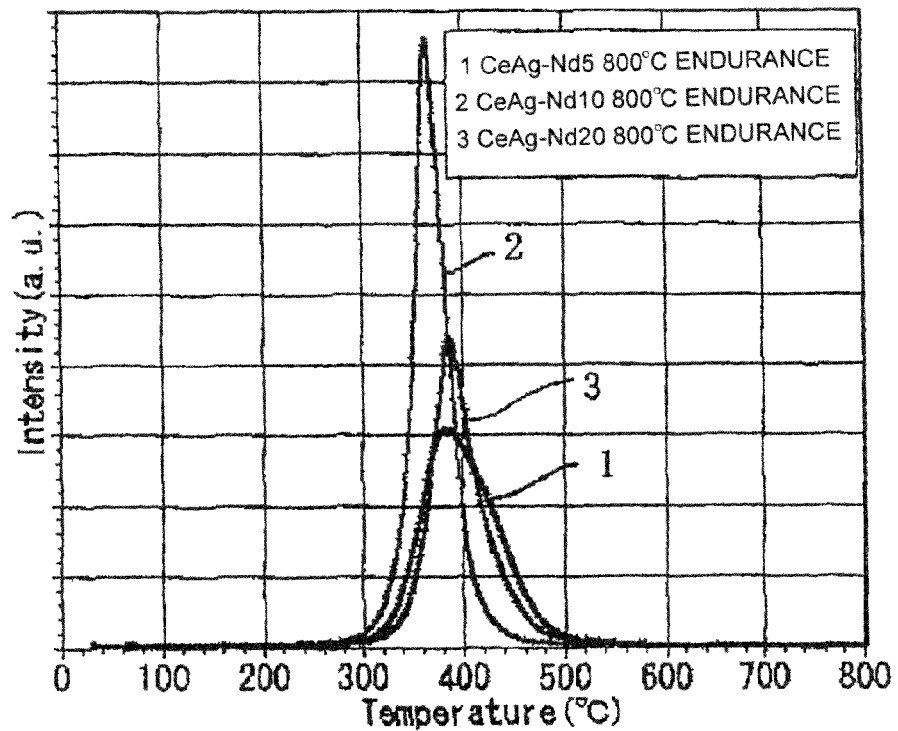
FIG. 44 is a graph showing results of $CO_2$ generation intensity evaluations (after endurance) using the CeAg-additive compositions (Examples 16 to 18).
Figure 45:
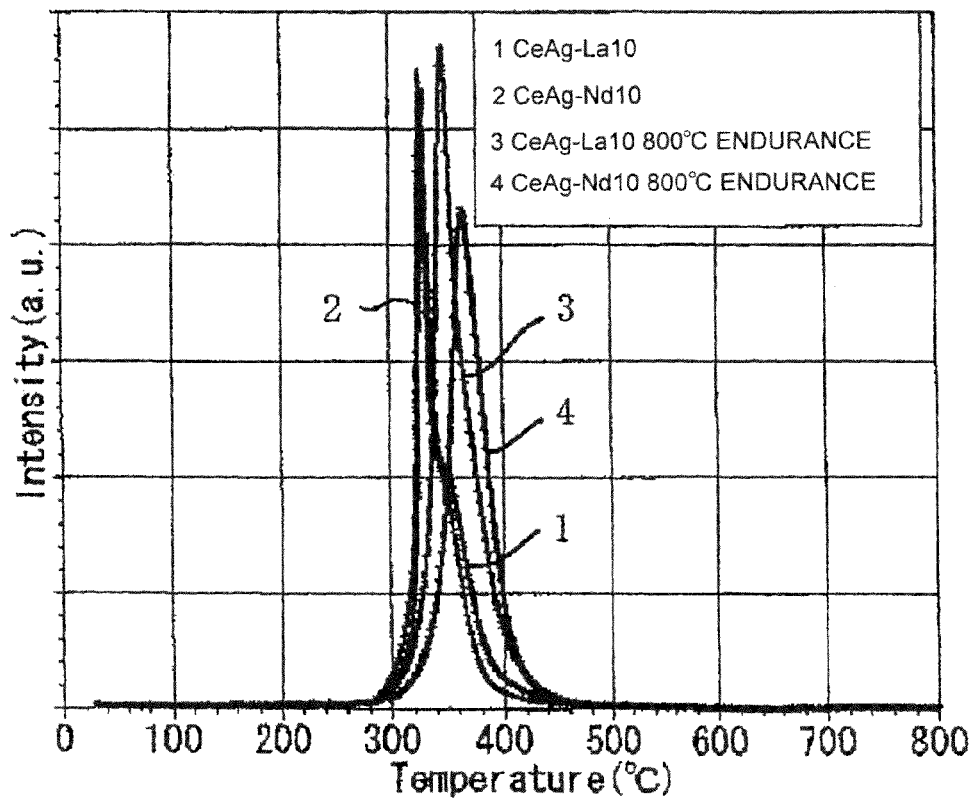
FIG. 45 is a graph showing results of $CO_2$ generation intensity evaluations (initial stages and after endurance) using the CeAg-additive compositions (Examples 14 and 17).

Peaks of Ag in the CeAg-additive composition (CeAg—La10) obtained in Example 14 and in the $CeO_2$—Ag support material ($Ag/CeO_2$) obtained in Comparative Example 6 were found by use of the XRD. Obtained results are shown in FIG. 38. Here, FIG. 38 is normalized so that both of the peaks are aligned at the maximum values.

As apparent from the results shown in FIG. 38, the Ag peak of the $CeO_2$—Ag support material ($Ag/CeO_2$) was located in a range from about 37.5° to 39°. On the other hand, the Ag peak of the CeAg-additive composition (CeAg—La10) formed a broad peak with wider trails. The present inventors speculate that this is attributable to the Ag ultrafine particles existing on the surfaces of the latter substance.

<Evaluation of $CO_2$ Generation Intensities Attributed to CeAg-additive Compositions>

Concerning the CeAg-additive compositions obtained in Examples 13 to 22, the $CO_2$ generation intensities upon rise in temperature were measured in accordance with the above-described evaluation of the $CO_2$ generation intensities. Obtained results are shown in FIGS. 39 to 45.

As apparent from the results shown in FIGS. 39 to 45, from comparison of initial performances (calcinating for 5 hours at 500° C.) and comparison after endurance testing (calcinating for 5 hours at 800° C.), it was confirmed that the CeAg-additive compositions, which were synthesized by performing inverse precipitation and the aggregation process while setting the feed ratio of Ce:Ag=40:60 (molar ratio) and adding La or Nd at the proportion of Ce: (La or Nd)=90:10 (molar ratio), had extremely high soot oxidation activity both at the initial stages and after endurance.

Meanwhile, the soot oxidation activity was similarly investigated regarding the CeAg-additive compositions after enduring testing for 50 hours at 800° C. As a consequence, it was confirmed that the soot oxidation activity was maintained even after enduring testing for 50 hours at the same level as the soot oxidation activity after enduring testing for 5 hours.

Next, the CeAg-additive composition obtained in Example 14 was subjected to a sulfur poisoning process for 1 hour at 350° C. under an atmosphere containing 10% of $O_2$ and 100 ppm of $SO_2$, and then the $CO_2$ generation intensity upon rise in temperature was measured similarly to the above-described evaluation of the $CO_2$ generation intensities. An obtained result is shown in FIG. 46 with a result before carrying out the sulfur poisoning test.

Figure 46:
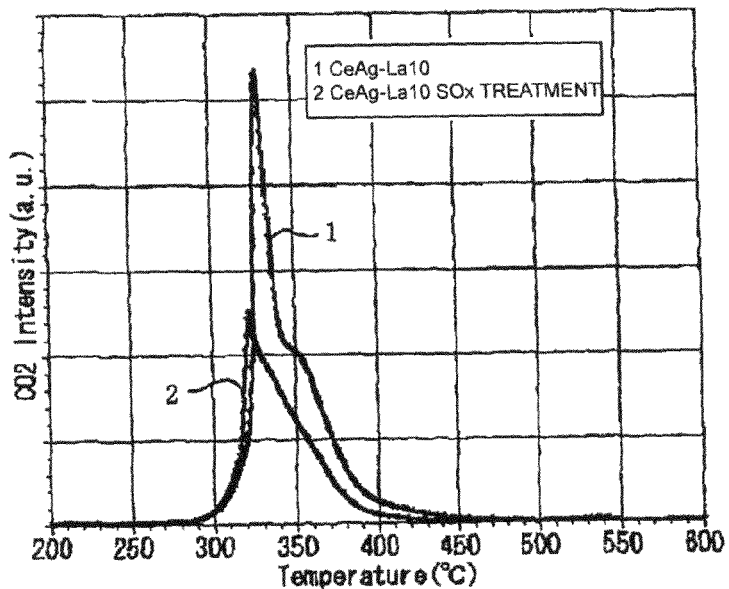
FIG. 46 is a graph showing results of $CO_2$ generation intensity evaluations using the CeAg-additive composition (Example 14) before and after a sulfur poisoning test.

As apparent from the result shown in FIG. 46, it was confirmed that the CeAg-additive composition obtained in Example 14 exhibited no deterioration after undergoing the sulfur poisoning test and that soot oxidation temperature was slightly lowered. Although a mechanism in this case is uncertain, it is presumably because either absorbed $SO_2$ or absorbed $SO_3$ that is generated by oxidation of $SO_2$ reacts with the soot. Moreover, although a result is not shown herein, deterioration in the soot oxidation performance was scarcely confirmed even after carrying out a process for 2 hours at 500° C. in a balanced atmosphere containing 5% of $H_2$ and 95% of $N_2$.

Further, the CeAg-additive composition obtained in Example 14 was subjected to the following:
(1) a sulfur poisoning process for 1 hour at 350° C. under an atmosphere containing 10% of $O_2$ and 100 ppm of $SO_2$;
(2) a sulfur poisoning process for 1 hour at 600° C. under an atmosphere containing 10% of $O_2$ and 500 ppm of $SO_2$; and
(3) a sulfur poisoning process for 5.5 hours at 800° C. under an atmosphere containing 10% of $O_2$ and 500 ppm of $SO_2$.
Thereafter, the $CO_2$ generation intensities upon rise in temperature were measured similarly to the above-described evaluation of the $CO_2$ generation intensities. Obtained results are shown in FIG. 47.

Figure 47:
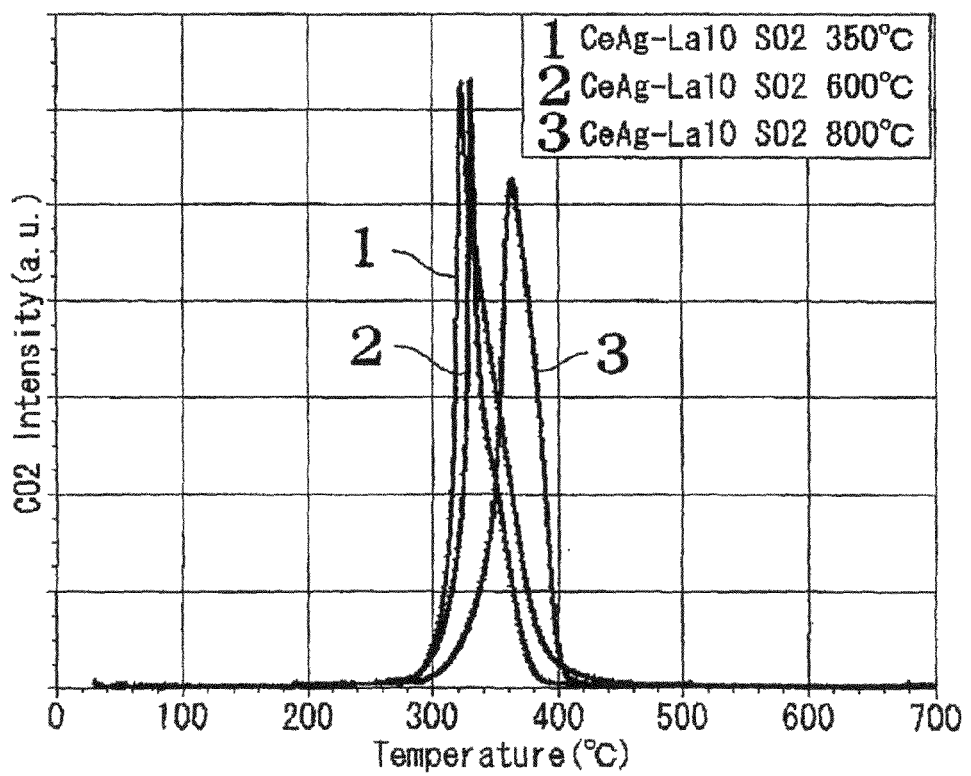
FIG. 47 is a graph showing results of $CO_2$ generation intensity evaluations using the CeAg-additive composition (Example 14) before and after a high-temperature sulfur poisoning test.

As apparent from the results shown in FIG. 47, the activity was slightly degraded in the CeAg-additive composition obtained in Example 14 due to sulfur poisoning at a high temperature. Nevertheless, it was confirmed that the mere existence of $SO_2$ did not seriously degrade the activity so as to disable the catalyst.

<Evaluation of Soot Oxidation Rate Attributed to CeAg-additive Composition>

Figure 48:
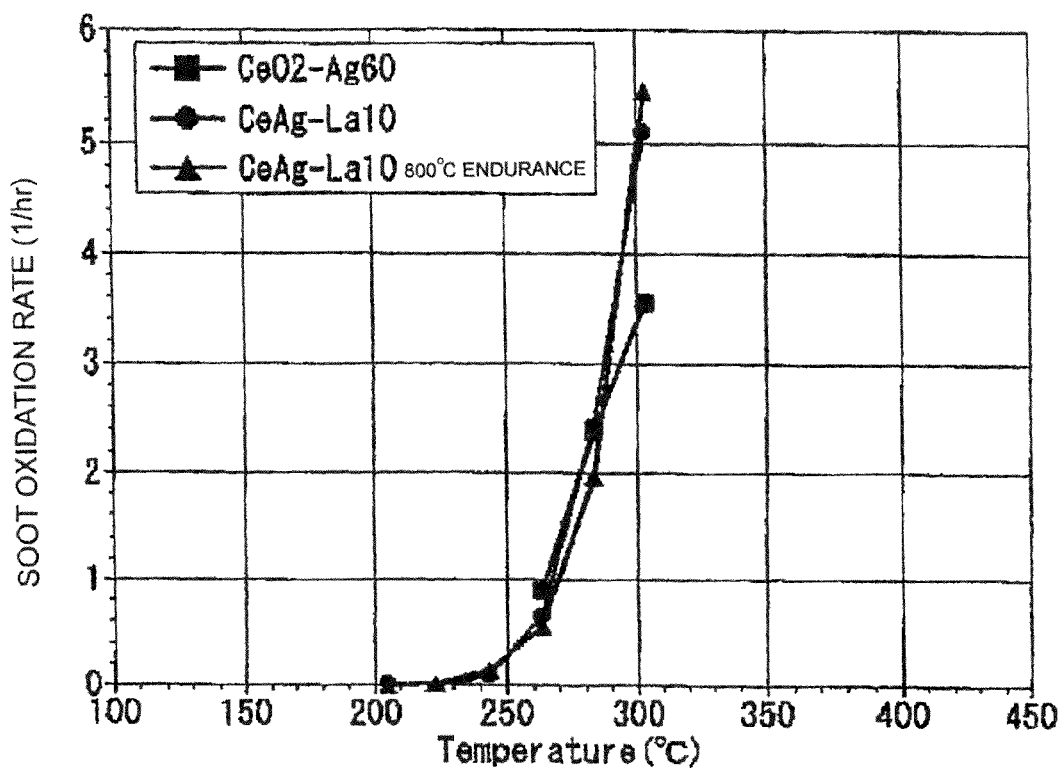
FIG. 48 is a graph showing results of measurement of soot oxidation rates in terms of the $CeO_2$—Ag composition obtained in Example 8 and the CeAg-additive composition obtained in Example 14.

Concerning the $CeO_2$—Ag composition obtained in Example 8 and the CeAg-additive composition obtained in FIG. 14, soot oxidation rates were calculated similarly to the above-described evaluation of the soot oxidation rate. Obtained results are shown in FIG. 48. Here, the CeAg-additive composition obtained in FIG. 14 after calcinating (endurance testing) for 5 hours at 800° C. in the atmosphere containing oxygen at 10% by volume and nitrogen at 90% by volume was also subjected to measurement.

As apparent from the results shown in FIG. 48, the soot oxidation activity was detected from around 240° C. in each of the compositions. In particular, it was confirmed that the CeAg-additive composition obtained in Example 14 had extremely high soot oxidation activity both at the initial stage and after endurance.

Meanwhile, the soot oxidation activity was similarly investigated regarding the CeAg-additive composition after enduring testing for 50 hours at 800° C. As a consequence, it was confirmed that the soot oxidation activity was maintained even after enduring testing for 50 hours at the same level as the soot oxidation activity after enduring testing for 5 hours.

<Measurement of Particle Size Distribution>

The $CeO_2$—Ag composition obtained in Example 8 and the CeAg-additive composition obtained in Example 14 were subjected to measurement of particle size distribution by use of a laser diffraction/scattering particle size distribution analyzer (MT3300EX, made by Nikkiso Co. Ltd.). Here, the CeAg-additive composition obtained in Example 14 was subjected to measurement after calcinating (endurance testing) for 5 hours at 800° C. in the atmosphere containing oxygen at 10% by volume and nitrogen at 90% by volume. Obtained results are shown in FIG. 49.

Figure 50:
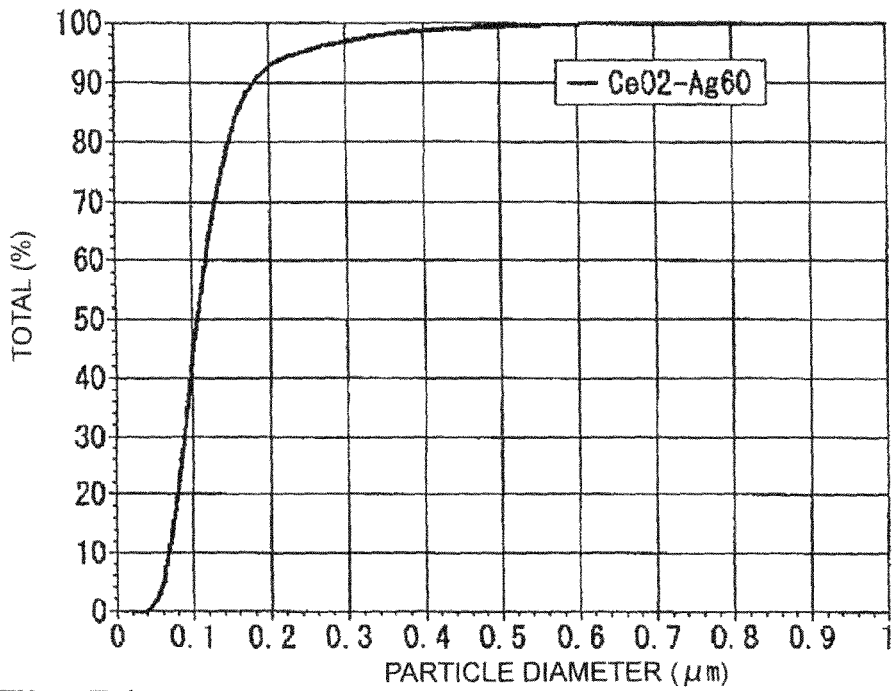
FIG. 50 is a graph showing particle size distribution (accumulated total) of the $CeO_2$—Ag composition obtained in Example 8 (after endurance testing).

Meanwhile, the measurement result of the particle size distribution obtained in terms of the $CeO_2$—Ag composition obtained in Example 8 is shown in FIG. 50 in which the result is shown with longitudinal axis as a total (in percent by volume).

Figure 49:
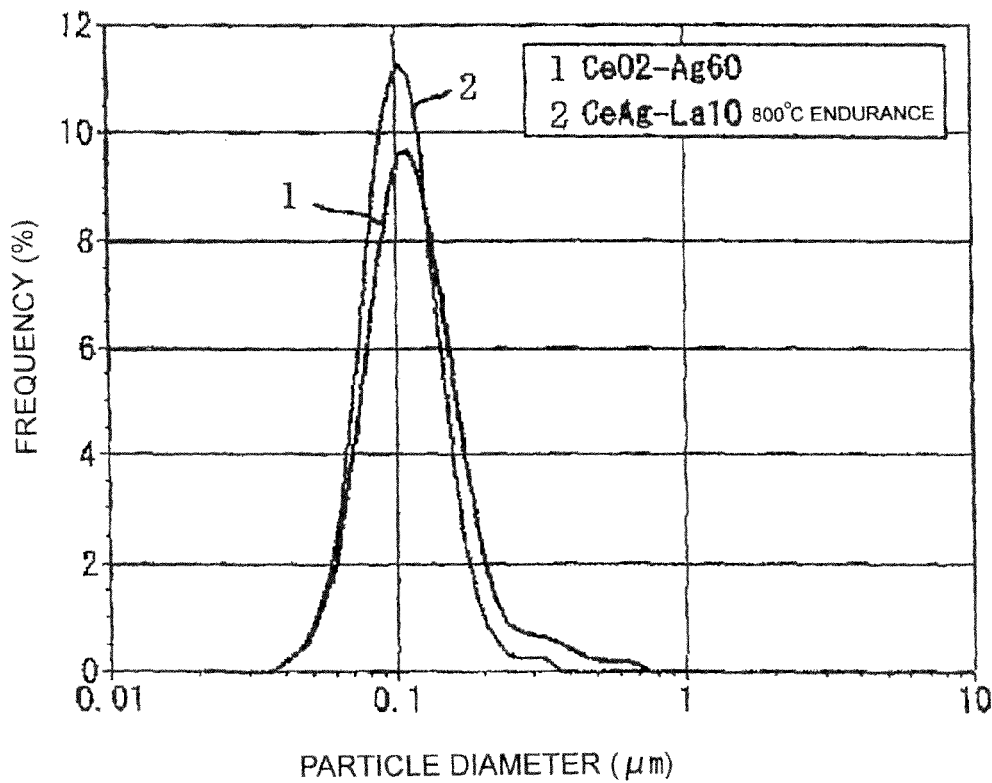
FIG. 49 is a graph showing particle size distribution of the $CeO_2$—Ag composition obtained in Example 8 and the CeAg-additive composition (after endurance testing) obtained in Example 14.

As apparent from the results shown in FIG. 49, in each of the compositions, the average particle diameter of the obtained aggregate was around 0.1 μm. Hence extremely high particle diameter dispersibility was confirmed. Meanwhile, as apparent from the result shown in FIG. 50, the average particle diameter of the $CeO_2$—Ag composition obtained in Example 8 was around 0.1 μm. Here, it was confirmed that 80% of the particles fell in a range from 0.05 to 0.15 μm that represents the range 0.1 μm±50%.

Meanwhile, slurry obtained by centrifugation of the aggregates of the CeAg-additive composition (CeAg—La10) obtained in Example 14 after the aggregation process (before calcinating) so as to be dispersed in water at the concentration of 15% by mass was subjected to measurement of the particle size distribution similarly. An obtained result is shown in FIG. 51.

Figure 51:
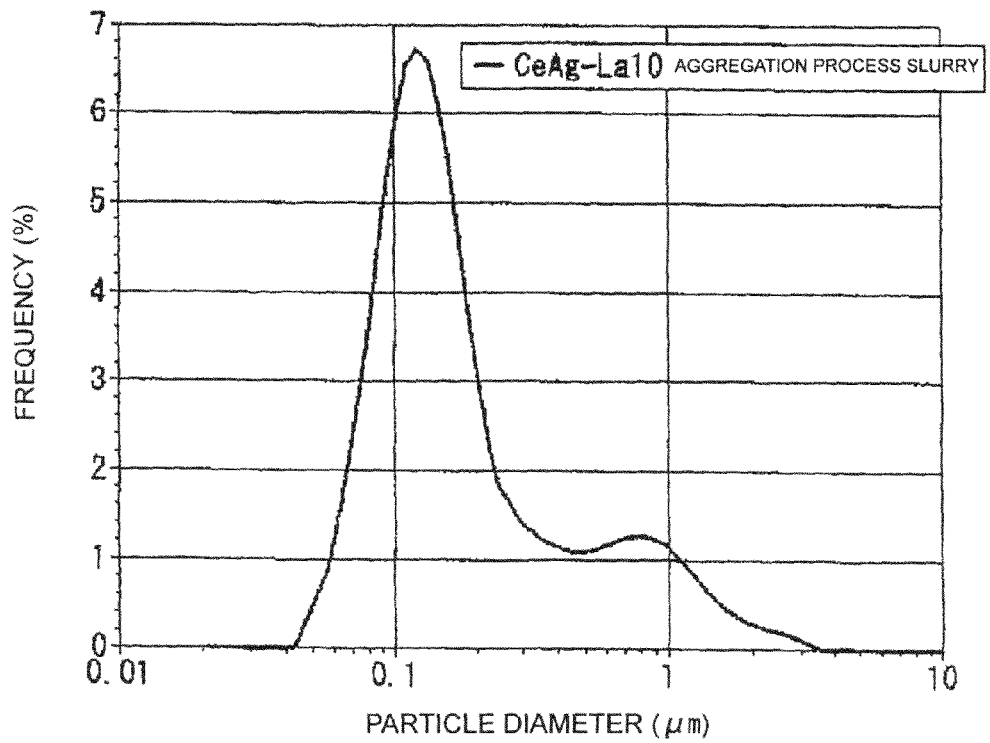
FIG. 51 is a graph showing particle size distribution of the CeAg-additive composition obtained in Example 14 after the aggregation process (before calcinating).

As apparent from the result shown in FIG. 51, the aggregates of the CeAg-additive composition obtained in Example 14 had high dispersibility and secondary particles the main parts thereof was approximately 0.1 μm were preferably dispersed. Accordingly, it was confirmed that the aggregates can be supported on DPF having pores in the size of about 30 μm, for example.

<Measurement of Average Particle Diameters of Aggregates>

Concerning the $CeO_2$—Ag composition obtained in Example 8, the CeAg-additive composition (CeAg—Fe10) obtained in Example 20, and the CeAg-additive composition (CeAg—Al10) obtained in Example 22, the average particle diameters of the obtained aggregates (after calcinating and an ultrasonic treatment for 3 minutes) were measured by use of the laser diffraction/scattering particle size distribution analyzer. Obtained results are as follows.

$CeO_2$—Ag: 0.10 μm
CeAg—Fe10: 0.143 μm
CeAg—Al10: 0.193 μm

From these results, it was confirmed that the particle diameters of the obtained aggregates can be controlled by adding the additive metal such as Fe or Al.

<Measurement of Oxygen Storage/release Capacity (OSC)>

Concerning the CeAg-additive composition (CeAg—La10) obtained in Example 14 and high specific surface area ceria, oxygen storage/release capacities (OSC) were measured as described below. Specifically, 15 g of each substance was weighed and each sample was repeatedly subjected to an oxidation-reduction process at 500° C. while supplying $N_2$ gas containing 20% of $H_2$ and $N_2$ gas containing 50% of $O_2$, alternately. The OSC was found by measuring a change in weight during the process by use of the thermogravimetric analyzer. As a result, a total OSC of the CeAg-additive composition obtained in Example 14 was equal to 66.3 μmol-$O_2$/g. On the contrary, a total OSC of the high specific surface area ceria was equal to 4.16 μmol-$O_2$/g.

From these results, it was apparent that the CeAg-additive composition obtained in Example 14 had a high OSC in spite of not supporting noble metal such as platinum. Moreover, an involvement of the gas-phase oxygen in an amount equal to or above a probabilistic existing amount on the support was confirmed. Accordingly, the above-mentioned assumption that the reaction takes place by way of the surface oxide was affirmed.

<Tests Using DPF>

The above-described evaluation in accordance with the thermogravimetric analysis (TG) was carried out in a tight-contact state. The reason for carrying out the evaluation in the tight-contact state was to focus on chemical properties of the catalyst materials. However, there is also a concern that the state of contact between the soot and the catalyst may be considerably different from the case of application to exhaust gas from an automobile. Therefore, the following processes were carried out in order to confirm that the material which can oxidize the soot from a lower temperature according to the TG evaluation also has a high soot oxidation performance similarly in the case of DPF.

(i) Preparation of Test Piece 1

The $CeO_2$—Ag composition obtained in Example 8 and the CeAg-additive composition obtained in Example 14 were coated on a test piece size (35 ml) DPF (made of cordierite, porosity 65%, average pore diameter 30 μm) in accordance with a coating method 1 described below. Moreover, a test piece coated only with ceria sol ($CeO_2$) and a test piece consisting of a substrate were also prepared for comparison.

[Coating Method 1]

Powder obtained by calcinating after the inverse precipitation and aggregation process and ceria sol (a commercially available product) as a binder were mixed at a weight ratio of 90:10 and the obtained mixture was allowed to contact the DPF by applying ultrasonic waves so that the mixture enter the pores. After suctioning in this state, the DPF was subjected to calcinating for 1 hour at 500° C. in air. The process was repeated until a support amount (coverage) reached 150 g/L.

(ii) Preparation of Test Piece 2

The CeAg-additive composition obtained in Example 14 was coated on the same DPF in accordance with a coating method 2 described below. Moreover, another test piece was also prepared by subjecting the test piece to calcinating (endurance testing) for 5 hours at 800° C. in the atmosphere containing 10% of $O_2$ and 90% of $N_2$ after coating.

[Coating Method 2]

Precipitations (aggregates) obtained after the inverse precipitation and aggregation process were collected by centrifugation. Slurry having the concentration of 15% by mass was obtained by adding water to the precipitations. Subsequently, the slurry was allowed to contact the DPF so as to enter the pores thereof. After suctioning in this state, the DPF was subjected to calcinating for 1 hour at 500° C. in air. The process was repeated until a support amount (coverage) reaches 150 g/L. This method is similar to the coating method 1 except that no binder is used therein. An advantage of this method is that the precipitations are sintered at the time of calcinating and thereby function as a binder. Accordingly, it is possible to form coating that consists of only the components effective for soot oxidation. Moreover, upon measurement of the particle size distribution of the slurry, it was confirmed that the aggregates approximately equal to 0.1 μm were stably dispersed whereby it can be easy to coat the DPF. Here, the contact is achieved in this coating method while curtailing application of the ultrasonic waves, however, it is also possible to perform this process while applying the ultrasonic waves.

(iii) Evaluation of Composite Material Substrate.

Figure 52:
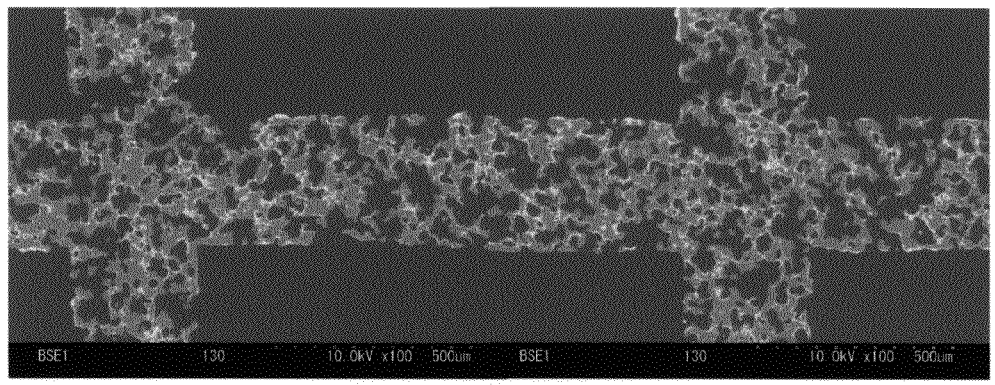
FIG. 52 is a SEM photograph showing a cross section of a composite material substrate obtained by a coating method 2 using a test piece 2.

A composite material substrate (coverage 130 g/L) obtained in accordance with the coating method 2 was buried into a resin and subjected to cross-sectional observation with the SEM after cutting out a cross section. An obtained result is shown in FIG. 52. As apparent from the result shown in FIG. 52, there were no occluded pores in the obtained substrate, and it was confirmed that the substrate was uniformly covered with the composite material on the whole including the inside of the pores. Here, a white portion in the drawing is the CeAg—La catalyst and a gray portion is the cordierite substrate.

Figure 53:
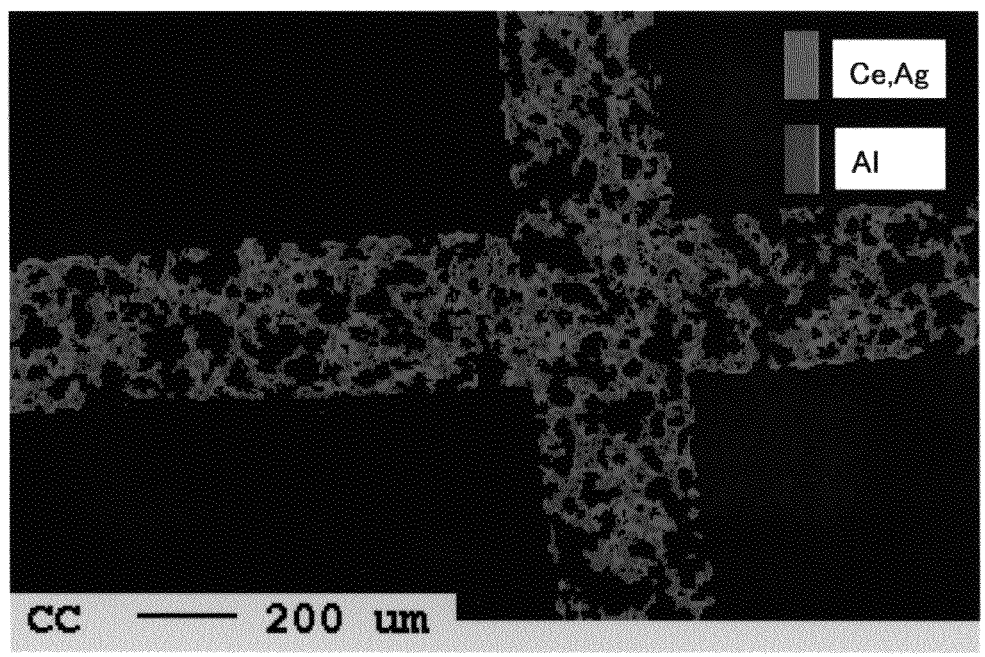
FIG. 53 is a SEM photograph showing a result of EPMA element distribution of the cross section of the composite material substrate obtained by the coating method 2 using the test piece 2.

Moreover, elemental distribution was measured in accordance with EPMA using the same sample. An obtained result is shown in FIG. 53. As apparent from the result shown in FIG. 53, it was confirmed that the composite material was uniformly coated on the entire cordierite surface including the inside of the pores of the substrate. Here, in the drawing, a portion indicated in red is a portion where Ce and Ag which are catalyst components overlap each other, and a portion indicated in blue shows distribution of Al that represents the substrate component. Moreover, since no binder was used therein, it was also confirmed that there were very few coated portions where Ce and Ag did not coexist.

Figure 54:
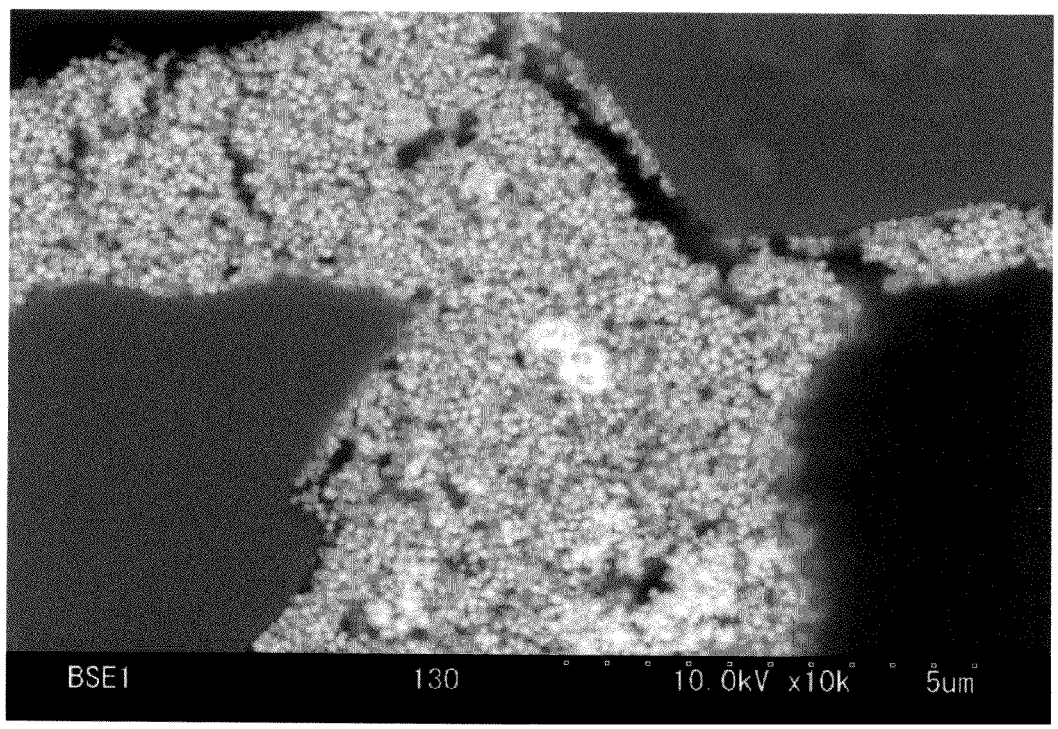
FIG. 54 is a SEM photograph showing a cross section of the composite material substrate obtained by the coating method 2 using the test piece 2.

In addition, a photograph obtained by further enlarging the above SEM photograph is shown in FIG. 54. As apparent from a result shown in FIG. 54, it was confirmed that the composite materials having the particle diameter of about 0.1 μm were distributed on the substrate. Moreover, it is likely that cracks were generated by a difference in the thermal expansion coefficient between the substrate and the composite material. Furthermore, it was also confirmed that solid particles can be trapped by use of these cracks when removing solid components such as the PM. Here, if it is not desirable to generate the cracks, the substrate and the composite material having the same degree of thermal expansion coefficient should be selected. Alternatively, it is possible to reduce the cracks on the outermost surfaces by increasing the coverage of the composite material. Further, a white portion in the drawing seems attributable to an influence at the time of resin-burying and polishing processes.

(iv) Evaluation Method 1

Figure 55:
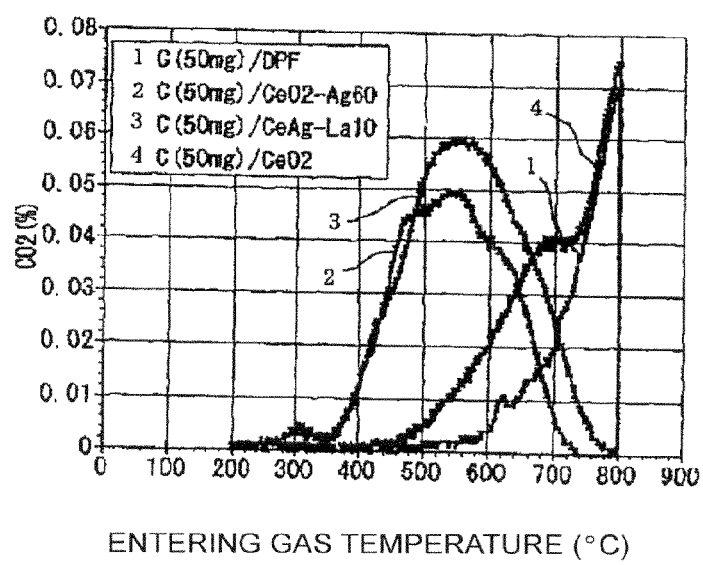
FIG. 55 is a graph showing results of soot oxidation performance tests using DPF (a test piece 1).
Figure 56:
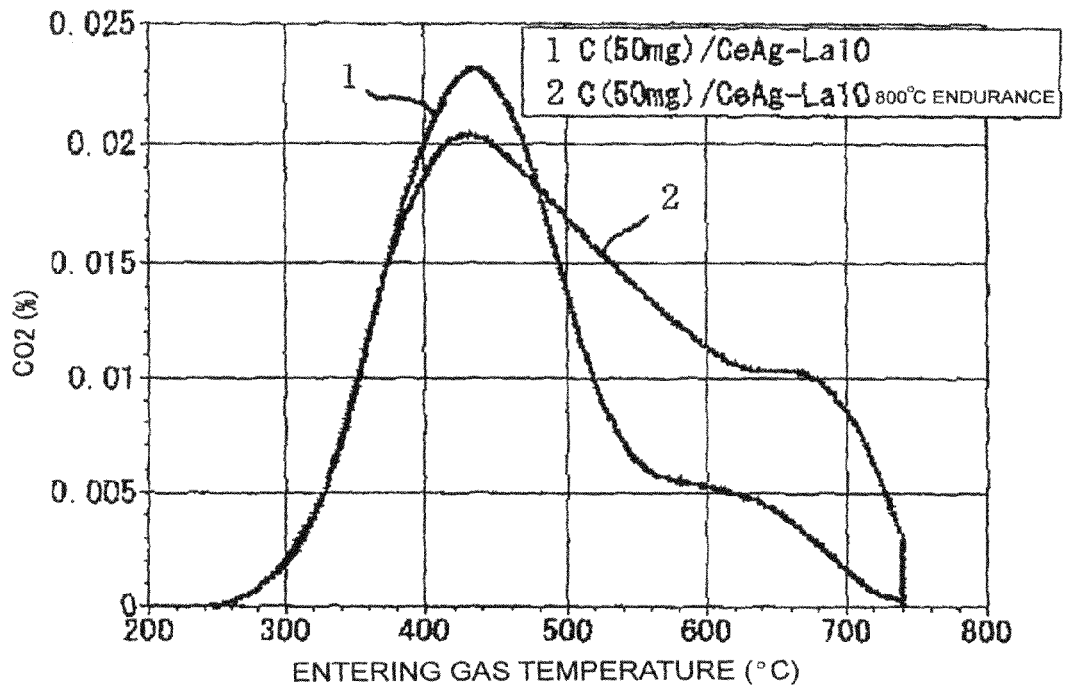
FIG. 56 is a graph showing results of soot oxidation performance tests using DPF (the test piece 2).

Model carbon in an amount of 50 mg was attached to each of the test pieces. These pieces were heated at a temperature increasing rate of 20° C./min in an atmosphere containing 10% of $O_2$ at a flow rate of 15 L/min for the test piece 1 and in an atmosphere containing 10% of $O_2$ at a flow rate of 30 L/min for the test piece 2. The soot oxidation performances then were compared based on $CO_2$ peaks. Obtained results are shown in FIG. 55 (for the test piece 1) and FIG. 56 (for the test piece 2). Moreover, the test pieces placed in an atmosphere containing 10% of $O_2$ and 500 ppm of NO were evaluated similarly.

As apparent from the results shown in FIG. 55, according to the material of the present invention, a rise temperature of $CO_2$ was almost identical to a rise temperature in the case of the tight-contact. Therefore, it was confirmed that the state corresponding to the tight-contact can be achieved in the case of attachment to the DPF. In the case of "CeAg—La10", both of the rise temperature of $CO_2$ and a peak temperature of $CO_2$ dropped by approximately 50° C. according to the evaluation in the atmosphere containing 10% of $O_2$ and 500 ppm of NO (not illustrated).

Here, since the carbon is attached in advance under this test condition, it is conceivable that an attached portion to a similar state to the tight-contact starts oxidation in the first place. Since the soot is continuously generated and attached to the DPF in the case of application to usage for exhaust gas purification, oxidation at a low temperature is likely to occur more easily. Moreover, an end temperature of oxidation also dropped in the case of using the material of the present invention unlike the case of using only $CeO_2$ or only the substrate.

Moreover, as apparent from the results shown in FIG. 55, according to the CeAg-additive composition obtained in Example 14, a rise temperature of $CO_2$ was almost identical to a rise temperature in the case of the tight-contact. Moreover, it was confirmed that soot oxidation behaviors did not change at a low temperature even after endurance testing. In the case of attaching the model carbon to the test piece consisting only of the substrate (C(50 g)/DPF in FIG. 55), generation of CO in an amount of about 0.06% was observed at 800° C. On the contrary, such CO generation was scarcely observed in the case of using the oxidation catalyst substrate of the present invention.

(v) Evaluation Method 2

Purification efficiency was measured by use of the test piece 2 under conditions of a flow rate of 30 mL/min, an atmosphere containing 10% of $O_2$, 1000 ppm of HCs, 0.16% of CO, and 50% of $CO_2$, and a temperature increasing rate of 15° C./min. As a result, the purification efficiency almost reached 100% at 400° C.

(vi) Evaluation Method 3

The soot oxidation performances were compared based on $CO_2$ peaks as similar to Evaluation method 1 except using the test piece 2, depositing the PM in exhaust air from a diesel engine at 200° C. and approximately 2 g/L instead of attaching the model carbon, and then removing unburned hydrocarbon components by maintaining a $N_2$ atmosphere for 15 minutes at 500° C. Obtained results are shown in FIG. 57.

Figure 57:
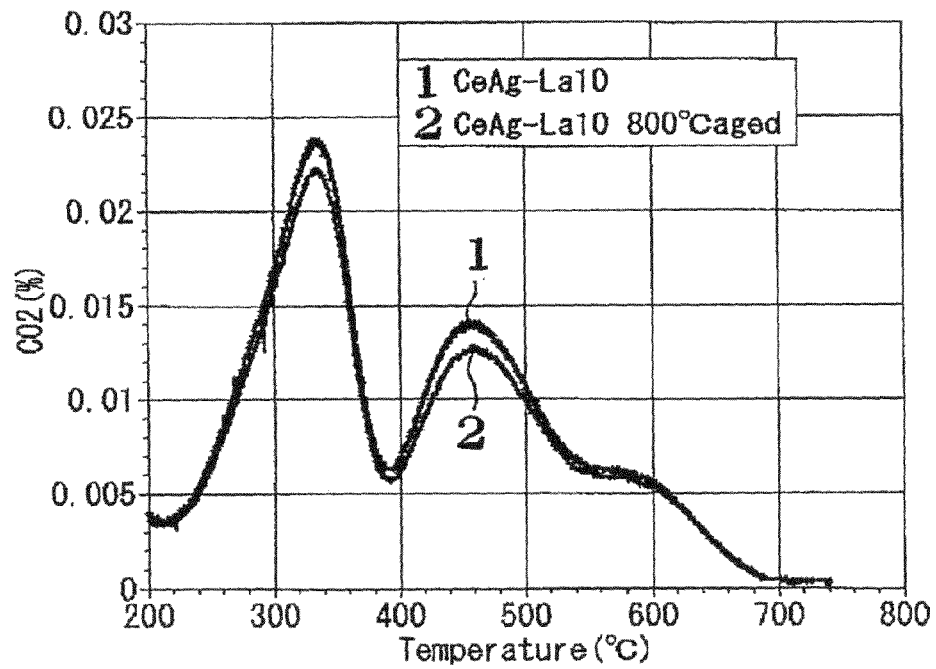
FIG. 57 is a graph showing results of soot oxidation performance tests using DPF (the test piece 2).

As apparent from the results shown in FIG. 57, deterioration was not confirmed even when executing an enduring process at 800° C. in an atmosphere containing 10% of $O_2$. Here, a proportion of high temperature peak becomes larger when increasing the amount of PM deposition. Hence it was confirmed that it is preferable to carry out continuous oxidation at a temperature equal to or below 400° C. for use in an exhaust gas purifier.

Moreover, a substrate subjected to a similar process to Evaluation method 3 except the temperature rise was regulated to 400° C. at the maximum at the time of evaluation was cut out and observed with an optical microscope. Here, the black color level was apparently reduced as compared to the substrate just after trapping the PM. Accordingly, it was confirmed obvious that the soot can be oxidized at a temperature equal to or below 400° C.

(vii) Evaluation Method 4

A full-sized composite material substrate was fabricated similarly to the test piece 2 except using 2 L-sized DPF (made of cordierite, porosity 65%, average pore diameter 30 μm) (coverage 150 g/L).

The full-sized composite material substrate thus obtained was placed inside a pipe extending from an engine, and a PM oxidation performance was evaluated by measuring pressure fluctuation. Here, a 2 L diesel engine was used as the engine, and the pressure at an inlet of the substrate was measured under operating conditions of 3000 rpm and 11.0 kgm. The exhaust gas temperature at the inlet of the substrate was approximately equal to 360° C. Then, variation in the pressure difference was measured from a certain time point to the time point where stable conditions were established. An obtained result is shown in FIG. 58.

Figure 58:
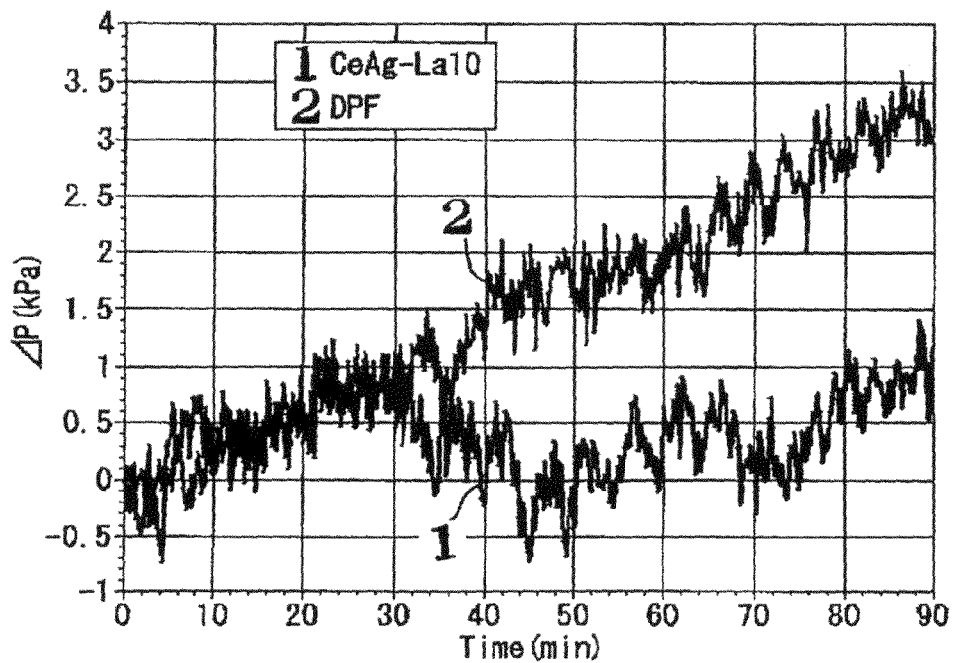
FIG. 58 is a graph showing results of soot oxidation performance tests using 2 L-sized DPF.

As apparent from the obtained result shown in FIG. 58, the pressure was monotonously increased as time goes by in the case of using the DPF substrate only, since PM was not oxidized with the DPF substrate only. On the contrary, in the case of using the composite material of the present invention, the pressure remained almost constant though some pressure fluctuation was observed. From this result, it was confirmed that the composite material substrate of the present invention can oxidize the PM continuously.

<HC Oxidation Performance Evaluation Test>

A HC oxidation performance was evaluated by use of a test piece which was obtained similarly to the method of preparing the test piece 2 (the coating method 2) using the CeAg-additive composition obtained in Example 14 except setting the support amount (coverage) equal to 50 g/L. Specifically, upon evaluation of the HC oxidation performance, concentrations (vol %) of CO, $CO_2$ and $C_3H_6$ (THC) were measured at a flow rate of 30 L/min, in an atmosphere containing 500 ppm of THC and 10% of $O_2$, and at a temperature rising rate of 20° C./min. An obtained result is shown in FIG. 59.

Figure 59:
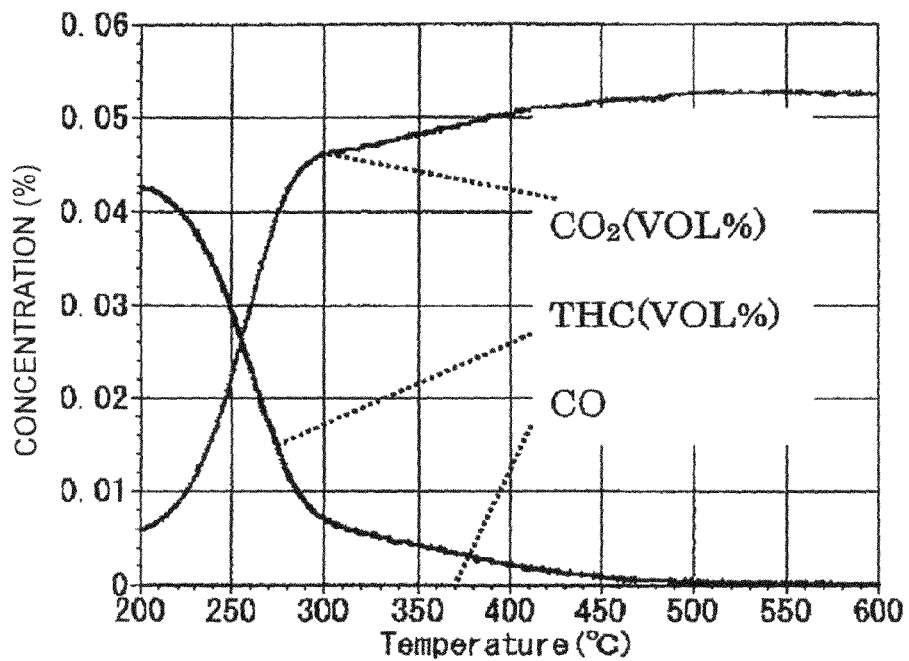
FIG. 59 is a graph showing a result of a HC oxidation performance test.

As apparent from the result shown in FIG. 59, an exhaust gas purifier using the composite material of the present invention exhibited sufficient activity in a temperature range equal to or above 200° C. It was also confirmed that no CO was generated as a consequence of HC oxidation.

<NO Oxidation Performance Evaluation Test>

A NO oxidation performance was evaluated by use of a test piece which was obtained similarly to the method of preparing the test piece 2 (the coating method 2) using the CeAg-additive composition obtained in Example 14 except setting the support amount (coverage) equal to 50 g/L. Specifically, upon evaluation of the NO oxidation performance, a concentration (vol %) of NO was measured at a flow rate of 30 L/min, in an atmosphere containing 600 ppm of NO and 10% of $O_2$, and at a temperature rising rate of 20° C./min. An obtained result is shown in FIG. 60.

Figure 60:
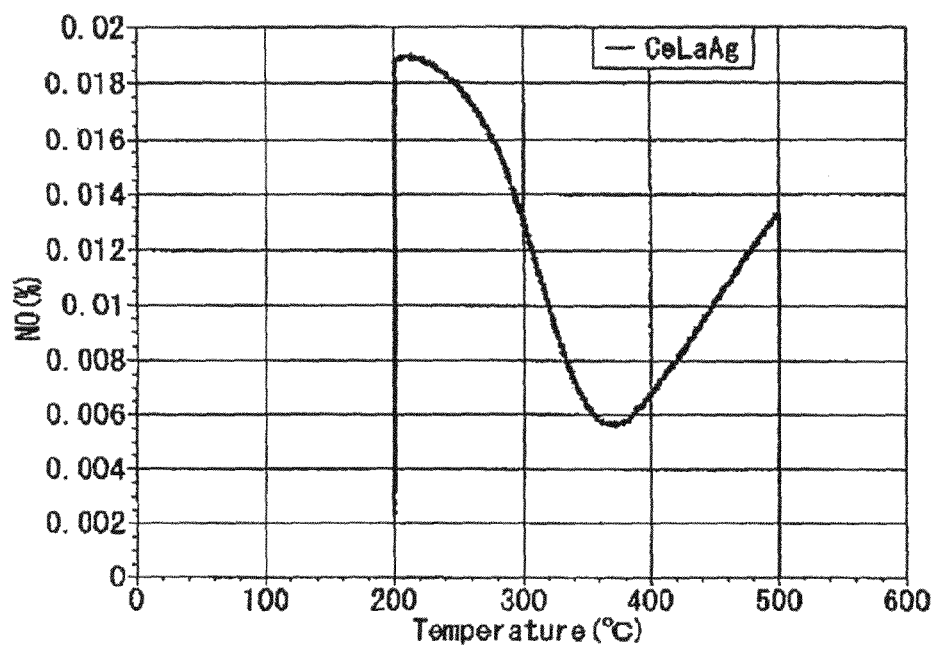
FIG. 60 is a graph showing a result of a NO oxidation performance test.

As apparent from the result shown in FIG. 60, it was confirmed that an exhaust gas purifier using the composite material of the present invention can oxidize NO sufficiently. Note that, although the concentration of NO starts increasing in a region equal to or above 350° C., this phenomenon is caused by domination of a chemical equilibrium.

Industrial Applicability

As described above, according to the present invention, it is possible to provide a composite material which is extremely useful as an oxidation catalyst and the like capable of oxidizing a carbon-containing component such as soot and a component such as HC, CO or NO sufficiently at a lower temperature, and a composite material substrate using the composite material. Moreover, according to the present invention, it is possible to efficiently and surely obtain the above-described composite material and the composite material substrate using the composite material.

Therefore, the present invention is extremely useful as a technique concerning an oxidation catalyst, which is applicable to means for removing a PM component in exhaust gas, means for preventing insulation breakdown of an insulator or the like attributable to attachment of carbon materials thereto, means for preventing caulking in a modified catalyst, processing of carbon materials such as fullerenes or carbon nanotubes, partial oxidation of hydrocarbons such as partial oxidation of ethylene into ethylene epoxy, and the like.

Moreover, the composite material of the preset invention is also useful as an ozone decomposition catalyst capable of decomposing $O_3$ near a room temperature, an exhaust air purifier utilizing the property to trap oxygen in a gas phase, an air electrode catalyst for a fuel cell utilizing high conductivity of Pt, Au or Ag, and so forth.

The invention claimed is:

1. A composite material comprising:
  an aggregate containing:
    a first metal particle constituting a core and having an average primary particle diameter ranging from 10 to 400 nm, the first metal particle being made of a first metal which has an ionization tendency equal to or smaller than an ionization tendency of Zn; and
    second metal oxide particulates directly contacting an outer surface of the first metal particle and having an average primary particle diameter ranging from 1 to 100 nm, the second metal oxide particulates being made of a second metal oxide which is at least one substance selected from the group consisting of oxides of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V, solid solutions thereof, and composite oxides thereof.

2. The composite material according to claim 1, wherein a first metal constituting the first metal particle is at least one substance selected from the group consisting of Ag, Pt, Rh, Pd, Ru, Ir, Os, Au, and Cu.

3. The composite material according to claim 1, wherein the first metal particle is an oxygen-extracting particle made of an oxygen-extracting material configured to extract oxygen from an oxygen-containing substance and to generate an oxygen reactive species.

4. The composite material according to claim 3, wherein the oxygen-extracting material contains Ag.

5. The composite material according to claim 1, wherein a second metal constituting the second metal oxide particulates is a valence variable metal.

6. The composite material according to claim 1, wherein second metal compound particulates constituting precursors of the second metal oxide particulates act as a reductant for a first metal compound constituting a precursor of the first metal particle.

7. The composite material according to claim 3, wherein the second metal oxide particulates are oxygen-reactive-species transporting particulates made of an oxygen-reactive-species transporting material capable of transporting an oxygen reactive species generated by the oxygen-extracting material.

8. The composite material according to claim 7, wherein the oxygen-reactive-species transporting material is a composite oxide containing any of $CeO_2$ and Ce and further contains at least one substance selected from the group consisting of La, Nd, Pr, Sm, Y, Ca, Ti, Fe, Zr, and Al as an additive metal.

9. The composite material according to claim 1, wherein average primary particle diameters of the second metal oxide particulates and of the first metal particles after calcinating for 5 hours at 500° C. in air are in a range from 1 to 75 nm and 10 to 100 nm, respectively, and the average primary particle diameter of the first metal particle is at least 1.3 times greater than the average primary particle diameter of the second metal oxide particulates.

10. The composite material according to claim 1, wherein average primary particle diameters of the second metal oxide particulates and of the first metal particles after calcinating for 5 hours at 800° C. in an atmosphere containing oxygen at 10% by volume and nitrogen at 90% by volume are in a range from 8 to 100 nm and 10 to 400 nm, respectively, and the average primary particle diameter of the first metal particle is at least 1.3 times greater than the average primary particle diameter of the second metal oxide particulates.

11. The composite material according to claim 1, wherein an average particle diameter of the aggregates is in a range from 0.05 to 0.5 μm, and a portion equal to or above 60% by volume of all the aggregates has particle diameters in a range within ±50% away from the average particle diameter.

12. The composite material according to claim 1, further comprising:
  third metal ultrafine particles supported on surfaces of the second metal oxide particulates.

13. The composite material according to claim 12, wherein a third metal constituting the third metal ultrafine particles has a lower ionization tendency than an ionization tendency of H.

14. The composite material according to claim 12, wherein the third metal constituting the third metal ultrafine particles is identical to the first metal constituting the first metal particle.

15. The composite material according to claim 1, wherein the composite material is an oxidation catalyst.

16. A composite material substrate comprising:
  a substrate; and
  the composite material according to claim 1.

17. The composite material substrate according to claim 16, wherein the substrate has pores ranging from 1 to 300 μm, and a coating layer having an average thickness equivalent to 0.5 to 50 times as large as the average particle diameter of the aggregate is formed inside the pores by use of the composite material.

18. The composite material substrate according to claim 16, wherein the composite material substrate is used as a substrate for exhaust gas purification.

19. A composite material dispersed fluid comprising:
  the composite material according to claim 1; and
  a dispersion medium.

20. The composite material dispersed fluid according to claim 19, further comprising a binder.

21. A method of manufacturing a composite material substrate:
  wherein a composite material substrate is obtained by calcinating the composite material dispersed fluid according to claim 19 after causing the fluid to contact a substrate.

22. A method of manufacturing a composite material comprising:
  generating an aggregate precursor out of a solution containing a first metal salt and a second metal salt by:
    generating second metal compound particulates under presence of a pH adjuster, and
    depositing a first metal particle by a reducing action of the second metal compound particulates, such that the first metal particle derived from the first metal salt is surrounded by the second metal compound particulates derived from the second metal salt, wherein the first metal salt is a salt of a metal having an ionization tendency equal to or lower than an ionization tendency of Zn, and wherein the second metal salt is a salt of at least one metal selected from the group consisting of La, Ce, Pr, Nd, Pm, Sm, Eu, Gd, Tb, Dy, Ho, Er, Tm, Yb, Lu, Y, Zr, Fe, Ti, Al, Mg, Co, Ni, Mn, Cr, Mo, W, and V; and obtaining a composite material by calcinating the generated aggregate precursor, the composite material comprising an aggregate that contains:

the first metal particle constituting a core and having an average primary particle diameter ranging from 10 to 400 nm, and second metal oxide particulates directly contacting an outer surface of the first metal particle and having an average primary particle diameter ranging from 1 to 100 nm.

23. The method of manufacturing a composite material according to claim 22, wherein, in the step of generating the aggregate precursor, a first metal compound derived from the first metal salt is generated under presence of a complexing agent, and the first metal particle is deposited by reducing the first metal compound by a reducing action of the second metal compound particulates.

24. The method of manufacturing a composite material according to claim 22, wherein the first metal salt is a salt of at least one metal selected from the group consisting of Ag, Pt, Rh, Pd, Ru, Ir, Os, Au, and Cu.

25. The method of manufacturing a composite material according to claim 22, wherein the first metal particle is an oxygen-extracting particle made of an oxygen-extracting material configured to extract oxygen from an oxygen-containing substance and to generate an oxygen reactive species.

26. The method of manufacturing a composite material according to claim 25, wherein the first metal salt serving as a raw material of the oxygen-extracting material contains Ag.

27. The method of manufacturing a composite material according to claim 22, wherein the second metal salt is a salt of a valence variable metal.

28. The method of manufacturing a composite material according to claim 25, wherein the second metal oxide particulates are oxygen-reactive-species transporting particulates made of an oxygen-reactive-species transporting material capable of transporting an oxygen reactive species generated by the oxygen-extracting material.

29. The method of manufacturing a composite material according to claim 28, wherein the second metal salt serving as a raw material of the oxygen-reactive-species transporting material contains a salt of Ce and a salt of an additive metal which is at least one substance selected from the group consisting of La, Nd, Pr, Sm, Y, Ca, Ti, Fe, Zr, and Al.

30. The method of manufacturing a composite material according to claim 29, wherein a particle diameter of the aggregate is controlled by containing the salt of the additive metal.

31. The method of manufacturing a composite material according to claim 22, further comprising the step of:

allowing third metal ultrafine particles to be supported on surfaces of any of the second metal compound particulates and the second metal oxide particulates.

32. The method of manufacturing a composite material according to claim 22, wherein an average particle diameter of the aggregate precursors is in a range from 0.05 to 0.5 μm, and a portion equal to or above 60% by volume of all the aggregate precursors has particle diameters in a range within ±50% away from the average particle diameter.

33. The method of manufacturing a composite material according to claim 22, wherein the composite material is an oxidation catalyst.

34. A composite material dispersed fluid comprising:

the aggregate precursor obtained in the process of the method of manufacturing a composite material according to claim 22; and a dispersion medium.

35. The composite material dispersed fluid according to claim 34, comprising:

the aggregate precursor obtained by removing 50 to 99.9% of residual ions in a system from a solution containing the aggregate precursor.

36. A method of manufacturing a composite material dispersed fluid comprising the steps of:

removing 50 to 99.9% of residual ions in a system from a solution containing the aggregate precursors obtained in the process of the method of manufacturing a composite material according to claim 22; and mixing the obtained aggregate precursors with a dispersion solvent.

* * * * *